United States Patent
Anderson et al.

(10) Patent No.: US 12,415,391 B2
(45) Date of Patent: Sep. 16, 2025

(54) SYSTEM AND METHOD FOR ATTACHING A TRAILER TO A TOW VEHICLE

(71) Applicant: Progress Mfg. Inc., Provo, UT (US)

(72) Inventors: Jed K. Anderson, Lindon, UT (US); Jason R. Harper, Springville, UT (US); David F. Lundgreen, Spanish Fork, UT (US)

(73) Assignee: Progress Mfg. Inc., Provo, UT (US)

( * ) Notice: Subject to any disclaimer, the term of this patent is extended or adjusted under 35 U.S.C. 154(b) by 761 days.

(21) Appl. No.: 16/657,884

(22) Filed: Oct. 18, 2019

(65) Prior Publication Data
US 2020/0156424 A1    May 21, 2020

Related U.S. Application Data

(63) Continuation of application No. 16/436,722, filed on Jun. 10, 2019, now abandoned.
(Continued)

(51) Int. Cl.
*B60D 1/36* (2006.01)
*B60D 1/06* (2006.01)
(Continued)

(52) U.S. Cl.
CPC .............. *B60D 1/36* (2013.01); *B60D 1/1675* (2013.01); *B60D 1/481* (2013.01)

(58) Field of Classification Search
CPC .......... B60D 1/06; B60D 1/1675; B60D 1/36; B60D 1/363; B60D 1/46; B60D 1/48;
(Continued)

(56) References Cited

U.S. PATENT DOCUMENTS

| 2,062,788 A | 12/1936 | Jacob |
| 2,671,673 A | 3/1954 | Benson |

(Continued)

FOREIGN PATENT DOCUMENTS

| DE | 1630928 | 10/1971 |
| DE | 19851822 A1 | 11/2000 |

OTHER PUBLICATIONS

Andersen Premier Towing Products, 10" Rapid Hitch Adjustable Trailer Ball Mounts with 10" Rise and 10" Drop; retrieved from https://andersenhitches.com/Catalog/10-rapid-hitch.aspx, downloaded Apr. 24, 2018.
(Continued)

*Primary Examiner* — Anne Marie M Boehler
(74) *Attorney, Agent, or Firm* — McGarry Bair PC

(57) ABSTRACT

A trailer hitch system for attaching a trailer to a tow vehicle, is disclosed having a shank attachable a trailer, the shank having a nose at a terminal end of the shank and a mid-shank extending in a substantially horizontal direction immediately adjacent to the nose, the nose and mid-shank being configured to be received in a receiver attachable to said tow vehicle. The shank also includes a vertical adjustment extending in a substantially vertical direction, a depth stop connected to the shank and configured to abut the receiver to limit a depth that the shank extends within the receiver. The mid-shank includes step reduction which decreases a cross-sectional area of the mid-shank immediately adjacent to the nose, and the nose is configured to reduce in cross-sectional area toward the terminal end of the shank. The shank also includes an alignment indicator connected to the shank, such that the alignment indicator to provide a visual indicator of the orientation of the shank.

26 Claims, 45 Drawing Sheets

Related U.S. Application Data

(60) Provisional application No. 62/797,123, filed on Jan. 25, 2019, provisional application No. 62/682,754, filed on Jun. 8, 2018.

(51) Int. Cl.
  B60D 1/167 (2006.01)
  B60D 1/46 (2006.01)
  B60D 1/48 (2006.01)

(58) Field of Classification Search
  CPC . B60D 1/481; B60D 1/58; B60D 1/52; B60D 1/145; B60D 1/155; B60D 1/40; B60D 1/44
  USPC .............. 403/356, 360, 377; 280/477, 482
  See application file for complete search history.

(56) References Cited

U.S. PATENT DOCUMENTS

| | | | |
|---|---|---|---|
| 2,693,368 A * | 11/1954 | Petron | B60D 1/155 403/104 |
| 2,736,885 A | 2/1956 | Thompson | |
| 2,815,732 A | 12/1957 | Majors | |
| 3,015,162 A | 1/1962 | Bohnet | |
| 3,159,917 A | 12/1964 | Whitehead | |
| 3,161,422 A | 12/1964 | Wade | |
| 3,329,445 A | 7/1967 | Carson | |
| 3,437,355 A * | 4/1969 | Jeffes | B60D 1/40 280/479.3 |
| 3,774,943 A | 11/1973 | Schmiesing | |
| 3,818,599 A | 6/1974 | Tague | |
| 3,891,237 A | 6/1975 | Allen | |
| 3,912,302 A | 10/1975 | Patterson | |
| 3,938,122 A | 2/1976 | Mangus | |
| 4,017,977 A | 4/1977 | Light et al. | |
| 4,042,254 A | 8/1977 | Allen | |
| 4,050,714 A | 9/1977 | Epp | |
| 4,054,302 A | 10/1977 | Campbell | |
| 4,163,606 A | 8/1979 | Granno | |
| 4,192,426 A | 3/1980 | Myers | |
| 4,198,073 A | 4/1980 | Olsen | |
| 4,205,453 A | 6/1980 | Steele | |
| 4,215,875 A | 8/1980 | Younger | |
| 4,285,138 A | 8/1981 | Berry | |
| 4,312,516 A | 1/1982 | Olsen | |
| 4,560,183 A | 12/1985 | Cook | |
| 4,560,184 A | 12/1985 | Williams, Jr. | |
| 4,606,549 A | 8/1986 | Williams, Jr. | |
| 4,613,149 A | 9/1986 | Williams, Jr. | |
| 4,666,176 A | 5/1987 | Sand | |
| 4,666,177 A | 5/1987 | Vinchattle | |
| 4,687,220 A | 8/1987 | Danielson | |
| 4,722,542 A | 2/1988 | Hensley | |
| 4,723,788 A | 2/1988 | Suter | |
| 4,746,138 A | 5/1988 | James | |
| 4,759,564 A | 7/1988 | Williams, Jr. | |
| 4,802,686 A | 2/1989 | Isreal | |
| 4,807,899 A | 2/1989 | Belcher | |
| 4,844,496 A | 7/1989 | Webb et al. | |
| 4,844,497 A | 7/1989 | Allen | |
| 4,852,901 A | 8/1989 | Beasley et al. | |
| 4,856,200 A | 8/1989 | Riggs | |
| 4,905,376 A | 3/1990 | Neeley | |
| 4,925,287 A | 5/1990 | Lord et al. | |
| 4,938,495 A | 7/1990 | Beasley et al. | |
| 4,958,436 A | 9/1990 | Tusche | |
| 4,991,865 A | 2/1991 | Francisco | |
| 5,009,446 A | 4/1991 | Davis | |
| 5,035,441 A | 7/1991 | Murray | |
| 5,085,408 A | 2/1992 | Norton et al. | |
| 5,113,588 A | 5/1992 | Walston | |
| 5,115,572 A | 5/1992 | Harbison | |
| D327,867 S | 7/1992 | Elliott | |
| 5,184,839 A | 2/1993 | Guedry | |
| 5,188,385 A | 2/1993 | Wilson | |
| 5,235,468 A | 8/1993 | Stephens | |
| 5,236,215 A | 8/1993 | Wylie | |
| 5,269,554 A | 12/1993 | Law et al. | |
| 5,277,447 A | 1/1994 | Blaser | |
| 5,290,056 A | 3/1994 | Fath, IV | |
| 5,309,289 A | 5/1994 | Johnson | |
| 5,449,100 A | 9/1995 | Eckhart | |
| 5,478,101 A | 12/1995 | Roberson | |
| 5,482,310 A | 1/1996 | Staggs | |
| 5,518,263 A * | 5/1996 | Owens | B60D 1/36 280/477 |
| 5,547,116 A | 8/1996 | Eckhart | |
| 5,558,352 A | 9/1996 | Mills | |
| 5,580,076 A | 12/1996 | DeRoule | |
| 5,593,172 A * | 1/1997 | Breslin | B60D 1/155 280/491.5 |
| 5,676,292 A | 10/1997 | Miller | |
| 5,680,706 A | 10/1997 | Talcott | |
| 5,725,231 A | 3/1998 | Buie | |
| 5,769,443 A | 6/1998 | Muzny | |
| 5,791,676 A | 8/1998 | Jones | |
| 5,821,852 A | 10/1998 | Fairchild | |
| 5,861,814 A | 1/1999 | Clayton | |
| 5,882,029 A | 3/1999 | Kennedy | |
| 5,927,229 A | 7/1999 | Karr, Jr. | |
| 5,927,742 A | 7/1999 | Draper | |
| 5,941,551 A | 8/1999 | Harman et al. | |
| 5,951,035 A | 9/1999 | Phillips, Jr. et al. | |
| 5,970,619 A | 10/1999 | Wells | |
| 5,988,667 A * | 11/1999 | Young | B60D 1/241 280/506 |
| 6,042,136 A | 3/2000 | Heinecke | |
| 6,076,847 A | 6/2000 | Thornton | |
| 6,100,795 A | 8/2000 | Otterbacher et al. | |
| 6,102,422 A | 8/2000 | Damron | |
| 6,105,989 A * | 8/2000 | Linger | B60D 1/241 280/506 |
| D431,216 S * | 9/2000 | Belinky | D12/162 |
| 6,131,938 A * | 10/2000 | Speer | B60D 1/241 280/506 |
| 6,139,041 A | 10/2000 | Murphy | |
| 6,168,181 B1 | 1/2001 | Gadd | |
| 6,170,852 B1 | 1/2001 | Kimbrough | |
| 6,178,650 B1 | 1/2001 | Thibodeaux | |
| 6,186,531 B1 * | 2/2001 | Parent | B60D 1/52 280/506 |
| 6,209,898 B1 * | 4/2001 | Fortier | B62D 49/085 414/673 |
| 6,209,902 B1 | 4/2001 | Potts | |
| 6,213,608 B1 | 4/2001 | Osgood | |
| 6,227,305 B1 | 5/2001 | Sayer | |
| 6,239,926 B1 | 5/2001 | De Shazer | |
| 6,259,357 B1 | 7/2001 | Heider | |
| 6,273,448 B1 | 8/2001 | Cross | |
| 6,279,940 B1 | 8/2001 | Beavington | |
| 6,286,851 B1 | 9/2001 | Sargent | |
| 6,318,747 B1 | 11/2001 | Ratican | |
| 6,341,794 B1 | 1/2002 | Hunter | |
| 6,357,126 B1 | 3/2002 | Gillen, Jr. | |
| 6,386,572 B1 | 5/2002 | Cofer | |
| 6,402,178 B1 * | 6/2002 | Ifflaender | B60D 1/52 280/491.2 |
| 6,446,999 B1 | 9/2002 | Davis, Jr. | |
| 6,454,290 B1 | 9/2002 | Turner | |
| 6,494,477 B1 | 12/2002 | Parker | |
| 6,517,098 B2 | 2/2003 | Grasso et al. | |
| 6,585,281 B1 | 7/2003 | Voorting | |
| 6,612,603 B2 | 9/2003 | Alger | |
| 6,679,512 B1 | 1/2004 | Plessala | |
| 6,698,783 B1 | 3/2004 | Zechbauer | |
| 6,722,682 B2 | 4/2004 | Valliere | |
| 6,827,363 B1 | 12/2004 | Amerson | |
| 6,851,697 B2 | 2/2005 | Kinnard | |
| 6,863,294 B1 | 3/2005 | Bonham | |
| 6,905,132 B2 | 6/2005 | Pierce | |
| 6,932,374 B1 | 8/2005 | Timms et al. | |
| 6,951,345 B2 | 10/2005 | Wilks | |

(56) References Cited

U.S. PATENT DOCUMENTS

| | | | |
|---|---|---|---|
| 6,976,694 B1 | 12/2005 | Rayl et al. | |
| 6,990,745 B1 | 1/2006 | Schoenenberger | |
| 7,004,488 B2 | 2/2006 | Reiter et al. | |
| 7,004,492 B2 * | 2/2006 | Moss | B60D 1/52 280/511 |
| 7,025,371 B2 | 4/2006 | Allen et al. | |
| 7,036,840 B2 | 5/2006 | Kwilinski | |
| 7,077,417 B2 | 7/2006 | Shoemaker | |
| 7,290,755 B1 | 11/2007 | Thibodeaux | |
| 7,425,014 B1 | 9/2008 | Palmer | |
| 7,467,804 B2 * | 12/2008 | Ezra | B60D 1/52 280/506 |
| 7,506,885 B2 | 3/2009 | Colibert | |
| 8,079,612 B1 * | 12/2011 | Tambornino | B60D 1/241 280/491.5 |
| 8,191,915 B2 * | 6/2012 | Freese, V | B60D 1/58 340/686.2 |
| 8,490,999 B2 | 7/2013 | Scott | |
| 8,733,780 B2 | 5/2014 | Williams, Jr. | |
| 9,193,234 B1 * | 11/2015 | Angel | B60D 1/46 |
| 9,327,564 B2 * | 5/2016 | Breeden | B60D 1/52 |
| 9,464,887 B2 * | 10/2016 | Salter | F21S 43/14 |
| 9,738,124 B1 * | 8/2017 | Verheul | B60D 1/241 |
| 10,155,423 B1 * | 12/2018 | Gebheim | B60D 1/52 |
| 10,220,661 B1 * | 3/2019 | Gebheim | B60D 1/30 |
| 10,252,588 B2 | 4/2019 | Scott | |
| 10,486,609 B2 * | 11/2019 | Klindt | B60D 1/075 |
| 10,486,611 B1 * | 11/2019 | Klindt | B60R 9/06 |
| 2002/0060440 A1 | 5/2002 | Storer | |
| 2002/0101055 A1 | 8/2002 | Warren | |
| 2003/0218313 A1 | 11/2003 | Beaudoin | |
| 2004/0227324 A1 | 11/2004 | Popham | |
| 2004/0262883 A1 | 12/2004 | Kerins | |
| 2005/0134020 A1 | 6/2005 | Wilks | |
| 2005/0218626 A1 | 10/2005 | Kwilinski | |
| 2006/0097480 A1 | 5/2006 | Hegefeld | |
| 2006/0103111 A1 | 5/2006 | Popham | |
| 2006/0186638 A1 | 8/2006 | Varner | |
| 2006/0255562 A1 * | 11/2006 | Lantaigne | B60D 1/06 280/506 |
| 2006/0290100 A1 * | 12/2006 | Miller | B60D 1/06 280/477 |
| 2007/0052205 A1 * | 3/2007 | Sass | B60D 1/36 280/491.1 |
| 2009/0014983 A1 * | 1/2009 | McKendry | B60D 1/241 280/506 |
| 2009/0115165 A1 * | 5/2009 | Coy | B60D 1/52 280/506 |
| 2009/0184493 A1 | 7/2009 | Eifert | |
| 2009/0200770 A1 * | 8/2009 | Reichert | B60D 1/36 280/477 |
| 2010/0324770 A1 * | 12/2010 | Ramsey | B60D 1/36 701/28 |
| 2013/0045067 A1 * | 2/2013 | Pickett | G05D 1/0246 414/345 |
| 2013/0093163 A1 * | 4/2013 | Bernart | B60D 1/06 280/511 |
| 2015/0028573 A1 * | 1/2015 | Masanek, Jr. | B60D 1/243 280/770 |
| 2018/0079266 A1 * | 3/2018 | Cincunegui | B60D 1/065 |
| 2018/0111431 A1 * | 4/2018 | Macneil | B60D 1/58 |
| 2018/0134105 A1 * | 5/2018 | Wyers | B60D 1/065 |
| 2018/0354323 A1 * | 12/2018 | Maynard, Jr. | B60D 1/44 |
| 2019/0225037 A1 * | 7/2019 | Kang | B60D 1/52 |
| 2024/0010034 A1 * | 1/2024 | Lind | B60D 1/02 |

OTHER PUBLICATIONS

Reese Weight Distribution Shank—16,000 lbs, from website for etrailer.com; retrieved from https://www.etrailer.com/Accessories-and-Parts/Reese/RP54998.html, downloaded Apr. 24, 2018.

* cited by examiner

SYSTEM AND METHOD FOR ATTACHING A TRAILER TO A TOW VEHICLE

CROSS-REFERENCE TO RELATED APPLICATIONS

This application is a continuation of U.S. patent application Ser. No. 16/436,722, filed Jun. 10, 2019, which claims the benefit of U.S. Provisional Patent Application Ser. No. 62/797,123, filed Jan. 25, 2019, and U.S. Provisional Patent Application Ser. No. 62/682,754, filed Jun. 8, 2018, which are hereby incorporated by reference herein in their entirety, including but not limited to those portions that specifically appear hereinafter, the incorporation by reference being made with the following exception: in the event that any portion of the above-referenced applications are inconsistent with this application, this application supercedes the above-referenced applications.

STATEMENT REGARDING FEDERALLY SPONSORED RESEARCH OR DEVELOPMENT

Not Applicable.

BACKGROUND

1. The Field of the Present Disclosure

The present disclosure relates generally to trailer hitch systems, and more particularly, but not necessarily entirely, to trailer hitch systems that facilitate connecting trailers to tow vehicles.

2. Description of Related Art

Various different types of trailer hitches are known in the art for attaching trailers to towing vehicles. One of the most common types of towing systems utilizes a ball hitch. Typical ball hitches have a generally spherical shaped ball with a stem or threaded rod extending from a base of the ball. The threaded rod may be configured to engage a hitch head mounted on the towing vehicle using a threaded receiver or ball hitch fitting. A trailer coupling member, such as a ball clamp, positioned on a front of the trailer tongue, may engage the ball hitch in a loose friction fit, and may be secured to the ball in preparation for towing. Some hitches may also have load equalizing systems to distribute loads and allow the towing vehicle and trailer to remain level. Other mechanisms may also be used in association with a trailer hitch to reduce side sway of the trailer.

A common challenge with the known trailer hitch systems is attaching the trailer to the tow vehicle. Difficulty may arise in properly aligning the trailer with the tow vehicle as the tow vehicle is backed to engage with the trailer. Often during attempts to attach the trailer to the tow vehicle, the sharp rigid end of the trailer tongue may strike the back of the tow vehicle causing damage to the tow vehicle.

There have been many attempts to improve the method of connecting trailers to tow vehicles, yet the most common method remains the conventional ball connection, even though such method has several drawbacks. One of the drawbacks of the conventional ball mount system and method may include the necessity to precisely position the hitch ball that is connected to the vehicle under the trailer tongue ball clamp. On weight distribution hitches, the difficulty of attaching the trailer may be increased by the common necessity of installing and removing the heavy ball mount assembly, spring bars and anti-sway bars if so equipped, every time the trailer is connected or disconnected.

Other trailer hitch systems may include plug-in type hitches in which receivers are joined to the tow vehicle, and the hitch ball is joined to the trailer. A bar on the trailer tongue may be plugged into the receiver to attach the trailer to the tow vehicle. A drawback of the known plug-in hitches may include the requirement of a unique receiver hitch unit to be installed on the tow vehicle. Since vehicles used for towing are commonly equipped by the manufacturer with a receiver hitch already installed, removing and replacing the existing receiver hitch may be a significant impediment to the success of such towing systems. Other trailer hitch systems require unique mechanisms to be installed on the trailer. Yet other trailer hitch systems allow the plug-in receiver to be installed on the exterior of the manufacturer installed receiver, but such systems may add considerable cost, weight, and complexity to the trailer hitch.

Some of the known plug-in type trailer hitch systems are prone to binding during engagement or disengagement of the trailer with the tow vehicle. Such binding may be caused by different heights of the receiver with respect to the connecting bar on the trailer tongue, misalignment, improperly shaped engaging elements, and/or the lack of adequate bearing surfaces or rolling elements to reduce friction between the receiver and the connecting bar on the trailer tongue. Because of the considerable weight of both the tow vehicle and the trailer, even small misalignments can generate considerable frictional forces.

Various different mechanisms are known in the art for assisting in backing or aligning the tow vehicle with the trailer to facilitate attaching the trailer to the tow vehicle. Such mechanisms may be visual, optical, mechanical or electronic devices to assist in achieving the proper height, angle and position of the tow vehicle with respect to the trailer. Many of the devices are complex or bulky such that they may result in more of a hindrance than an aid.

Despite the advantages of known trailer hitch systems, improvements are still being sought. The prior art is characterized by several disadvantages that are addressed by the present disclosure. The present disclosure minimizes, and in some aspects eliminates, the above-mentioned failures, and other problems, by utilizing the methods and structural features described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims. Any discussion of documents, acts, materials, devices, articles or the like which has been included in the present specification is not to be taken as an admission that any or all of these matters form part of the prior art base, or were common general knowledge in the field relevant to the present disclosure as it existed before the priority date of each claim of this application.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
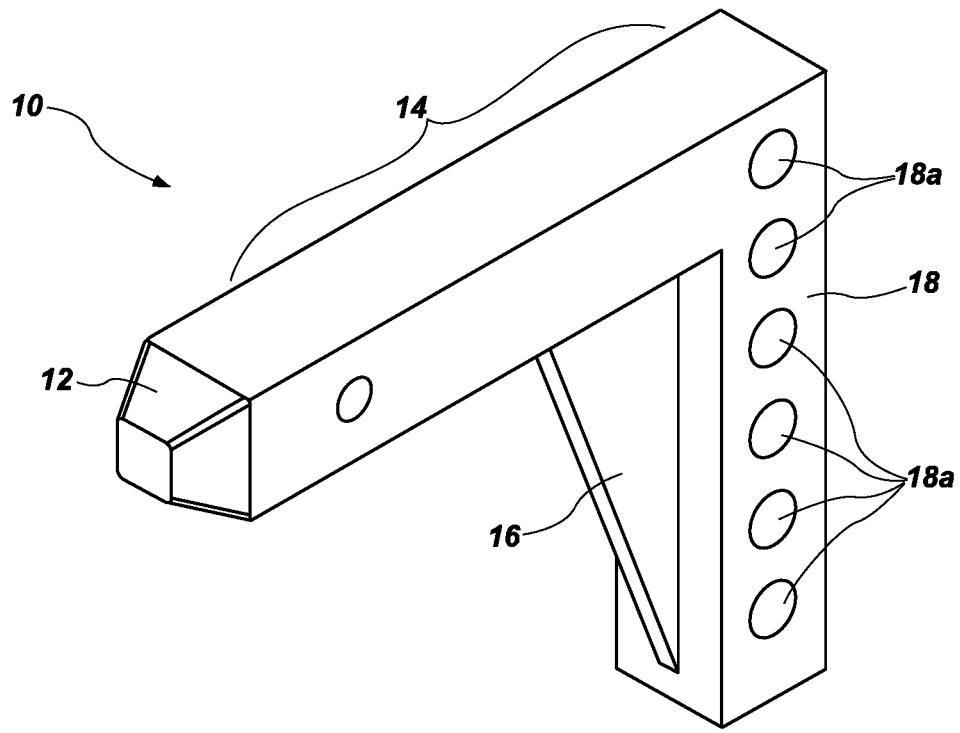
FIG. 1 is a perspective view of an embodiment of the disclosed invention.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present apparatus and methods for providing a trailer hitch system are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present disclosure will be limited only by the appended claims and equivalents thereof.

The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supercedes said reference materials. The reference materials discussed herein are provided solely for their disclosure prior to the filing date of the present application. Nothing herein is to be construed as a suggestion or admission that the inventors are not entitled to antedate such disclosure by virtue of prior disclosure, or to distinguish the present disclosure from the subject matter disclosed in the reference materials.

It must be noted that, as used in this specification and the appended claims, the singular forms "a," "an," and "the" include plural referents unless the context clearly dictates otherwise. Moreover, as used herein, the terms "comprising," "including," "containing," "characterized by," and grammatical equivalents thereof are inclusive or open-ended terms that do not exclude additional, unrecited elements or method steps.

As used herein, the term "elongate" shall be construed broadly to include structures that have one dimension, such as a length, that is greater than another dimension, such as a width or diameter.

As used herein, the term "proximal" shall refer broadly to the concept of a nearest portion. For example, the vertical adjustment is the proximal-most portion of the shank, because it is the nearest portion when said shank is installed.

As used herein, the term "distal" shall generally refer to the opposite of proximal, and thus to the concept of a further portion, or a furthest portion, depending upon the context.

As used herein, the general term "shank" shall generally refer to a shank used in a rise or drop position, as known in the art.

The following inventive embodiments are related to a trailer hitch system for attaching a trailer to a tow vehicle, where the trailer hitch system includes at least a shank attachable to a trailer and a tow vehicle.

Referring now to FIG. 1, a first shank embodiment includes a shank 10, having a nose 12 a mid-shank 14, a support 16 and a vertical adjustment 18. The mid-shank 14 can extend from the vertical adjustment 18, or upright portion, to the nose 12. The nose 12 may be defined as an end portion, extending to a terminating free end of the shank 10, having a cross-sectional area less than the cross-sectional area of the mid-shank 14. The nose 12, as shown in FIG. 1, includes a tapered angular shape, which reduces in cross-sectional area until reaching a terminating free end of the nose 12. By reducing the cross-sectional shape of the nose 12, the nose 12 can improve the speed and time to install the shank 10 into a receiver, attachable to a tow vehicle, due to the tight tolerances between the exterior of the nose 12 and the interior of the receiver.

While the tapered angular shape, shown in FIG. 1, includes a substantially square cross-section, various nose 12 geometries can be used with reduced cross-sectional areas, which can allow the shank 10 to initially enter into a receiver opening while allowing for some misalignment. A receiver, not shown, can be fixed, or otherwise attachable to a tow vehicle to enable the shank 10, which can be connected to a trailer, to facilitate a removable connection between a tow vehicle and a trailer (also not shown).

The support 16 can function to provide strength support to between the mid-shank 14 and the vertical adjustment, such that the mid-shank 14 and the vertical adjustment 18 may maintain a substantially 90 degree angles, or other, predetermined or desired angle. The vertical adjustment 18 can provide numerous adjustable positions, using holes 18a, which can receive a pin for attachment of a ball hitch or other hitch attachment.

Figure 2:
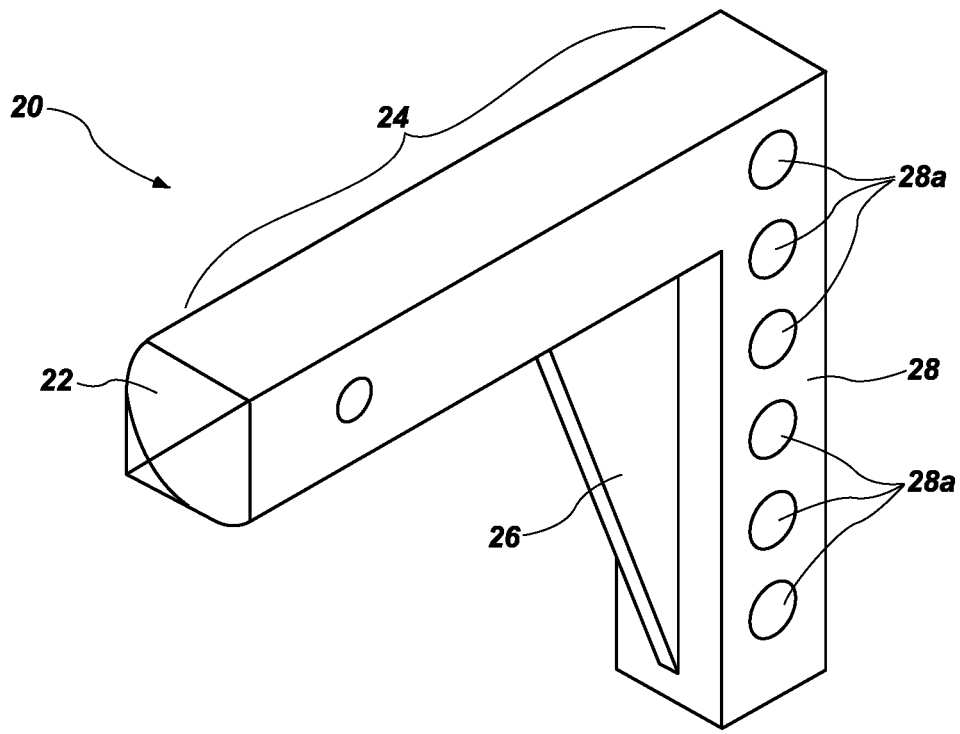
FIG. 2 is a perspective view of another embodiment of the disclosed invention.
Figure 3:
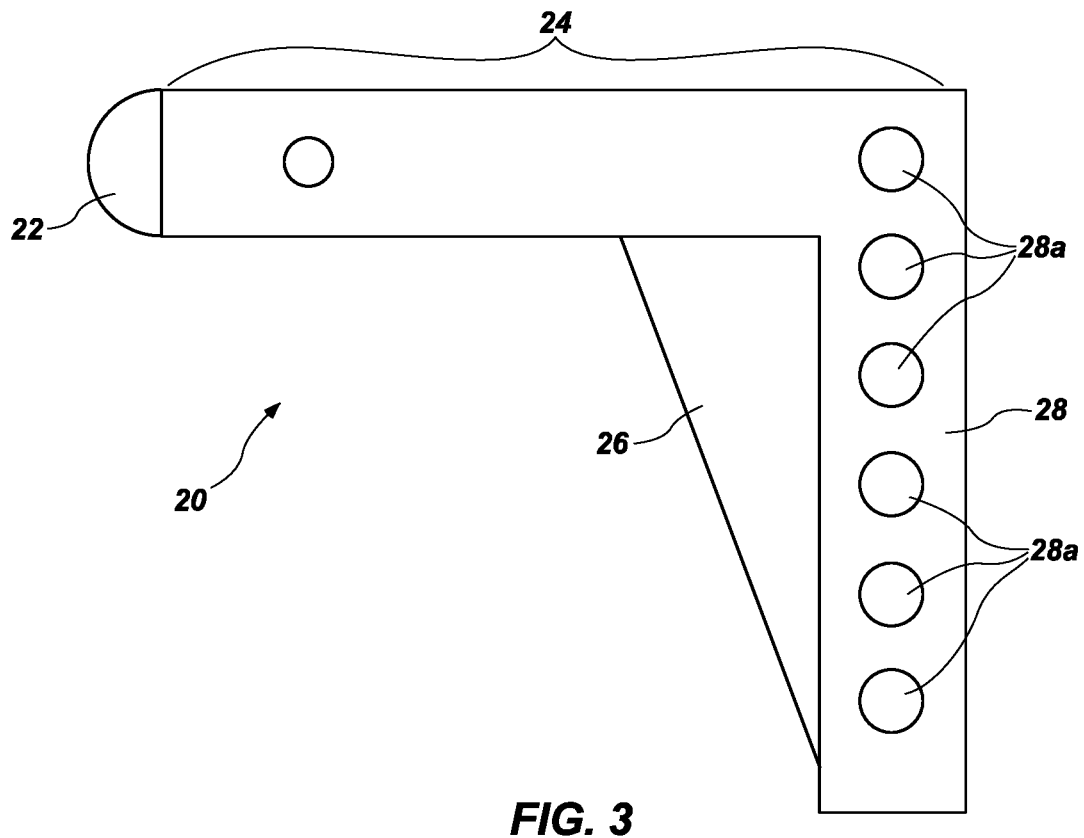
FIG. 3 is a side view of the embodiment of FIG. 2.

Referring now to FIGS. 2 and 3, another shank embodiment includes a shank 20, having a nose 22 a mid-shank 24, a support 26 and a vertical adjustment 28, wherein the mid-shank 24, support 26, and vertical adjustment 28, may be substantially the same as those shown and described in FIG. 1, or of the form or shape, or combination of form or shape, of any or the shank embodiments disclosed herein. Additionally, the vertical adjustment 28 can provide numerous adjustable positions, using holes 28a, which can receive a pin for attachment of a ball hitch or other hitch attachment.

The nose 22 may be defined as an end portion, extending to a terminating free end of the shank 20, having a cross-sectional area less than the cross-sectional area of the mid-shank 24. The nose 22, as shown in FIGS. 2 and 3, includes a rounded, substantially semicircular shape, which reduces in cross-sectional area until reaching a terminating free end of the nose 22. By reducing the cross-sectional shape of the nose 22, the nose 22 can improve the speed and time to install the shank 20 into a receiver, and thereby improve the initial entry of the shank 20 into the receiver by allowing the shank 20 to be out of alignment with the receiver, for example, up to a ½ inch out of alignment, or more, and still enter the receiver.

Figure 4:
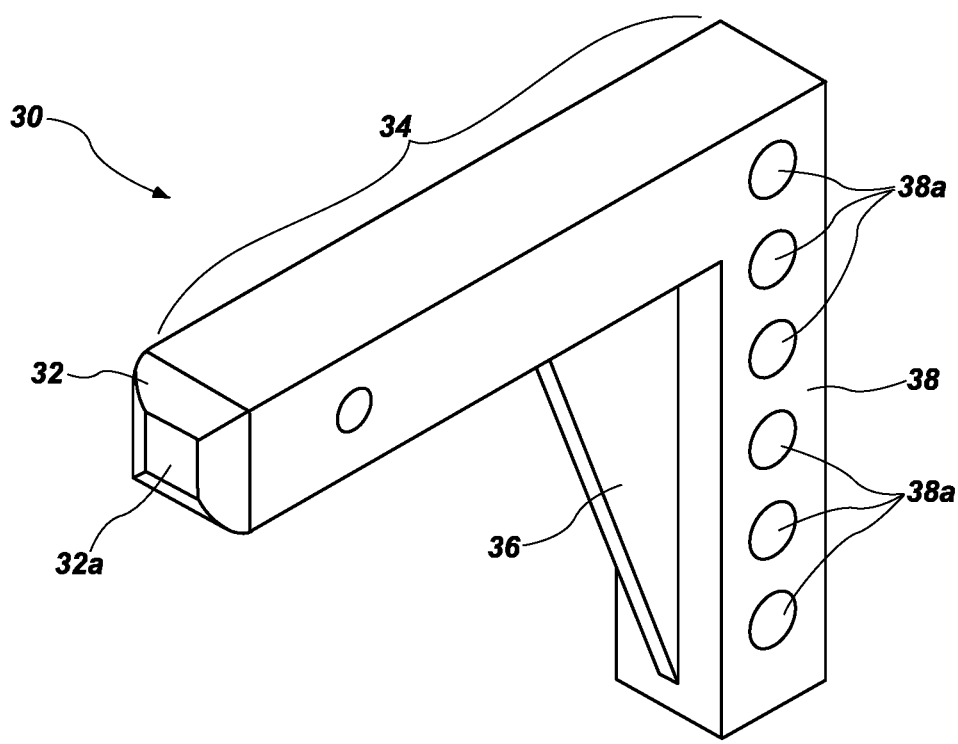
FIG. 4 is a perspective view of another embodiment of the disclosed invention.
Figure 5:
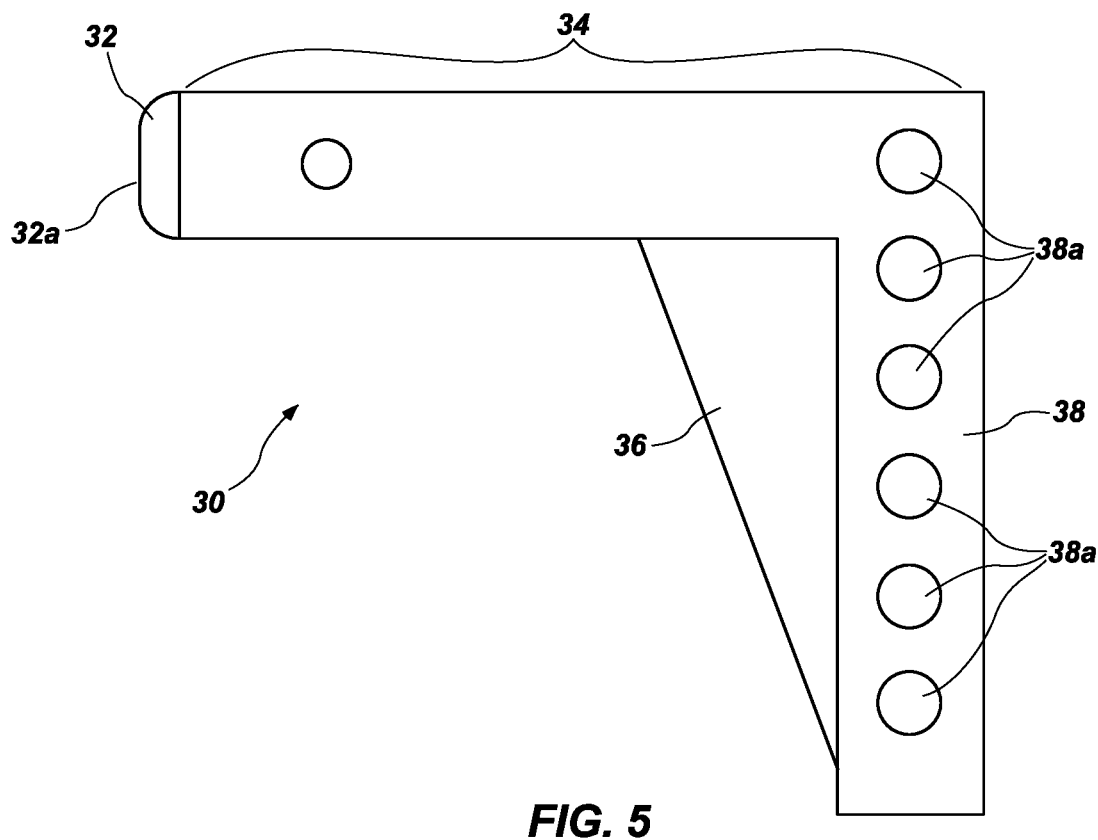
FIG. 5 is a side view of the embodiment of FIG. 4.

Referring now to FIGS. 4 and 5, another shank embodiment includes a shank 30, having a nose 32 a mid-shank 34, a support 36 and a vertical adjustment 38, wherein the mid-shank 34, support 36, and vertical adjustment 38, may be substantially the same as those shown and described in FIG. 1, or of the form or shape, or combination of form or shape, of any or the shank embodiments disclosed herein. Additionally, the vertical adjustment 38 can provide numerous adjustable positions, using holes 38a, which can receive a pin for attachment of a ball hitch or other hitch attachment.

The nose 32 may be defined as an end portion, extending to a terminating free end of the shank 30, having a cross-sectional area less than the cross-sectional area of the mid-shank 34. The nose 32, as shown in FIGS. 3 and 4, includes a rounded perimeter, which reduces in cross-sectional area until reaching a terminating free end, which includes a substantially planar terminal end surface 32a. By reducing the cross-sectional shape of the nose 32, the nose 32 can improve the speed and time to install the shank 30 into a receiver, and thereby improve the initial entry of the shank 30 into the receiver by allowing the shank 30 to be out of alignment with the receiver, for example, up to a inch out of alignment, or more, and still enter the receiver.

Figure 6:
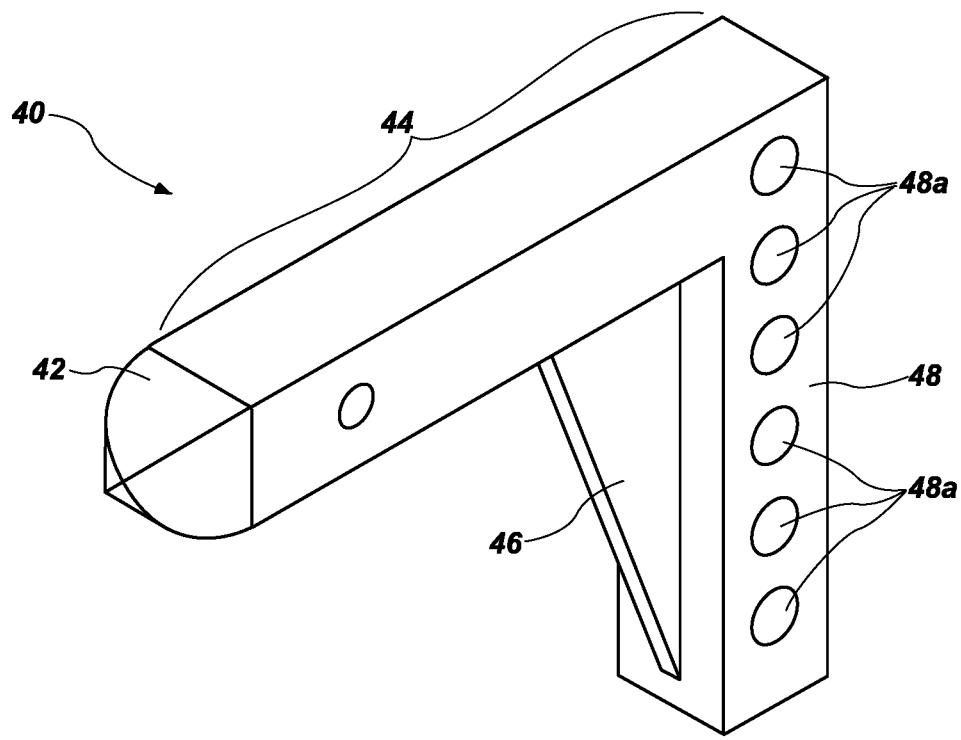
FIG. 6 is a perspective view of another embodiment of the disclosed invention.
Figure 7:
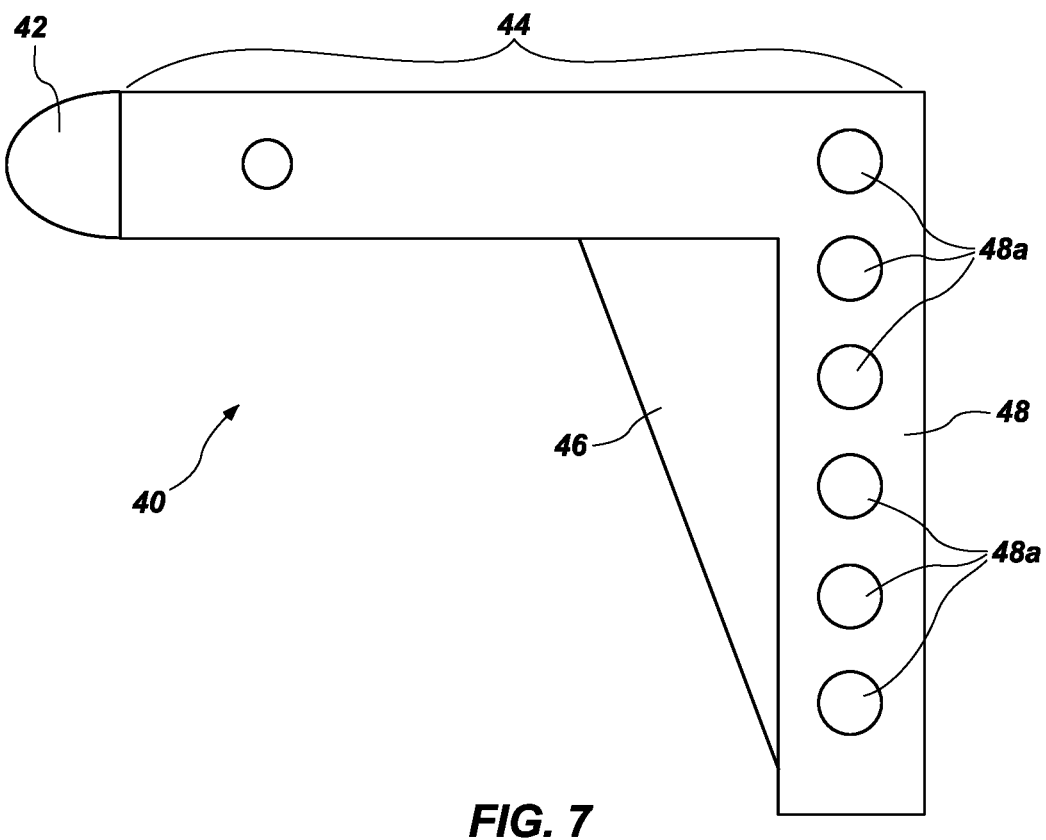
FIG. 7 is a side view of the embodiment of FIG. 6.

Referring now to FIGS. 6 and 7, another shank embodiment includes a shank 40, having a nose 42 a mid-shank 44, a support 46 and a vertical adjustment 48, wherein the mid-shank 44, support 46, and vertical adjustment 48, may be substantially the same as those shown and described in FIG. 1, or of the form or shape, or combination of form or shape, of any or the shank embodiments disclosed herein. Additionally, the vertical adjustment 48 can provide numerous adjustable positions, using holes 48a, which can receive a pin for attachment of a ball hitch or other hitch attachment.

The nose 42 may be defined as an end portion, extending to a terminating free end of the shank 40, having a cross-sectional area less than the cross-sectional area of the mid-shank 44. The nose 42, as shown in FIGS. 3 and 4, includes a rounded, substantially semi-circular or oblong shape, which reduces in cross-sectional area until reaching a terminating free end. By reducing the cross-sectional shape of the nose 42, the nose 42 can improve the speed and time to install the shank 40 into a receiver, and thereby improve the initial entry of the shank 40 into the receiver by allowing the shank 40 to be out of alignment with the receiver, for example, up to a inch out of alignment, or more, and still enter the receiver.

Figure 8:
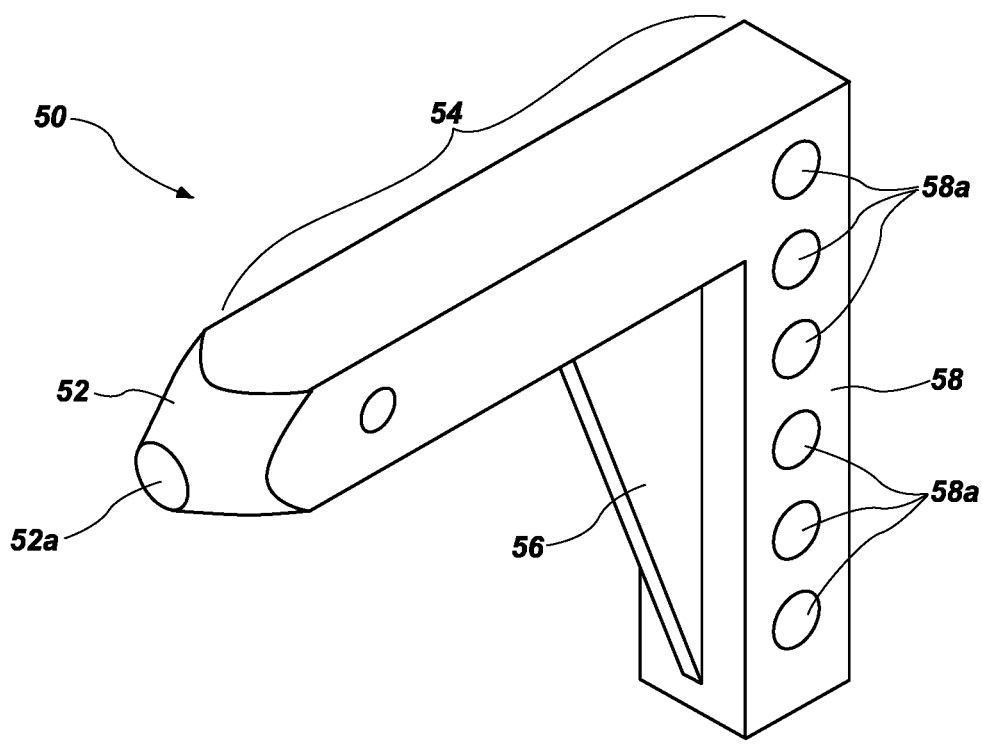
FIG. 8 is a perspective view of another embodiment of the disclosed invention.
Figure 9:
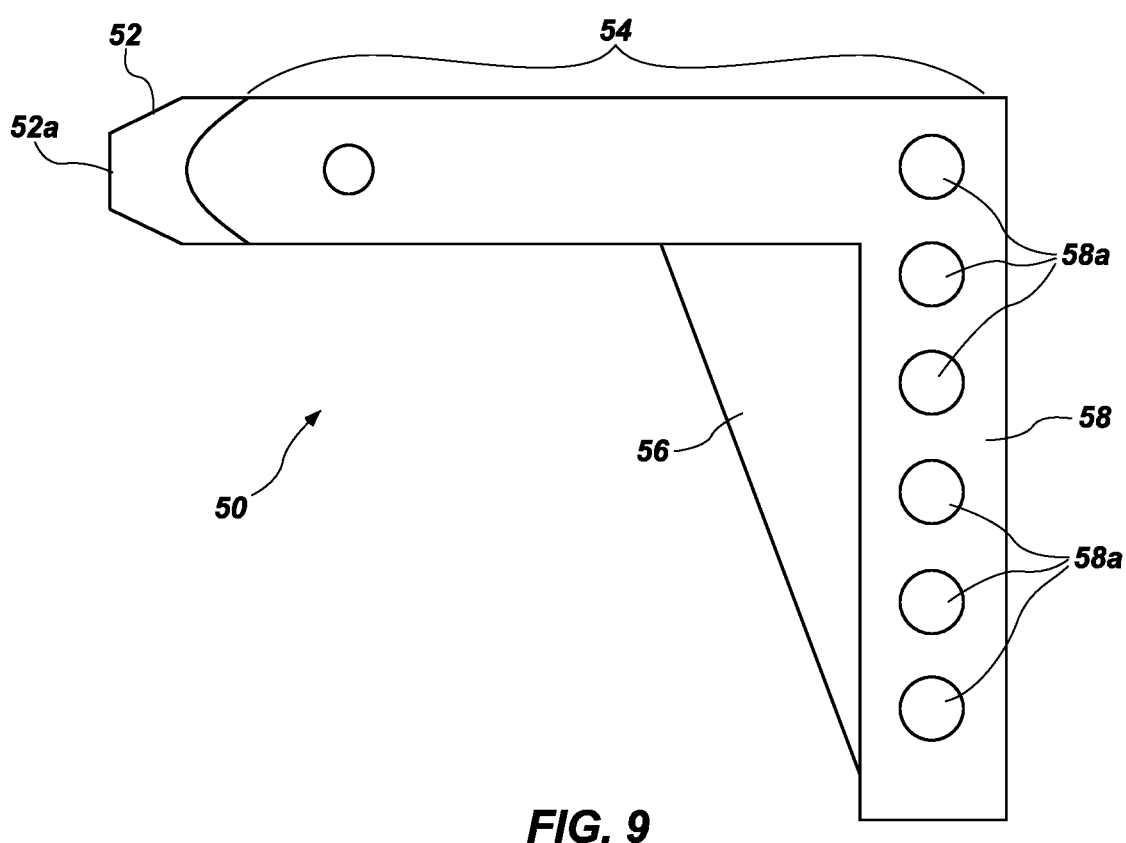
FIG. 9 is a side view of the embodiment of FIG. 8.

Referring now to FIGS. 8 and 9, another shank embodiment includes a shank 50, having a nose 52 a mid-shank 54, a support 56 and a vertical adjustment 58, wherein the mid-shank 54, support 56, and vertical adjustment 58, may be substantially the same as those shown and described in FIG. 1, or of the form or shape, or combination of form or shape, of any or the shank embodiments disclosed herein. Additionally, The vertical adjustment 58 can provide numerous adjustable positions, using holes 58a, which can receive a pin for attachment of a ball hitch or other hitch attachment.

The nose 52 may be defined as an end portion, extending to a terminating free end of the shank 50, having a cross-sectional area less than the cross-sectional area of the mid-shank 54. The nose 52, as shown in FIGS. 8 and 9, includes a rounded, cone-shaped perimeter, which reduces in cross-sectional area until reaching a terminating free end, which can come to a point or include a substantially planar terminal end surface 52a. By reducing the cross-sectional shape of the nose 52, the nose 52 can improve the speed and time to install the shank 50 into a receiver, and thereby improve the initial entry of the shank 50 into the receiver by allowing the shank 50 to be out of alignment with the receiver, for example, up to a inch out of alignment, or more, and still enter the receiver.

Figure 10:
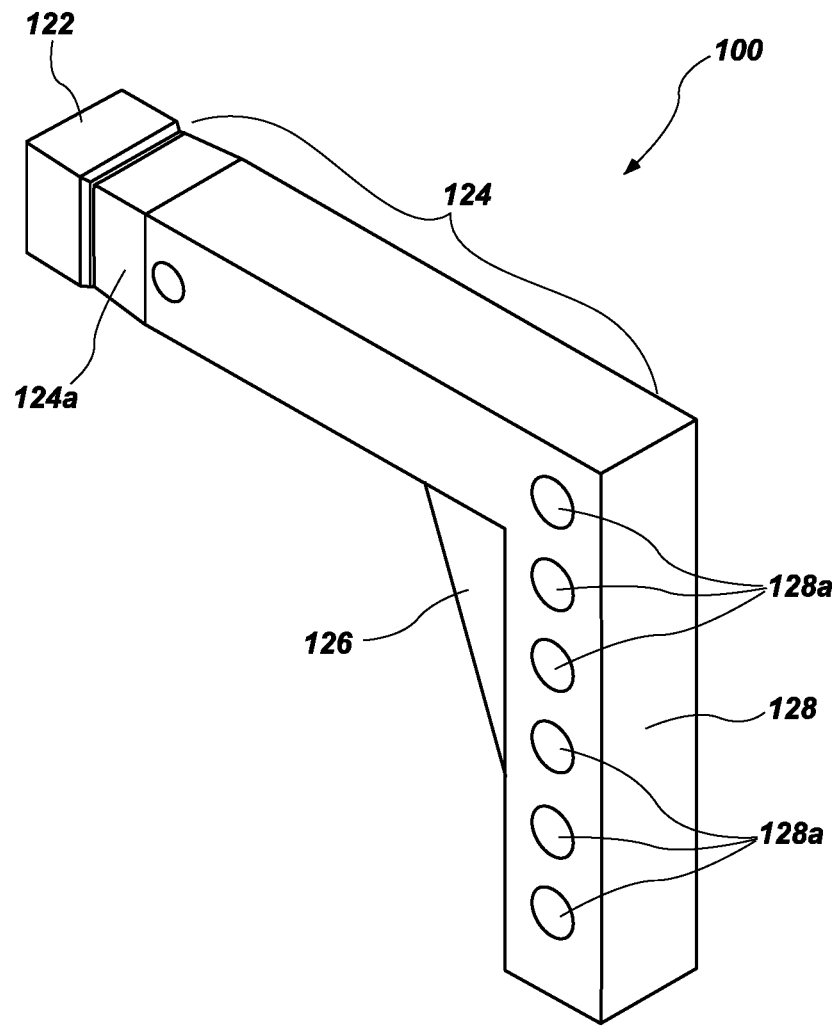
FIG. 10 is a perspective view of another embodiment of the disclosed invention.
Figure 11:
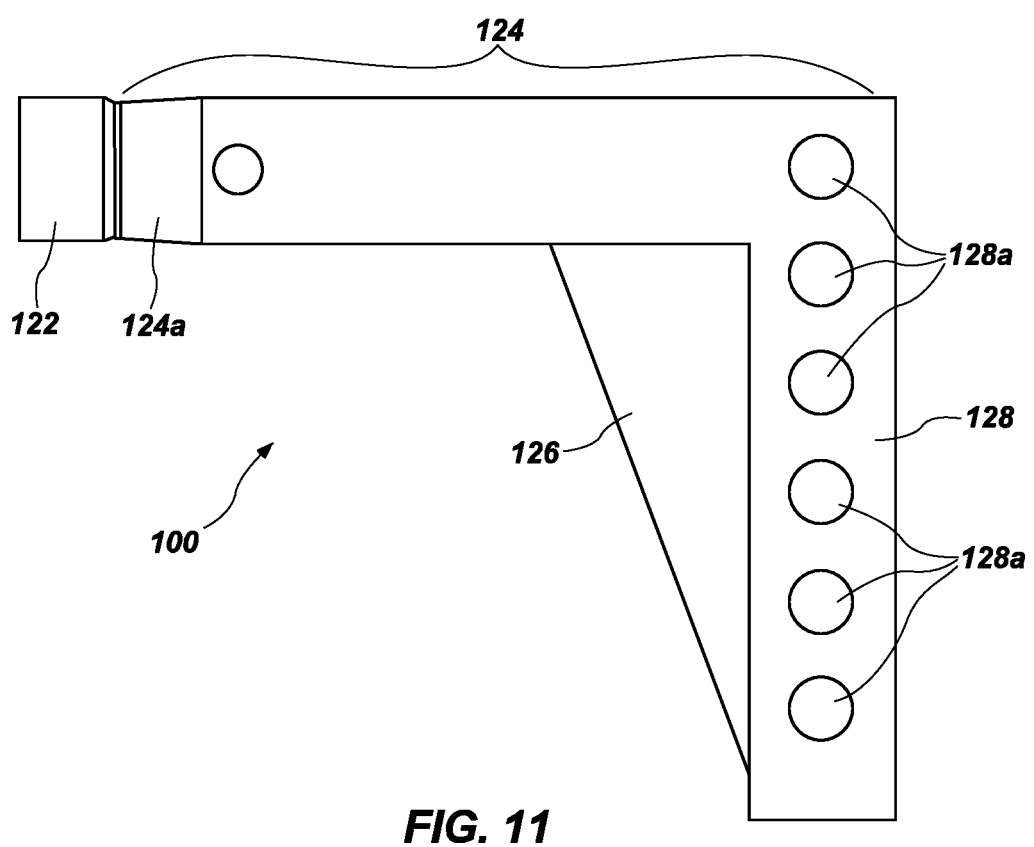
FIG. 11 is a side view of the embodiment of FIG. 10.

Referring to FIGS. 10 and 11, another shank embodiment includes a shank 100, having a nose 122 a mid-shank 124, a support 126 and a vertical adjustment 128. The nose 122 is shown having a substantially straight, block-type configuration, however, various shapes or geometries can be used. The mid-shank 124 is shown having a decreased perimeter or cross-sectional area, via a step reduction 124a, immediately adjacent to the nose 122, which can allow the shank 100 to continue to more easily and completely enter into the receiver opening after the nose 122 initially enters into the receiver. The term "step reduction" as used herein and used through this specification, may include, but shall not be limited to, a 90 degree step or a right-angled corner. Various geometries of the mid-shank 124 can be used which can allow the shank 100 to easily and completely enter into a receiver opening.

By reducing the cross-sectional area of the mid-shank 124, the step reduction 124a can improve the speed and time to install the shank 100 into a receiver, reducing, and possibly eliminating any binding that may take place between the shank 100 and the receiver, due to the tight tolerances between the exterior of the mid-shank 124 and the interior of the receiver. Specifically, the shank 100 may be attached or coupled to a trailer, prior to being received into the receiver. In this circumstance, a tow vehicle, having the receiver, may be backed into engagement with the shank 100 such that the receiver receives the shank 100 as the tow vehicle is backed up. If the mid-shank 124 is not reduced in cross-sectional area, or waisted, as disclosed herein, the shank 100 can bind with the receiver, unless the shank 100 and the receiver are aligned within a tight tolerance.

The support 126 can function to provide strength support to between the mid-shank 124 and the vertical adjustment, such that the mid-shank 124 and the vertical adjustment 128 may maintain a substantially 90 degree angles, or other, predetermined or desired angle. The vertical adjustment 128 can provide numerous adjustable positions, using holes 128a, which can receive a pin for attachment of a ball hitch or other hitch attachment.

Figure 12:
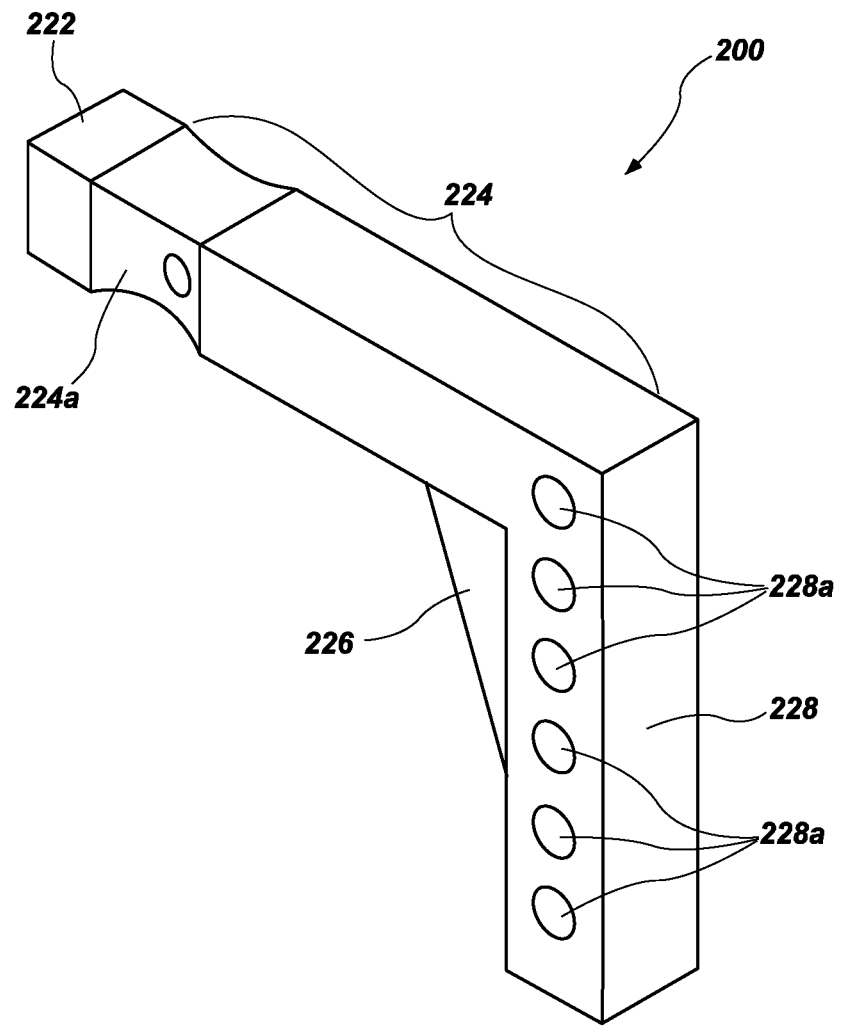
FIG. 12 is a perspective view of another embodiment of the disclosed invention.
Figure 13:
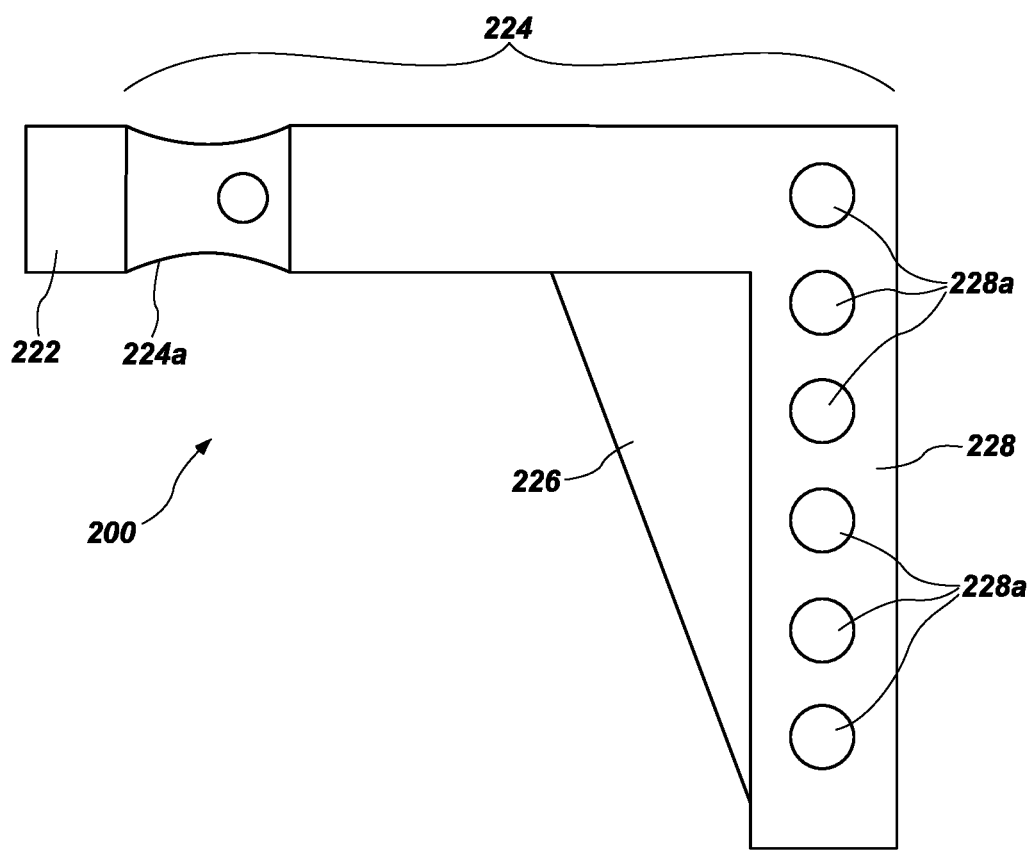
FIG. 13 is a side view of the embodiment of FIG. 12.

Referring now to FIGS. 12 and 13, another shank embodiment includes a shank 200, having a nose 222 a mid-shank 224, a support 226 and a vertical adjustment 228, wherein the nose 222, mid-shank 224, support 226, and vertical adjustment 228, may be substantially the same as those shown and described in FIG. 1 or 10, or of the form or shape, or combination of form or shape, of any or the shank embodiments disclosed herein. Additionally, the vertical adjustment 228 can provide numerous adjustable positions, using holes 228a, which can receive a pin for attachment of a ball hitch or other hitch attachment.

The mid-shank 224 is shown having a decreased perimeter or cross-sectional area, via a concave or curved reduction 224a, immediately adjacent to the nose 222, which can allow the shank 200 to continue to more easily and completely enter into the receiver opening after the nose 222 initially enters into the receiver. The curved reduction 224a may include four sides of the mid-shank 224 having the same, or substantially the same, curved reduction 224a, or hour-glass shape. Various geometries of the mid-shank 224 can be used which can allow the shank 200 to easily and completely enter into a receiver opening.

By reducing the cross-sectional area of the mid-shank 224, the curved reduction 224a can improve the speed and time to install the shank 200 into a receiver, reducing, and possibly eliminating any binding that may take place between the shank 200 and the receiver, due to the tight tolerances between the exterior of the mid-shank 224 and the interior of the receiver.

Figure 14:
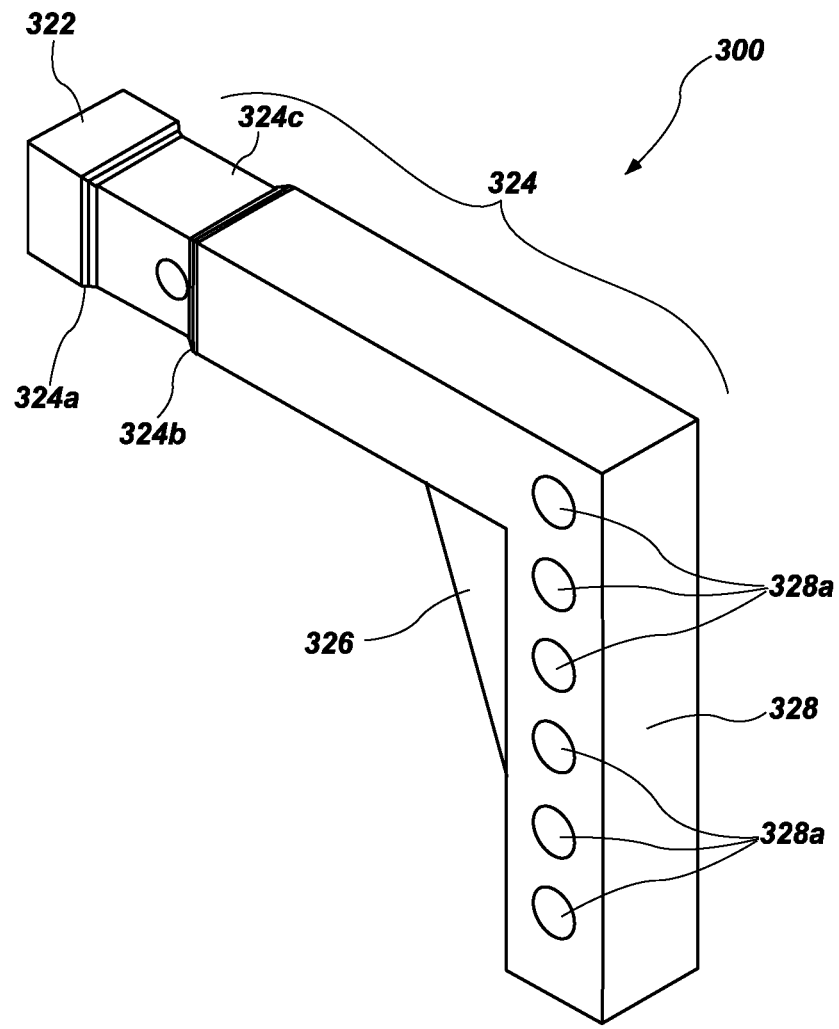
FIG. 14 is a perspective view of another embodiment of the disclosed invention.
Figure 15:
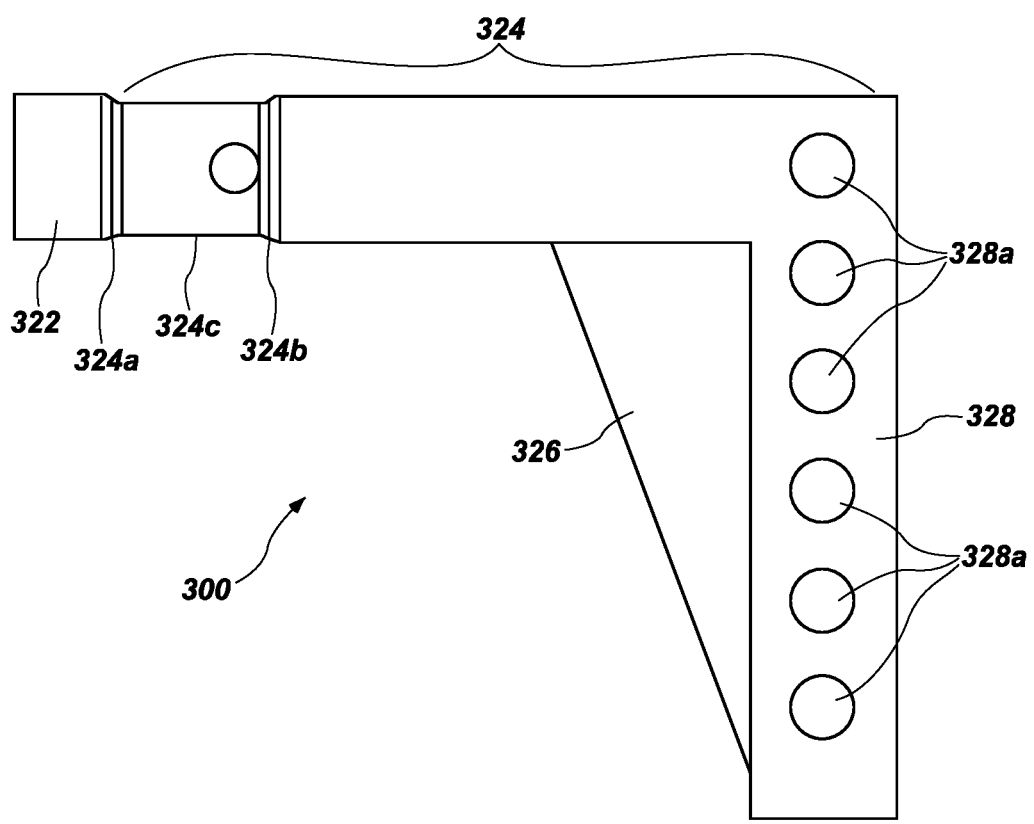
FIG. 15 is a side view of the embodiment of FIG. 14.

Referring now to FIGS. 14 and 15, another shank embodiment includes a shank 300, having a nose 322 a mid-shank 324, a support 326 and a vertical adjustment 328, wherein the nose 322, mid-shank 324, support 326, and vertical adjustment 328, may be substantially the same as those shown and described in FIG. 1 or 10, or of the form or shape, or combination of form or shape, of any or the shank embodiments disclosed herein. Additionally, the vertical adjustment 328 can provide numerous adjustable positions, using holes 328a, which can receive a pin for attachment of a ball hitch or other hitch attachment.

The mid-shank 324 is shown having a decreased perimeter or cross-sectional area, via a reduction 324a, which may be stepped or rounded until merging with a substantially flat or planar portion 324c, immediately adjacent to the nose 322. The substantially planar portion 334c may be substantially parallel with the remaining portion of the mid-shank 324. The mid-shank 324 may also include an increase 324b, which may be stepped or rounded until merging with the substantially planar portion 324c, proximal to the reduction 324a. The combination of the reduction 324a and the increase 324b provides a section of decreased cross-sectional area, compared to the remaining portion of the mid-shank 324, which can allow the shank 300 to continue to more easily and completely enter into the receiver opening after the nose 322 initially enters into the receiver. The step reduction 324a and step increase Various geometries of the mid-shank 324 can be used which can allow the shank 300 to easily and completely enter into a receiver opening.

By reducing the cross-sectional area of the mid-shank 324, the reduction 324a and increase 324b, can improve the speed and time to install the shank 300 into a receiver, reducing, and possibly eliminating any binding that may take place between the shank 300 and the receiver, due to the tight tolerances between the exterior of the mid-shank 324 and the interior of the receiver.

Figure 16:
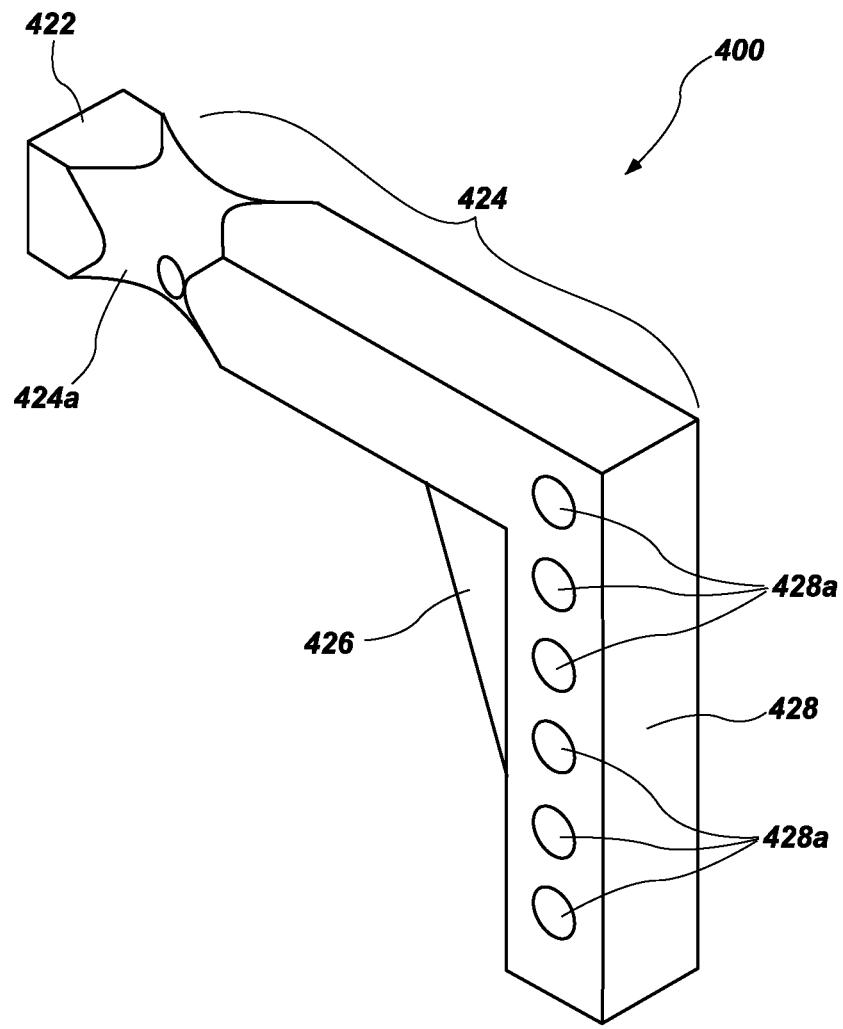
FIG. 16 is a perspective view of another embodiment of the disclosed invention.
Figure 17:
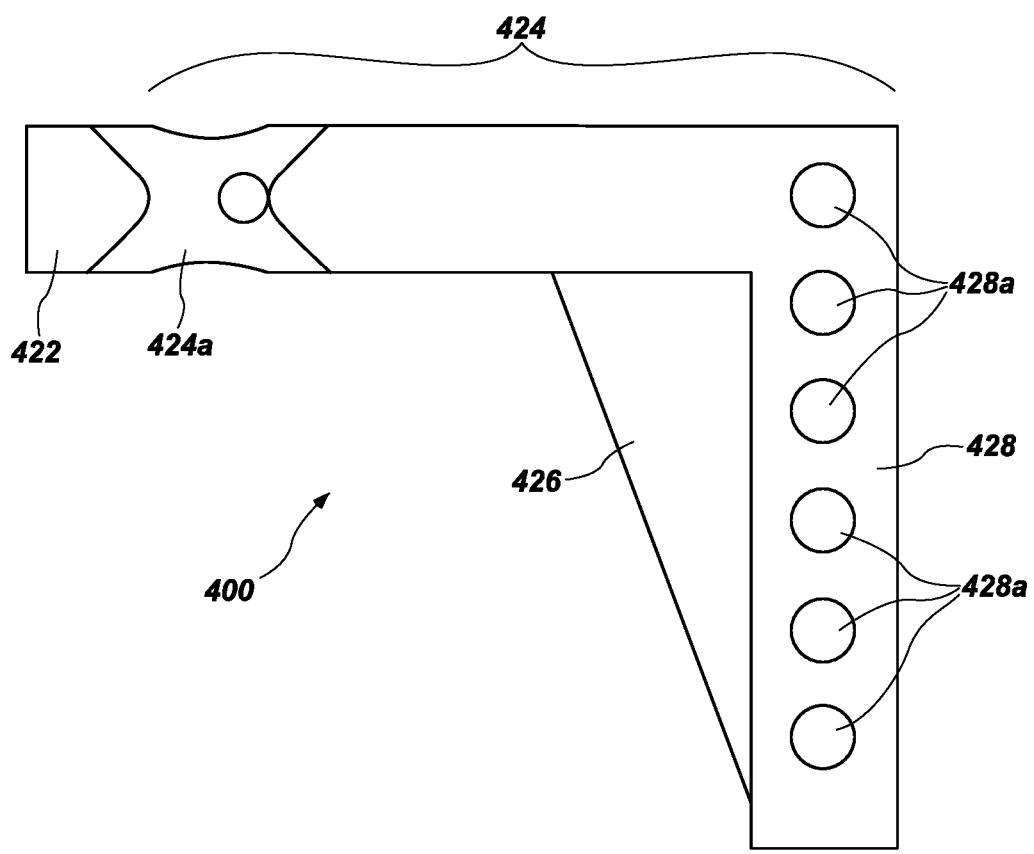
FIG. 17 is a side view of the embodiment of FIG. 16.

Referring now to FIGS. 16 and 17, another shank embodiment includes a shank 400, having a nose 422 a mid-shank 424, a support 426 and a vertical adjustment 428, wherein the nose 422, mid-shank 424, support 426, and vertical adjustment 428, may be substantially the same as those shown and described in FIG. 1 or 10, or of the form or shape, or combination of form or shape, of any or the shank embodiments disclosed herein. Additionally, the vertical adjustment 428 can provide numerous adjustable positions, using holes 428a, which can receive a pin for attachment of a ball hitch or other hitch attachment.

The mid-shank 424 is shown having a decreased perimeter or cross-sectional area, via a concave or curved reduction 424a, immediately adjacent to the nose 422, which can allow the shank 400 to continue to more easily and completely enter into the receiver opening after the nose 422 initially enters into the receiver. The curved reduction 424a may include a double conical shape where the cross-section area reduces immediately adjacent to the nose 422, until the center of the curved reduction 424a, and then increase towards the remainder of the mid-shank 424. Various geometries of the mid-shank 424 can be used which can allow the shank 400 to easily and completely enter into a receiver opening.

By reducing the cross-sectional area of the mid-shank 424, the curved reduction 424a can improve the speed and time to install the shank 400 into a receiver, reducing, and possibly eliminating any binding that may take place between the shank 400 and the receiver, due to the tight tolerances between the exterior of the mid-shank 424 and the interior of the receiver.

Figure 18:
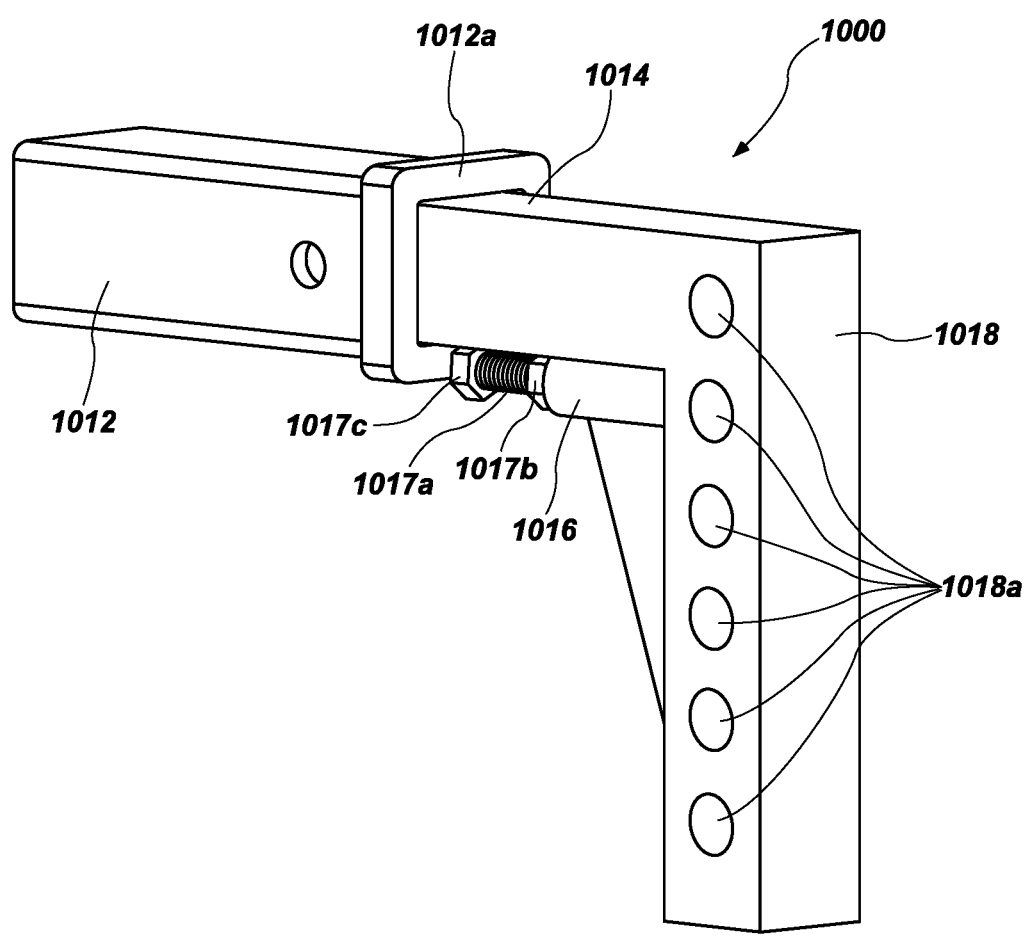
FIG. 18 is a perspective view of another embodiment of the disclosed invention.
Figure 19:
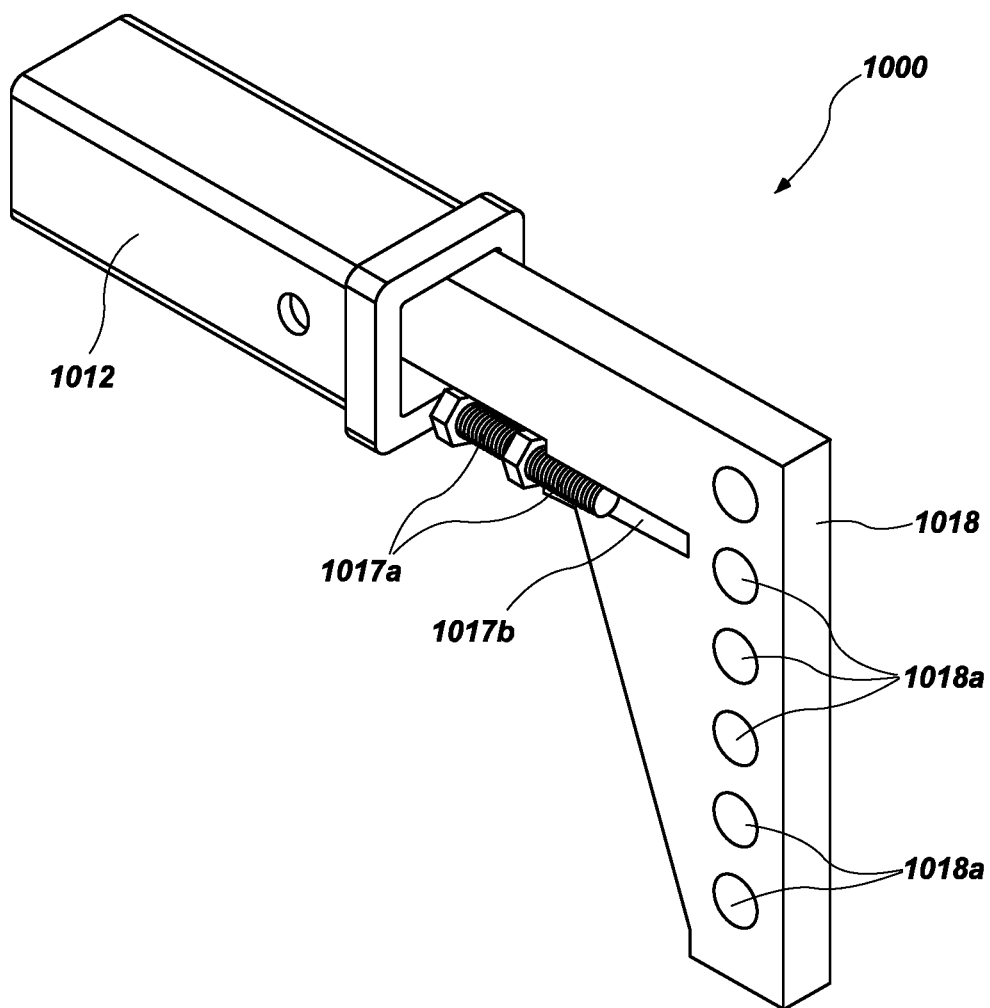
FIG. 19 is a partial cross-sectional view of the embodiment of FIG. 18.

Referring to FIGS. 18 and 19, another shank embodiment includes a shank 1000, partially inserted into a receiver 1012. The shank 1000 also includes a mid-shank 1014, a depth stop 1016 and a vertical adjustment 1018, wherein the mid-shank 1014 and vertical adjustment 1018, and nose (not shown) may be of the form or shape, or combination of form or shape, of any or the shank embodiments disclosed herein. The depth stop 1016 can contact the receiver 1012 when the desired shank 1000 depth has been reached. The depth stop 1016 can be adjustable to alter the desired depth of the shank 1000 within the receiver 1012. This adjustability can be facilitated by a threaded member 1017a which can be received and threadedly engaged with a receiving portion 1017b, which can enable the threaded member 1017a to extend in a proximal/distal, or lateral, direction towards or away from the receiver 1012.

The threaded member 1017a may also include a flat or blunt end 1017c which can be configured to abut a rim 1012a of the receiver 1012, thereby restricting or limiting the depth that the shank 1000 can enter into the receiver 1012. Although only a threaded adjustable depth stop 1016 is shown in FIGS. 18 and 19, alternative depth stops can be used which can limit the depth of the shank 1000 in the receiver 1012, and such depth stops can be fixed in position or adjustable.

Figure 20:
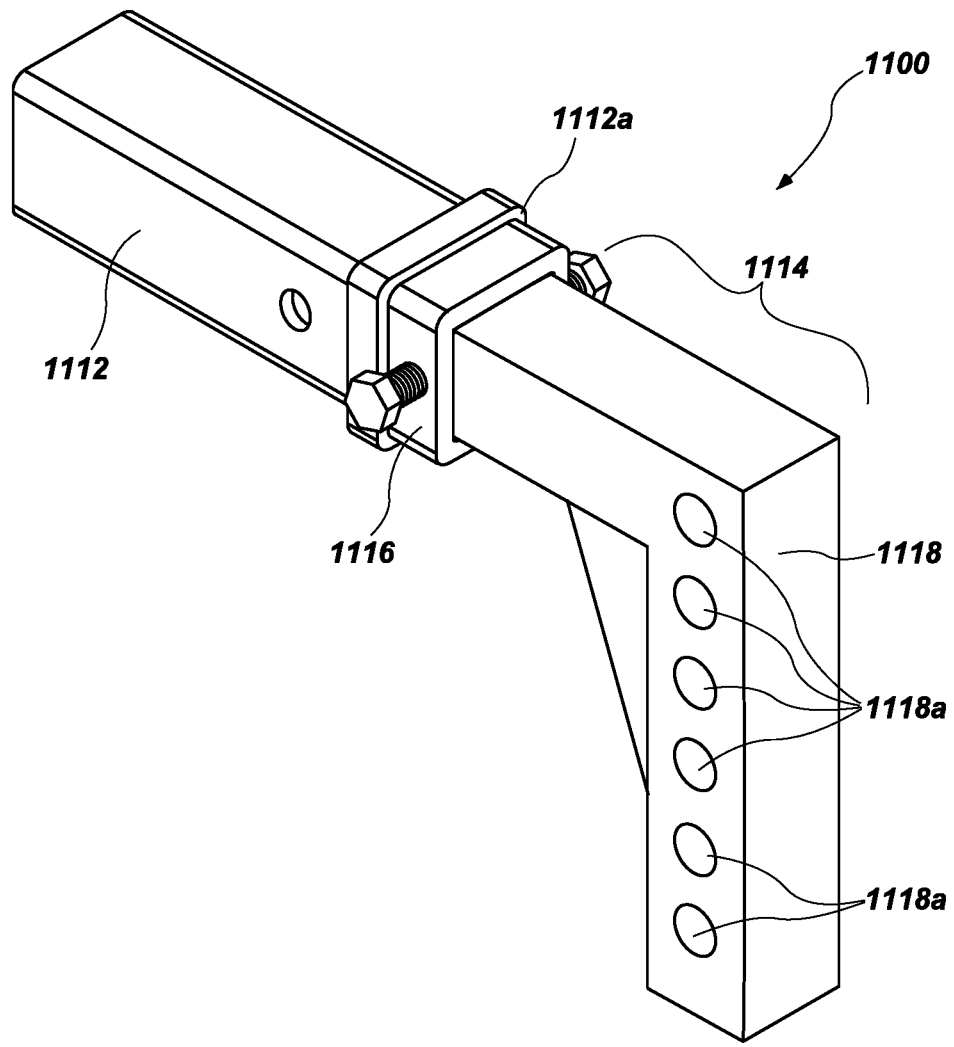
FIG. 20 is a perspective view of another embodiment of the disclosed invention.
Figure 21:
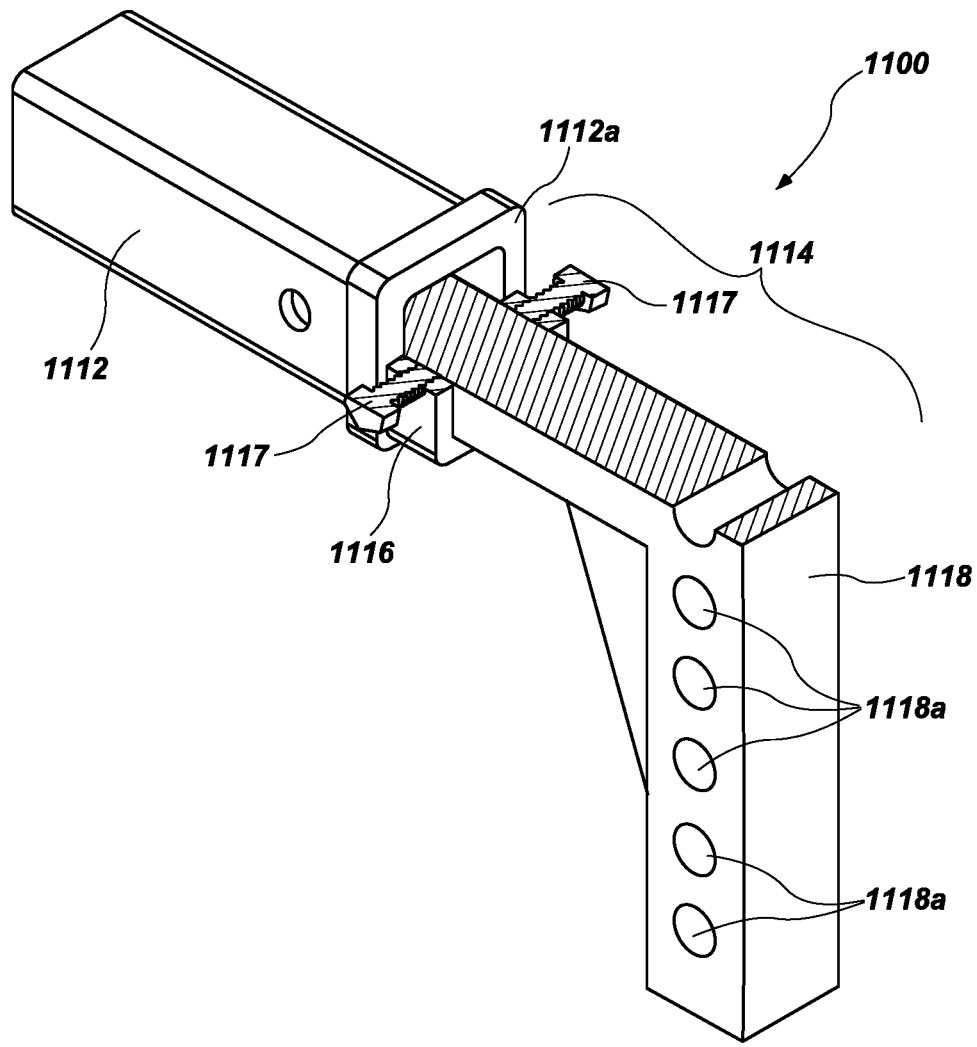
FIG. 21 is a partial cross-sectional view of the embodiment of FIG. 20.

Referring to FIGS. 20 and 21, another shank embodiment includes a shank 1100, partially inserted into a receiver 1112. The shank 1100 also includes a mid-shank 1114, a depth stop 1116 and a vertical adjustment 1118, wherein the mid-shank 1114 and vertical adjustment 1118, and nose (not shown) may be of the form or shape, or combination of form or shape, of any or the shank embodiments disclosed herein.

The depth stop 1116 can contact the receiver 1112 when the desired shank 1100 depth has been reached. The depth stop 1116 may be formed as a collar having an increased diameter when compared to the mid-shank 1114 and can be adjustably secured or coupled to the mid-shank 1114 via bolts or fasteners 1117, which enables the depth stop 1116 to alter or change the depth of the shank 1100 within the receiver 1112 or the position of the depth stop 1116 with respect to the mid-shank 1114.

The depth stop 1116 may have a substantially planer or blunt surface which can be configured to abut a rim 1112a of the receiver 1112, thereby restricting or limiting the depth that the shank 1100 can enter into the receiver 1112.

Figure 22:
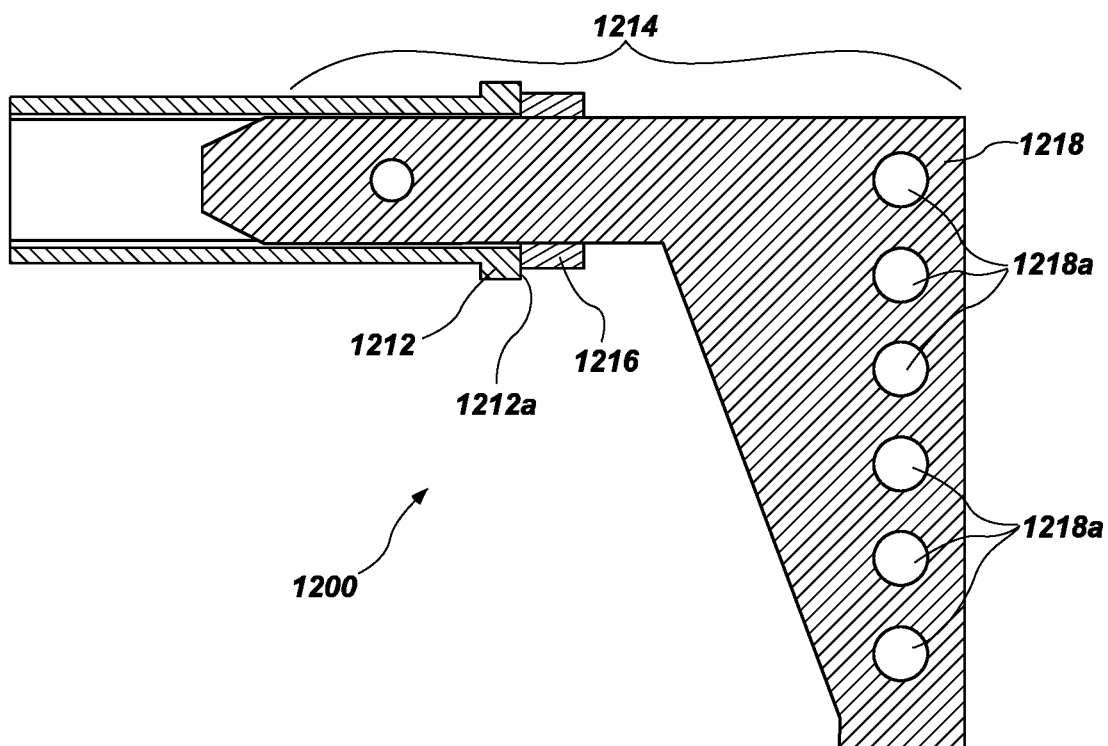
FIG. 22 is a cross-sectional view of another embodiment of the disclosed invention.
Figure 23:
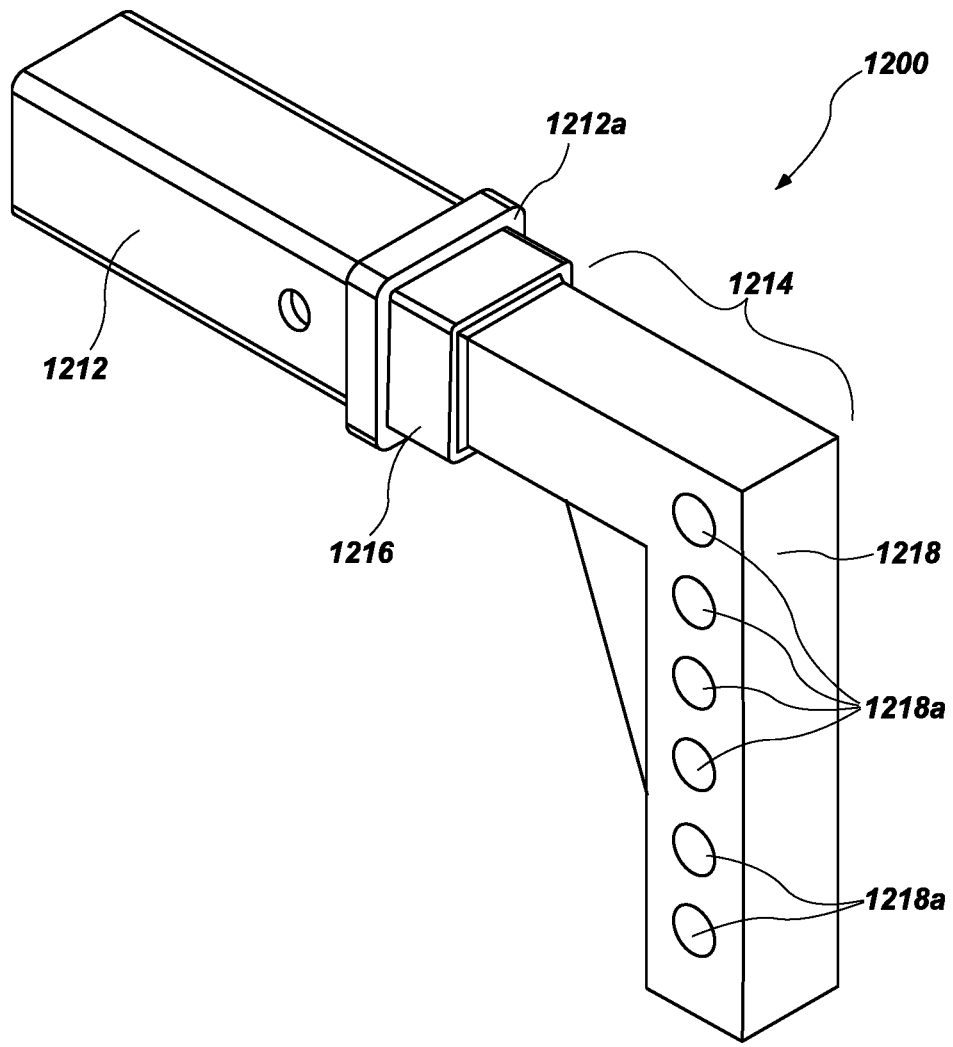
FIG. 23 is a perspective view of the embodiment of FIG. 22.
Figure 24:
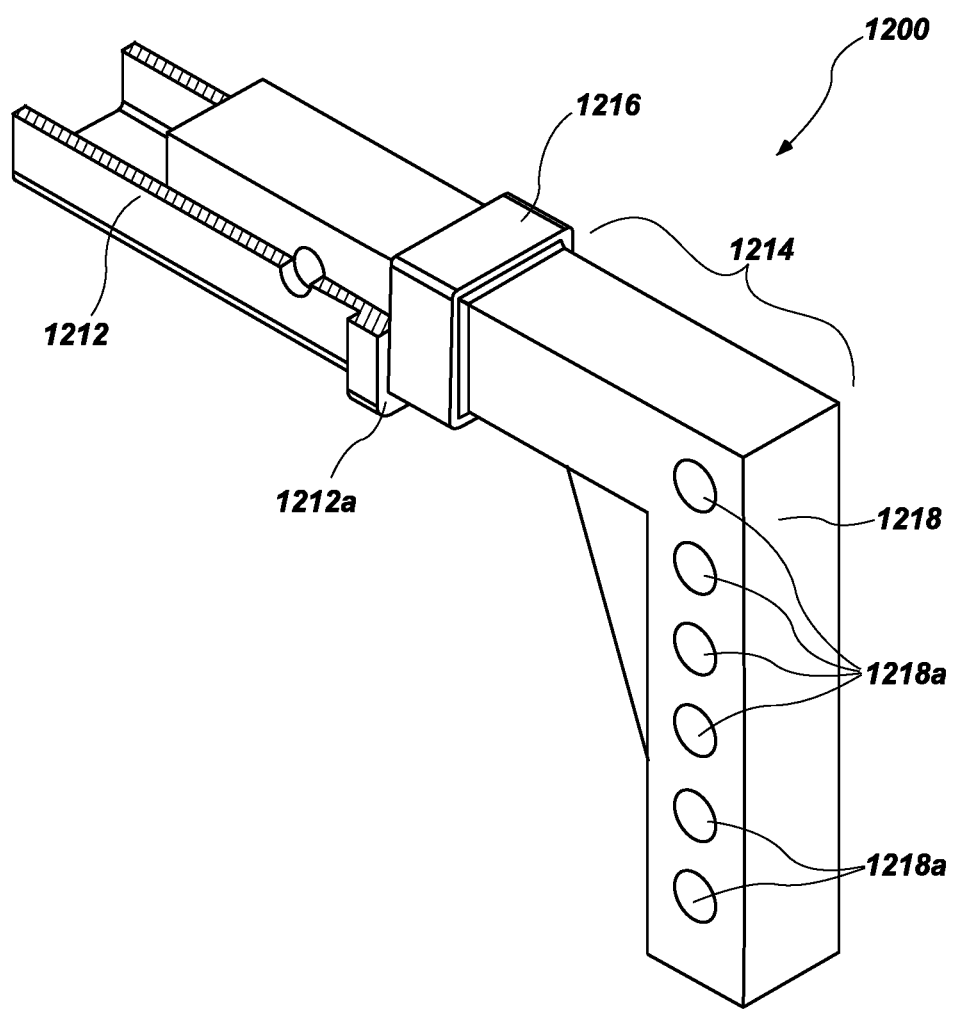
FIG. 24 is a partial cut-away view of the embodiment of FIG. 22.

Referring to FIGS. 22-24, another shank embodiment includes a shank 1200, partially inserted into a receiver 1212. The shank 1200 also includes a mid-shank 1214, a depth stop 1216 and a vertical adjustment 1218, wherein the mid-shank 1214 and vertical adjustment 1218, and nose (not shown) may be of the form or shape, or combination of form or shape, of any or the shank embodiments disclosed herein.

The depth stop 1216 can contact the receiver 1212 when the desired shank 1200 depth has been reached. The depth stop 1216 be formed as a collar having an increased diameter when compared to the mid-shank 1214 and can be fixed or secured to the mid-shank 1214, at a desired depth of the shank 1200 within the receiver 1212.

The depth stop 1216 may have a substantially planer or blunt surface which can be configured to abut a rim 1212a of the receiver 1212, thereby restricting or limiting the depth that the shank 1200 can enter into the receiver 1212.

Figure 25:
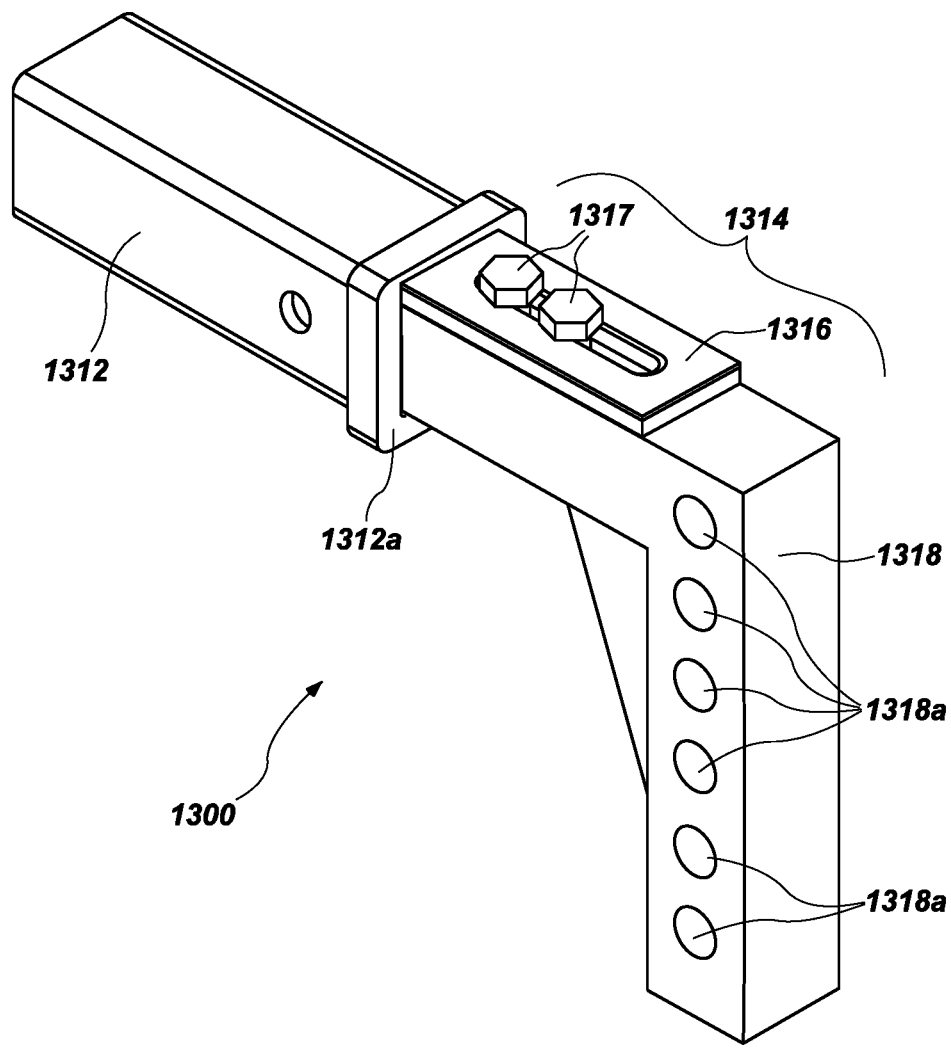
FIG. 25 is a perspective view of another embodiment of the disclosed invention.
Figure 26:
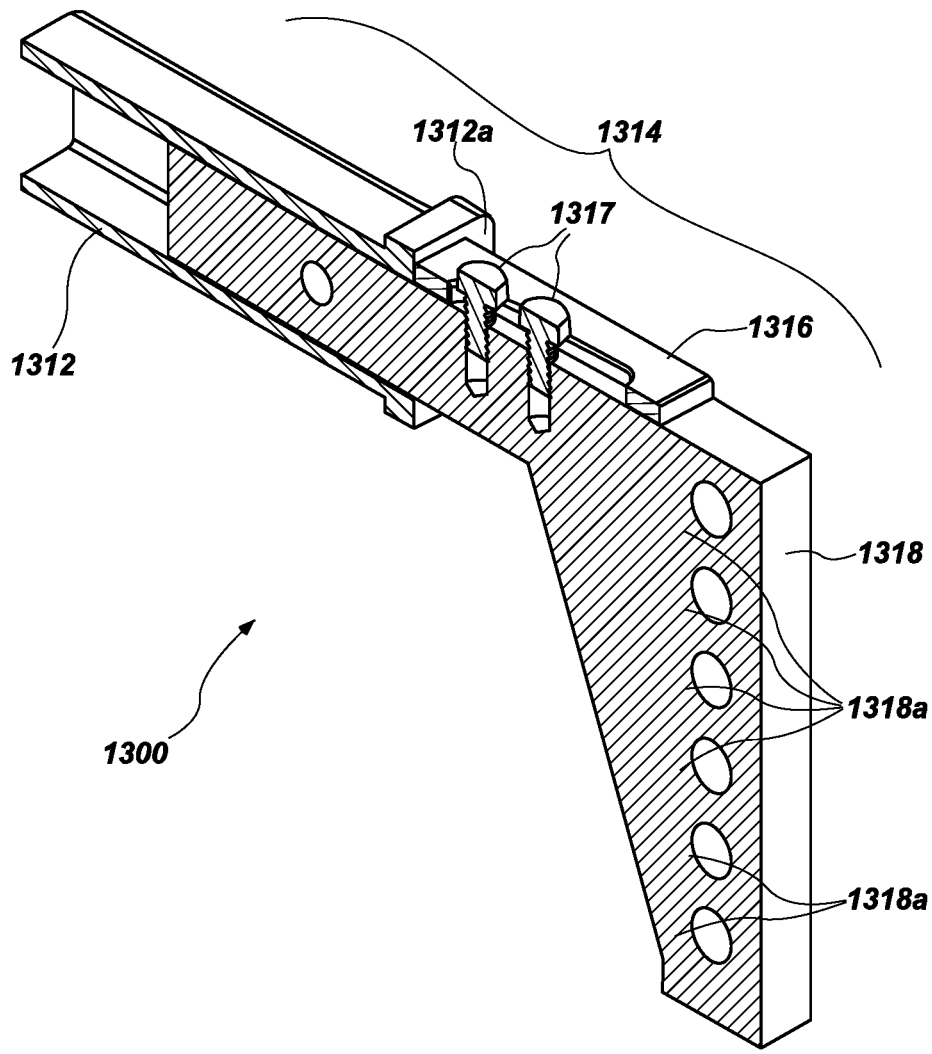
FIG. 26 is a cross-sectional view of the embodiment of FIG. 25.

Referring to FIGS. 25 and 26, another shank embodiment includes a shank 1300, partially inserted into a receiver 1312. The shank 1300 also includes a mid-shank 1314, a depth stop 1316 and a vertical adjustment 1318, wherein the mid-shank 1314 and vertical adjustment 1318, and nose (not shown) may be of the form or shape, or combination of form or shape, of any or the shank embodiments disclosed herein.

The depth stop 1316 can contact the receiver 1312 when the desired shank 1300 depth has been reached. The depth stop 1316 be formed as a plate essentially increasing the diameter of the mid-shank 1314, and the plate positioning can be adjustably secured to the mid-shank 1314 via bolts or fasteners 1317, to alter the desired depth of the shank 1300 within the receiver 1312. The depth stop 1316 may have a substantially planer or blunt surface which can be configured to abut a rim 1312a of the receiver 1312, thereby restricting or limiting the depth that the shank 1300 can enter into the receiver 1312.

Figure 27:
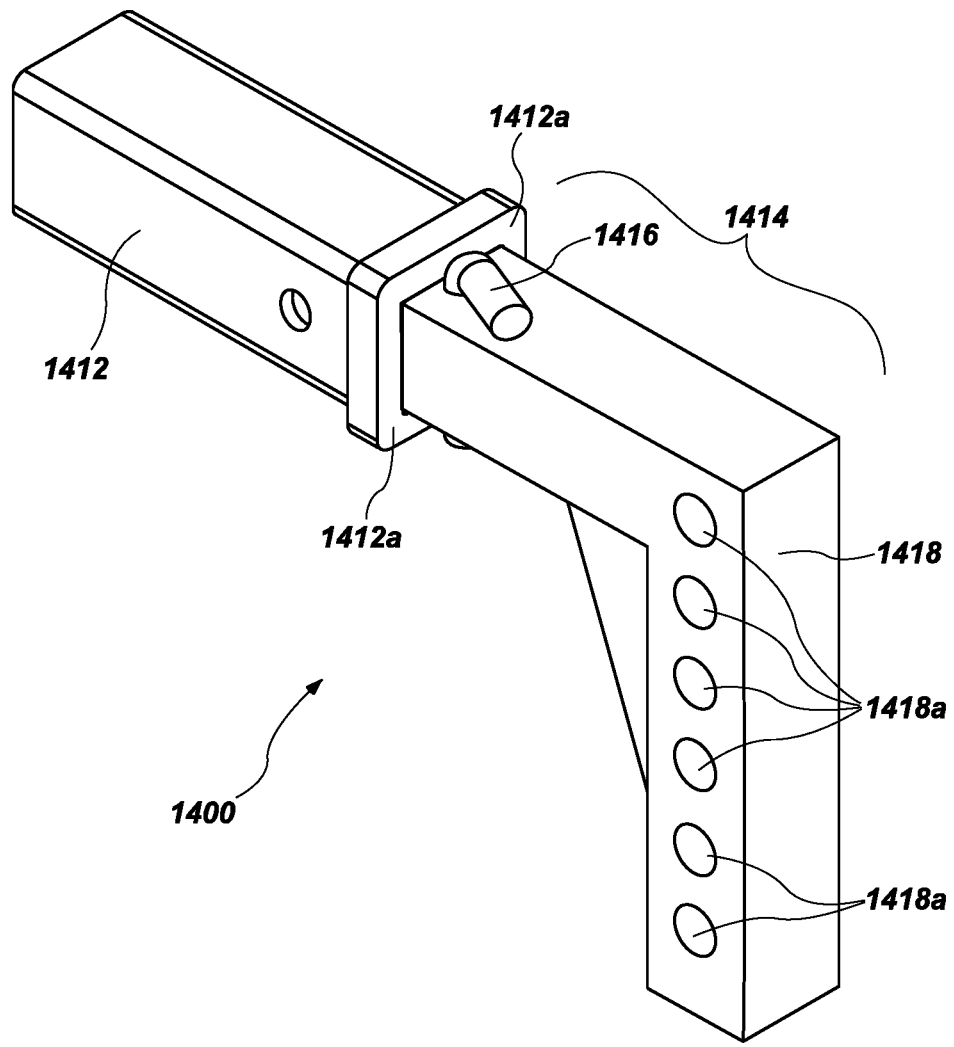
FIG. 27 is a perspective view of another embodiment of the disclosed invention.
Figure 28:
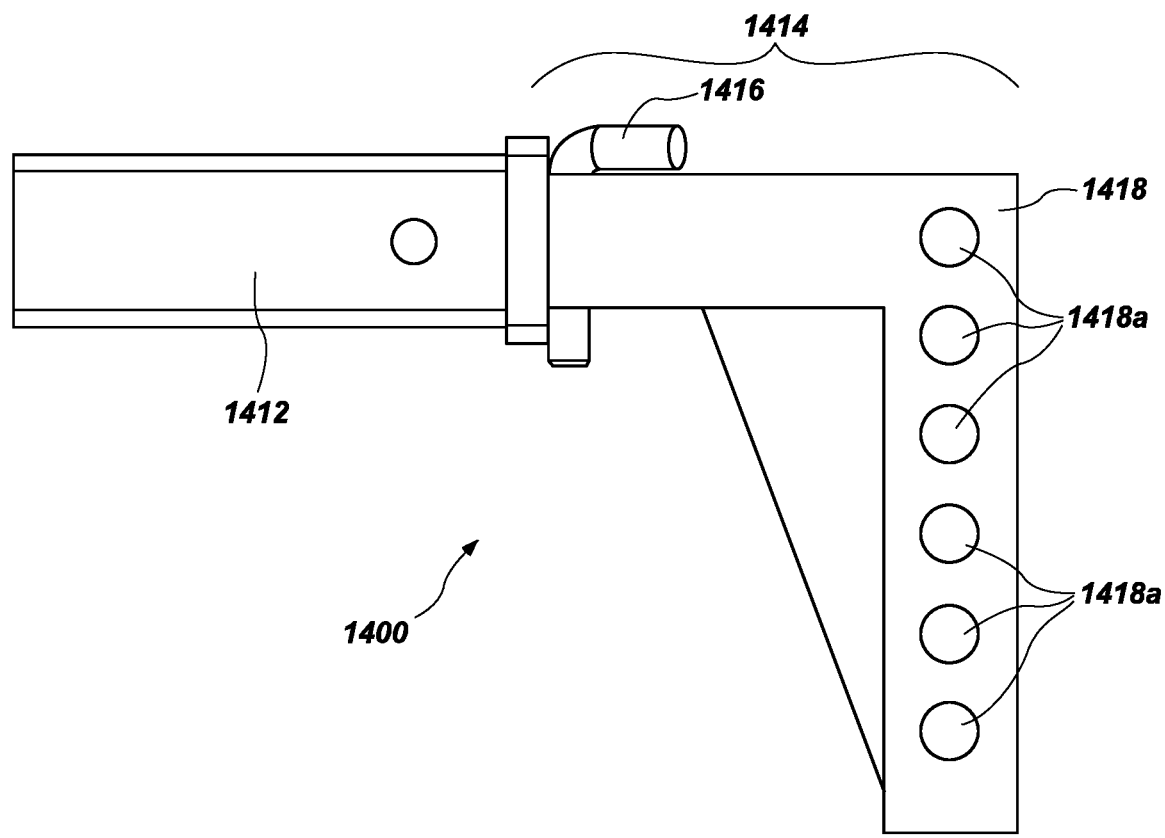
FIG. 28 is a side view of the embodiment of FIG. 27.

Referring to FIGS. 27 and 28, another shank embodiment includes a shank 1400, partially inserted into a receiver 1412. The shank 1400 also includes a mid-shank 1414, a depth stop 1416 and a vertical adjustment 1418, wherein the mid-shank 1414 and vertical adjustment 1418, and nose (not shown) may be of the form or shape, or combination of form or shape, of any or the shank embodiments disclosed herein.

The depth stop 1416 can contact the receiver 1412 when the desired shank 1400 depth has been reached. The depth stop 1416 be formed as a pin which can be inserted into and laterally fixed to the mid-shank 1414, to alter the desired depth of the shank 1400 within the receiver 1412. The depth stop 1416 may be configured to abut a rim 1412a of the receiver 1412, thereby restricting or limiting the depth that the shank 1400 can enter into the receiver 1412.

Figure 29:
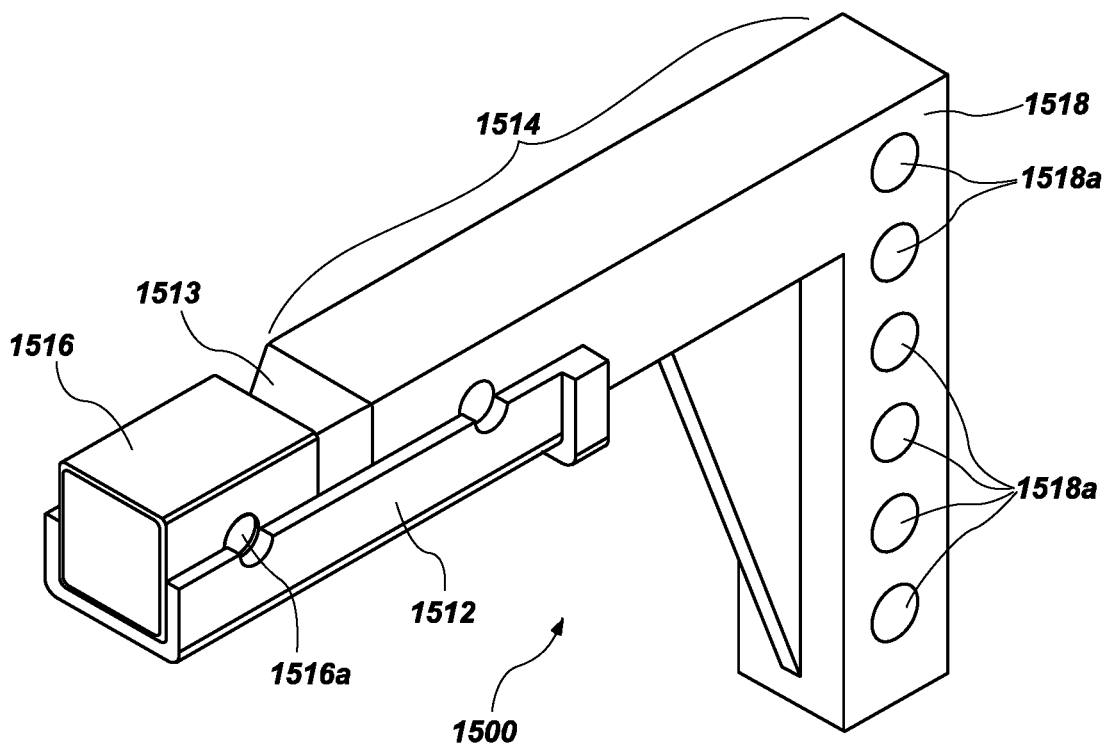
FIG. 29 is a perspective view of another embodiment of the disclosed invention.
Figure 30:
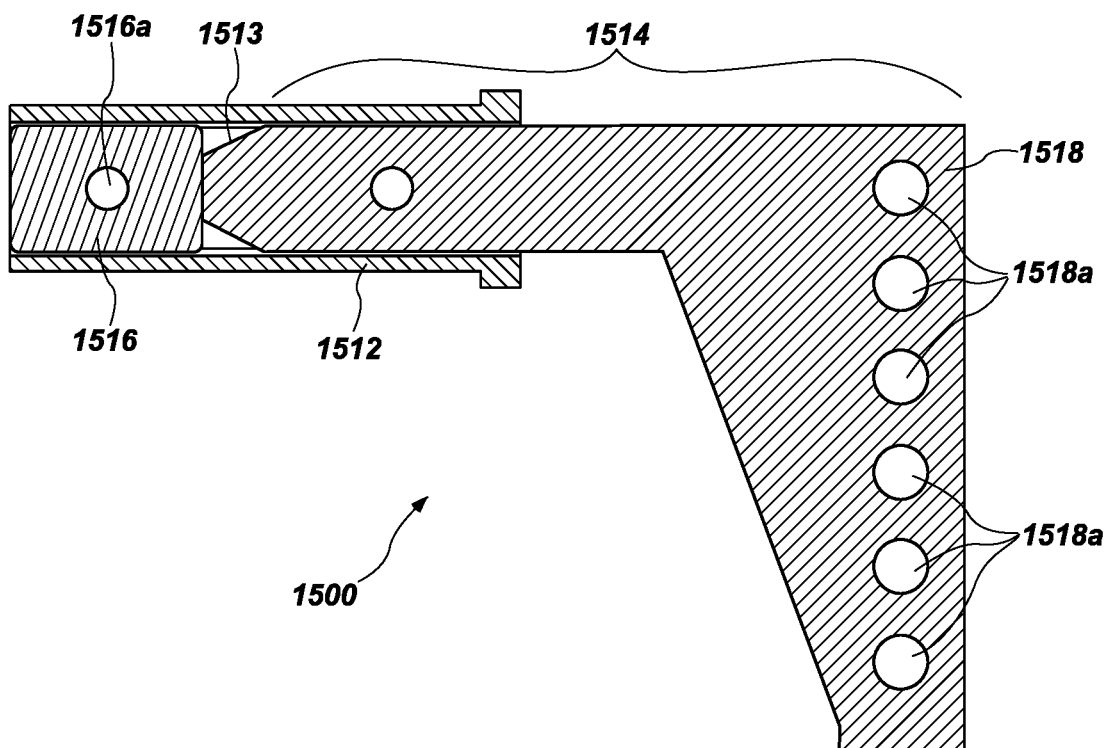
FIG. 30 is a cross-sectional view of the embodiment of FIG. 29.

Referring to FIGS. 29 and 30, another shank embodiment includes a shank 1500, partially inserted into a receiver 1512. The shank 1500 also includes a nose 1513, mid-shank 1514, a depth stop 1516 and a vertical adjustment 1518, wherein the nose 1513, mid-shank 1514, vertical adjustment 1518, may be of the form or shape, or combination of form or shape, of any or the shank embodiments disclosed herein.

The depth stop 1516 can be formed as a plug which can be inserted into the receiver 1512 and attached to the receiver at a desired depth. The depth stop 1516 may be attached to the receiver via a pin (not shown) inserted into hole 1516a which extends through both the receiver 1512 and the depth stop 1516, or by any other suitable attachment mechanism. The depth stop 1516, when attached to the receiver 1512, will limit or restrict the depth that the shank 1500 can enter into the receiver 1512, by abutting the nose 1513 of the shank 1500.

Figure 31:
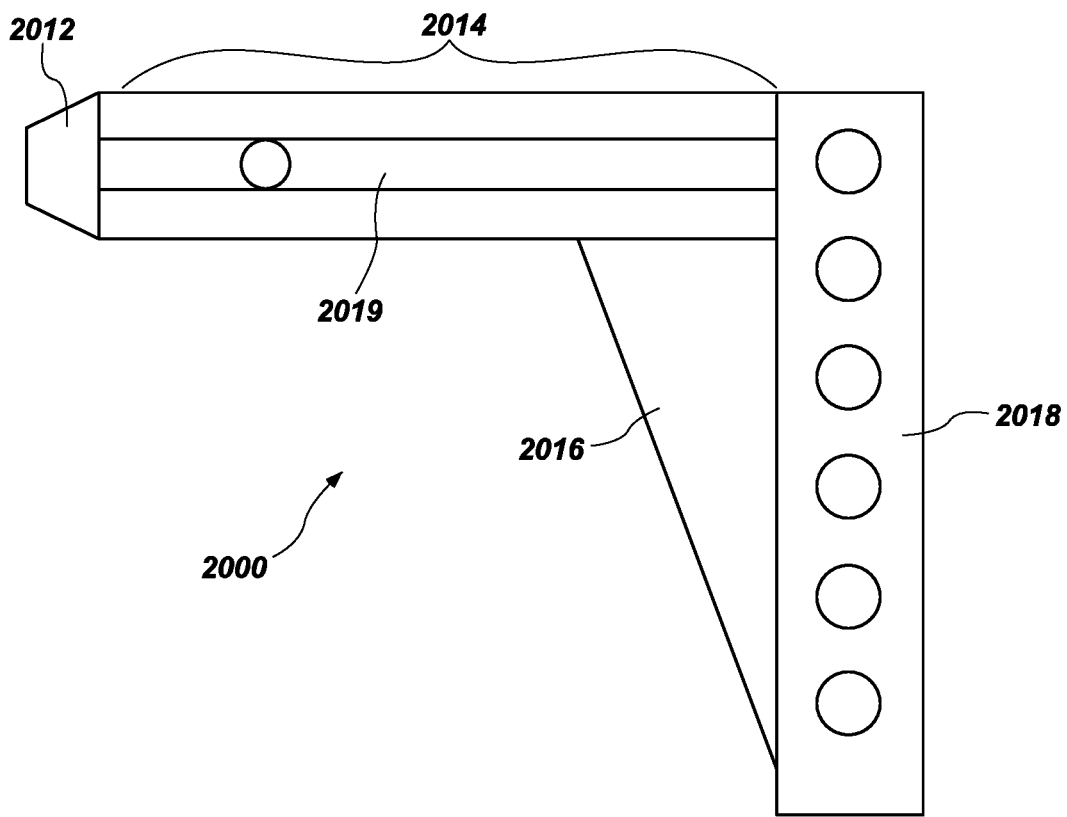
FIG. 31 is a side view of another embodiment of the disclosed invention.
Figure 32:
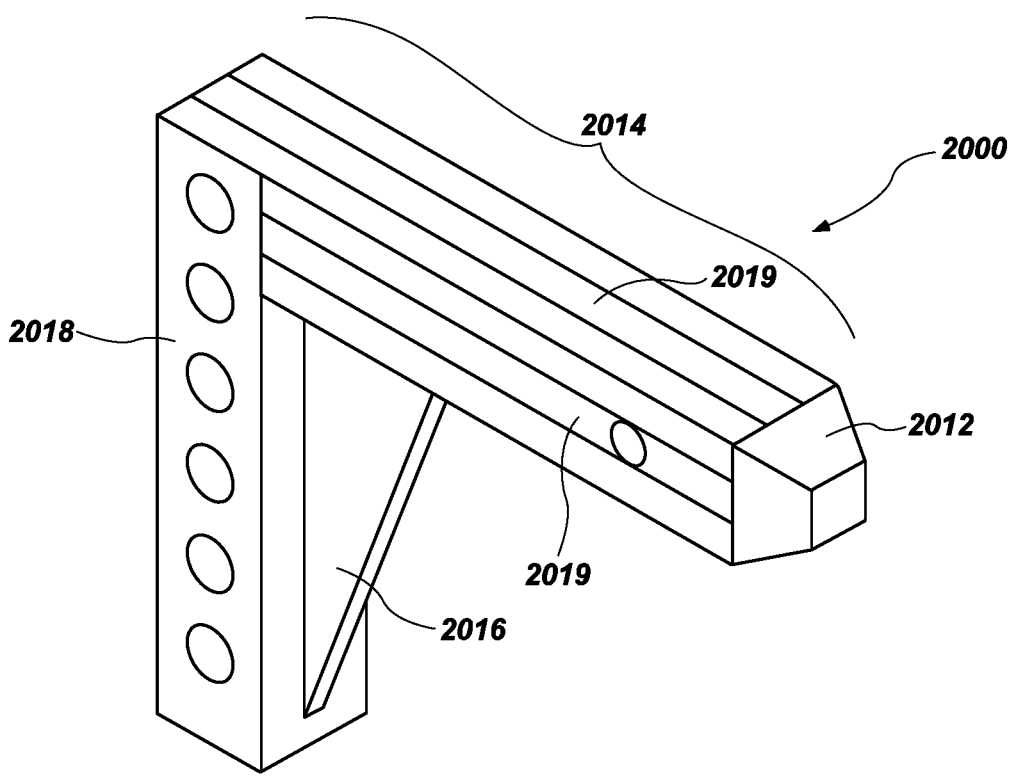
FIG. 32 is a perspective view of the embodiment of FIG. 31.

Referring to FIGS. 31 and 32, another shank embodiment includes a shank 2000, having a nose 2012 a mid-shank 2014, a support 2016 and a vertical adjustment 2018, wherein the mid-shank 2014 and vertical adjustment 2018, and nose 2012 may be of the form or shape, or combination of form or shape, of any or the shank embodiments disclosed herein. The shank 2000 also includes an alignment indicator 2019, shown as a horizontal, or substantially horizontal, stripe which extends substantially linearly, or substantially horizontally, along the mid-shank 2014 from the vertical adjustment 2018 to the nose 2012. The term "substantially horizontally," as used herein and throughout this specification, may include horizontal or a position or direction that is within 15 degrees of horizontal, or 15 degrees from horizontal. The alignment indicator 2019 may be reflective, or at least more reflective than the rest of the shank 2000, including the nose 2012 and the mid-shank 2014, and/or a different color, such as red, yellow, or orange, for example, than the rest of the shank 2000, including the nose 2012 and mid-shank 2014, to more easily distinguish it from the rest of the shank 2000, and enable a user to visually identify the orientation of the shank 2000, such that the alignment indicator can provide a visual indicator of the orientation of the shank 200. The alignment indicator may also be recessed along the mid-shank 2014, which can reduce the likelihood that the alignment indicator 2019 may be scraped off the mid-shank 2014 during use. The shank 2000, for example, may be inserted into a receiver (not shown) of a vehicle, as the vehicle is reversed into engagement with the shank 2000.

The alignment indicator 2019 may also be present on each side of the mid-shank 2014, including top and bottom surfaces. Alternatively, the alignment indicator 2019 can be present on a single side of the mid-shank 2014 or any desired combination of sides, including only the top and bottom surfaces of the mid-shank 2014. Additionally, the alignment indicator 2019 can be removably attached to the mid-shank 2014, permanently fixed thereto, or integrated with the mid-shank 2014. Therefore, the alignment indicator 2019 can help a driver of the vehicle to more easily see the alignment of the shank 2000, using rear view mirror or a "back-up camera", for example, and thereby, improve the speed and efficiency of inserting the shank 2000 into the receiver. The alignment indicator 2019 can alternatively be a structural or textured feature of the shank 2000, which can also run substantially parallel with the mid-shank 2014, in the same way the horizontal stripe of the alignment indicator 2019 runs substantially parallel to the mid-shank 2014.

Figure 33:
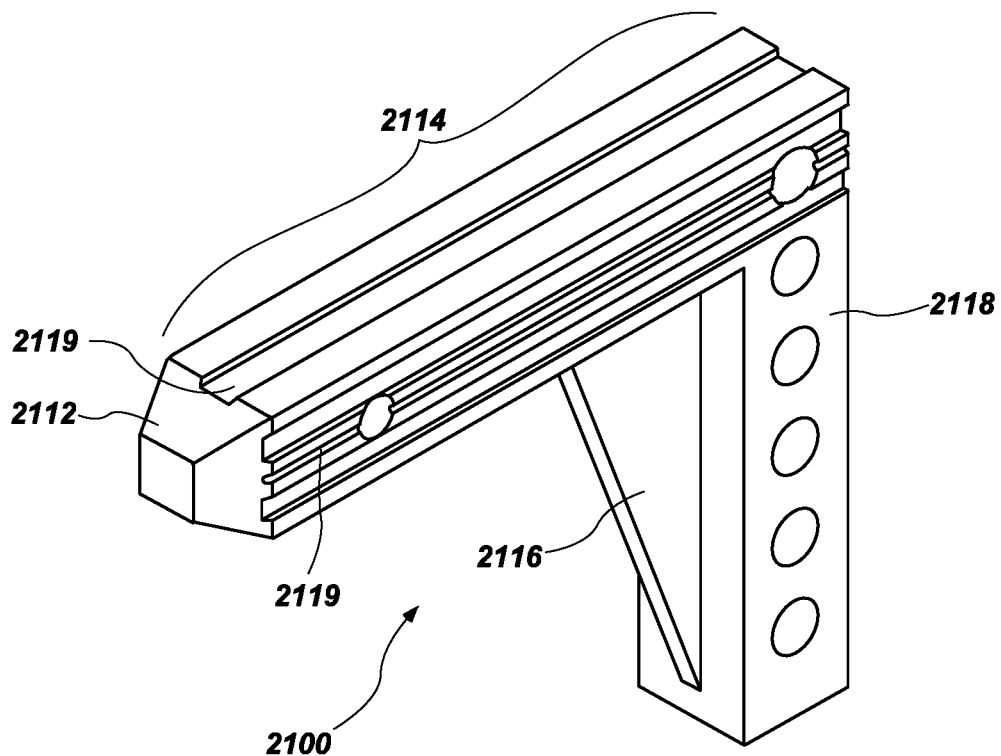
FIG. 33 is a perspective view of another embodiment of the disclosed invention.
Figure 34:
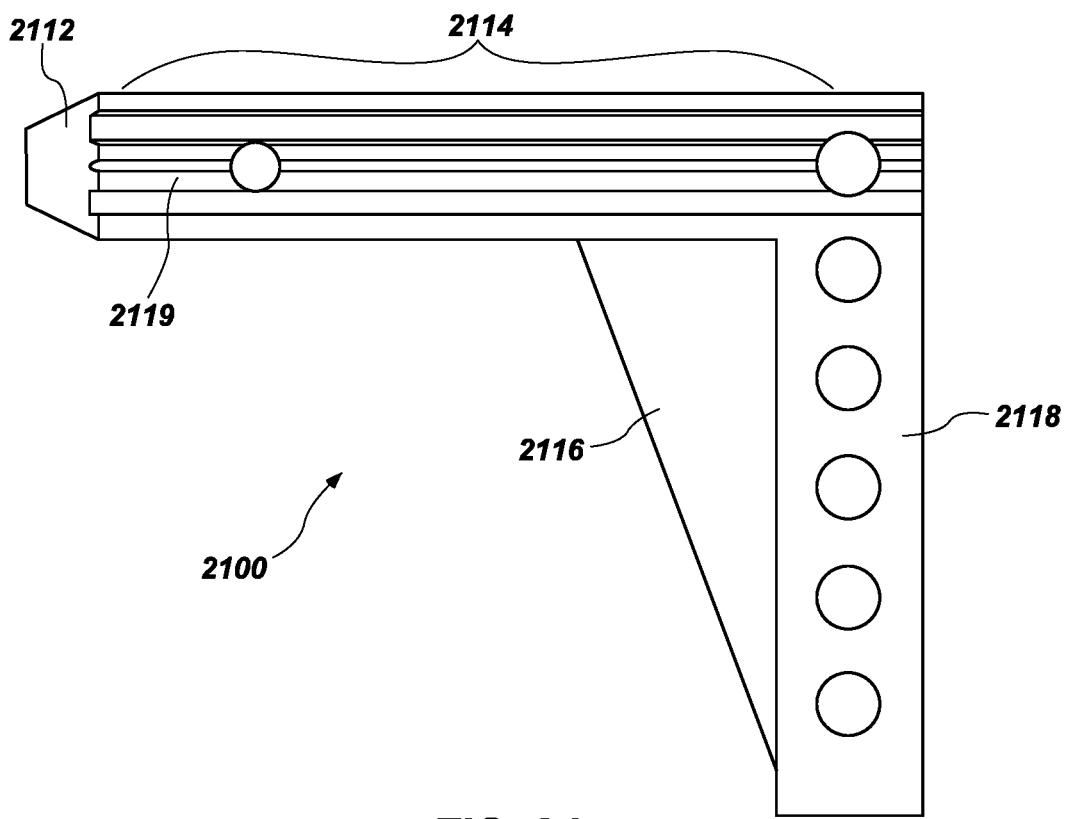
FIG. 34 is a side view of the embodiment of FIG. 33.

Referring to FIGS. 33 and 34, another shank embodiment includes a shank 2100, having a nose 2112 a mid-shank 2114, a support 2116 and a vertical adjustment 2118, wherein the mid-shank 2114 and vertical adjustment 2118, and nose 2112 may be of the form or shape, or combination of form or shape, of any or the shank embodiments disclosed herein. The shank 2100 also includes an alignment indicator 2119, shown as multiple horizontal channels creating raised horizontal stripes (as shown on the side surface of the mid-shank 2114), or a single horizontal channel (as shown on the top surface of the mid-shank 2114) which extends substantially linearly from the vertical adjustment 2118 to the nose 2112. The alignment indicator 2119 may be a different color or more reflective than the rest of the shank 2100, in a similar or identical manner as discussed in previously discussed embodiments, and may be integrally formed into the shank 2100, to more easily distinguish it from the rest of the shank 2100. The shank 2100, for example, may be inserted into a receiver (not shown) of a vehicle, as the vehicle is reversed into engagement with the shank 2100.

The alignment indicator 2119 may also be present on each side of the mid-shank 2114, or alternatively, the alignment indicator 2119 can be present on a single side of the mid-shank 2114 or any desired combination of sides. Therefore, the alignment indicator 2119 can help a driver of the vehicle to more easily see the alignment of the shank 2100, using rear view mirror or a "back-up camera", for example, and thereby, improve the speed and efficiency of inserting the shank 2100 into the receiver.

Figure 35:
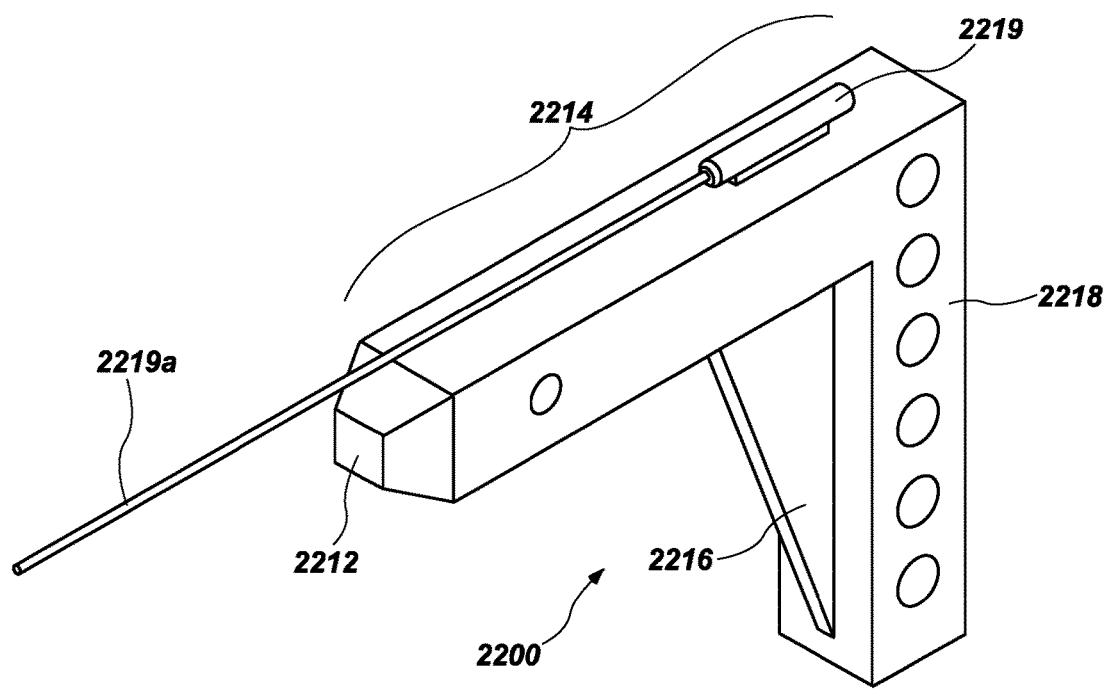
FIG. 35 is a perspective view of another embodiment of the disclosed invention.
Figure 36:
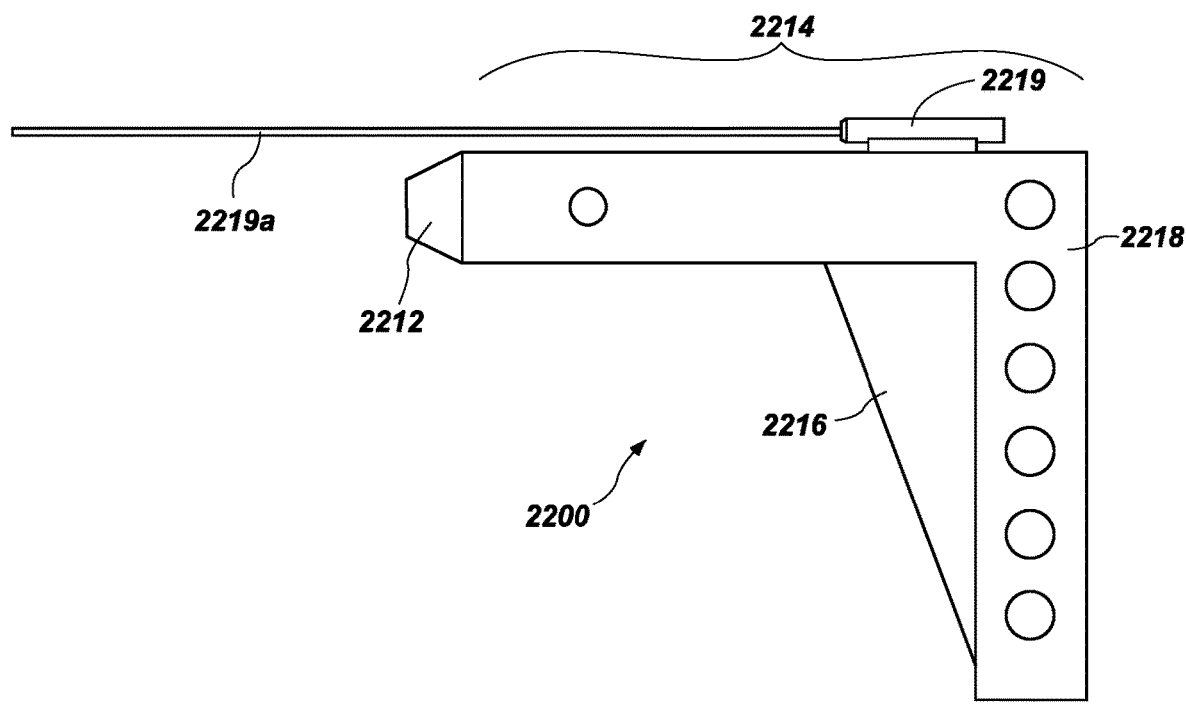
FIG. 36 is a side view of the embodiment of FIG. 35.

Referring to FIGS. 35 and 36, another shank embodiment includes a shank 2200, having a nose 2212 a mid-shank 2214, a support 2216 and a vertical adjustment 2218, wherein the mid-shank 2214 and vertical adjustment 2218, and nose 2212 may be of the form or shape, or combination of form or shape, of any or the shank embodiments disclosed herein. The shank 2200 also includes an alignment indicator 2219, shown as light or laser pointer, emitting a linear beam of light 2219a from the alignment indicator 2219 toward a receiver (not shown). The alignment indicator 2219 may be integrally formed, fixed or removably attached, to the shank 2200, and enable a driver to align the receiver with the shank 2200, by following the emitted light beam 2219a. Alternatively, the alignment indicator 2219 may be integrally formed, fixed or removably attached, to the receiver, pointing the light beam 2219a toward the shank 2200. In another embodiment, the alignment indicator 2219 may, include a cord retraction device which can retain a cord (the cord may instead constitute a flexible cable or any suitable flexible strand), which can be connected to the receiver, which can be retracted into the alignment indicator 2219 as the receiver approaches the shank 2200. The cord can then enable a driver to align the receiver with the shank 2200, by following the cord. The shank 2200, for example, may then be inserted into a receiver (not shown) of a vehicle, as the vehicle is reversed into engagement with the shank 2200.

Therefore, the alignment indicator 2219 can help a driver of the vehicle to more easily see the alignment of the shank 2200, using rear view mirror or a "back-up camera", for example, and thereby, improve the speed and efficiency of inserting the shank 2200 into the receiver.

Figure 37:
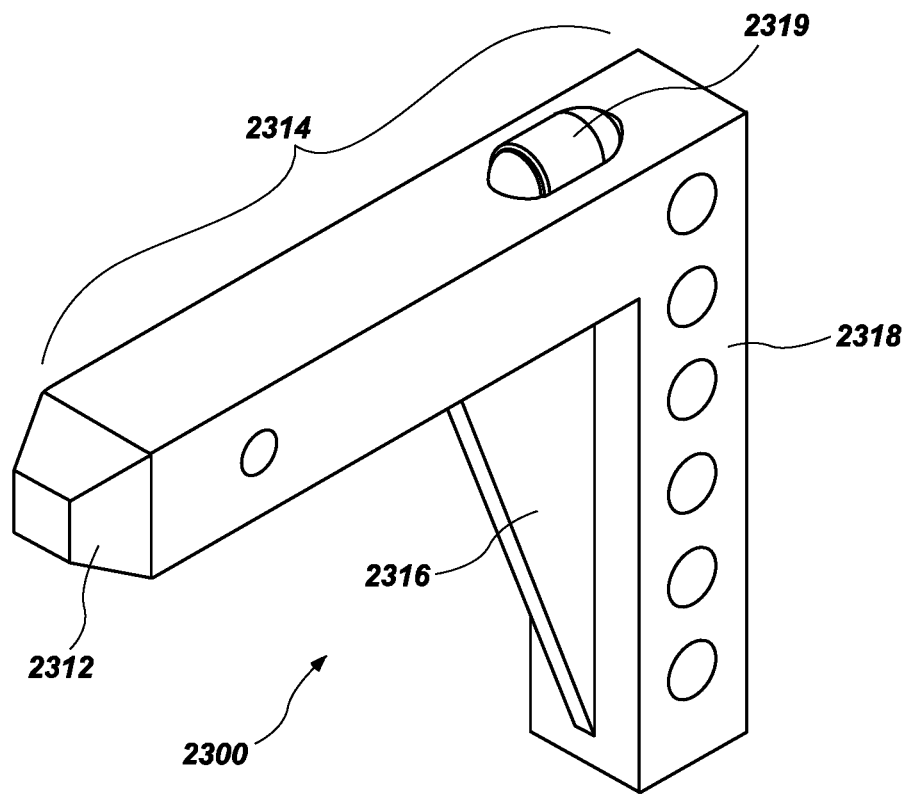
FIG. 37 is a perspective view of another embodiment of the disclosed invention.
Figure 38:
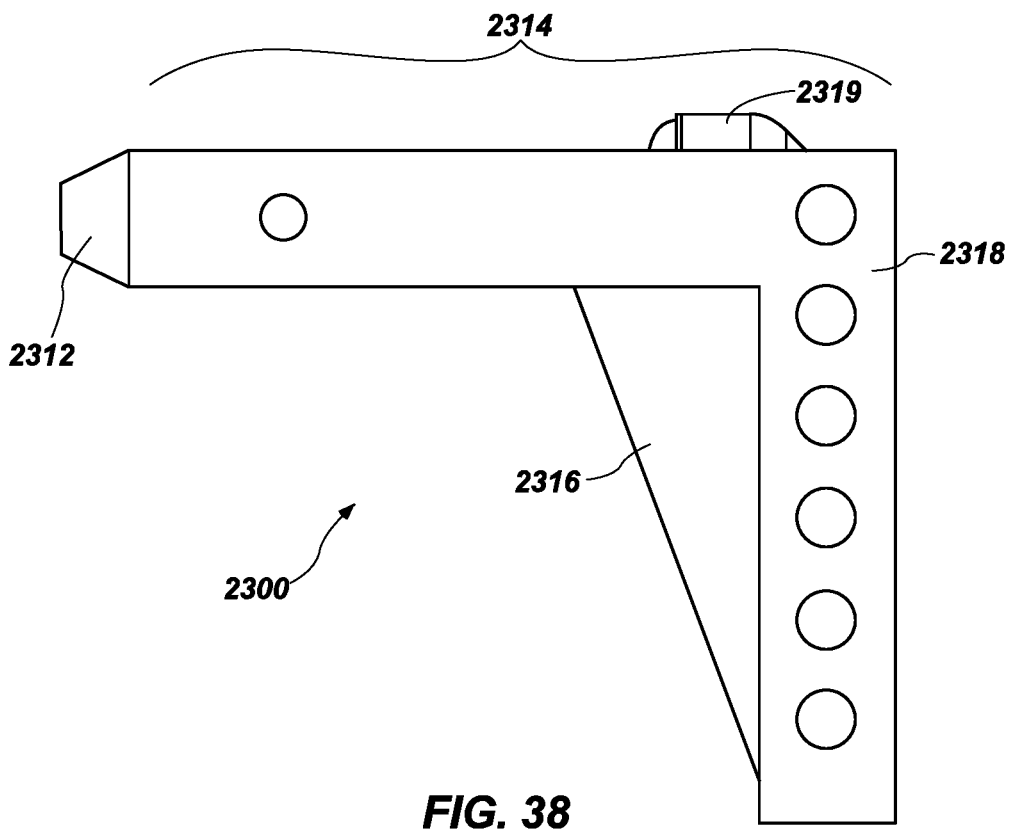
FIG. 38 is a side view of the embodiment of FIG. 37.

Referring to FIGS. 37 and 38, another shank embodiment includes a shank 2300, having a nose 2312 a mid-shank 2314, a support 2316 and a vertical adjustment 2318, wherein the mid-shank 2314 and vertical adjustment 2318, and nose 2312 may be of the form or shape, or combination of form or shape, of any or the shank embodiments disclosed herein. The shank 2300 also includes an alignment indicator 2319, shown as light emitting device, emitting light from the alignment indicator 2319 illuminating the area surrounding, and including, the shank 2314 (particularly in low light conditions). The alignment indicator 2319 may be integrally formed, fixed, or removably attached, to the shank 2300 and enable a driver to better see and align the receiver with the shank 2300. The shank 2300, for example, may be inserted into a receiver (not shown) of a vehicle, as the vehicle is reversed into engagement with the shank 2300.

Therefore, the alignment indicator 2319 can help a driver of the vehicle to more easily see the alignment of the shank 2300, using rear view mirror or a "back-up camera", for example, and thereby, improve the speed and efficiency of inserting the shank 2300 into the receiver.

Figure 39:
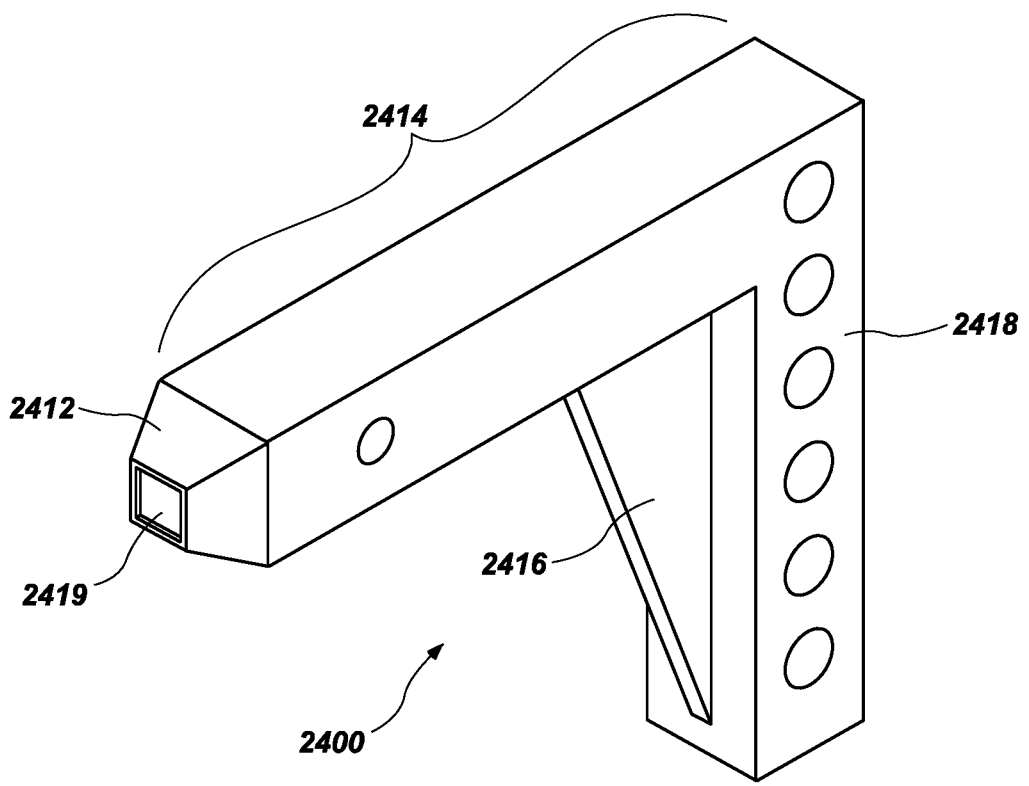
FIG. 39 is a perspective view of another embodiment of the disclosed invention.
Figure 40:
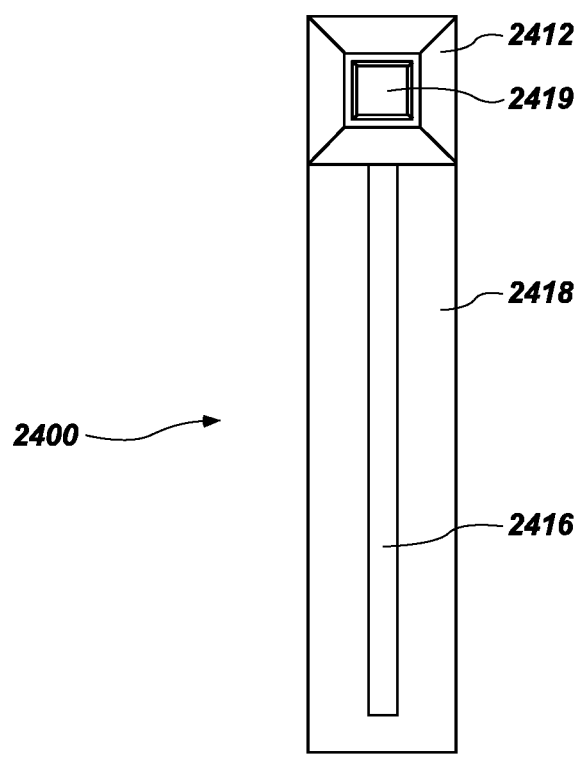
FIG. 40 is a front view of the embodiment of FIG. 39.

Referring to FIGS. 39 and 40, another shank embodiment includes a shank 2400, having a nose 2412 a mid-shank 2414, a support 2416 and a vertical adjustment 2418, wherein the mid-shank 2414 and vertical adjustment 2418, and nose 2412 may be of the form or shape, or combination of form or shape, of any or the shank embodiments disclosed herein. The shank 2400 also includes an alignment indicator 2419, shown as an indent, carve-out, or recessed feature, centered on the terminal end or surface of the nose 2412. The alignment indicator 2419 may also be formed as a different color than the rest of the shank 2400, including the nose 2412 and mid-shank 2414, such as red, yellow, or orange, for example, or may be more reflective than the rest of the shank 2400, in a similar or identical manner as discussed in previously discussed embodiments. The alignment indicator 2419 may be integrally formed into the shank nose 2412 and enable a driver to align the receiver with the shank 2400. As shown in FIGS. 39 and 40, the alignment indicator 2419, may be substantially square-shaped, or alternatively, the alignment indicator 2419 may be circular, triangular, star-shaped, or any other desired shape. Thus, the alignment indicator 2419 may aide a user to align the shank 2400, for example, as the shank 2400 is inserted into a receiver (not shown) of a vehicle, as the vehicle is reversed into engagement with the shank 2400.

Therefore, the alignment indicator 2419 can help a driver of the vehicle to more easily see the alignment of the shank 2400, using rear view mirror or a "back-up camera", for example, and thereby, improve the speed and efficiency of inserting the shank 2400 into the receiver.

Figure 41:
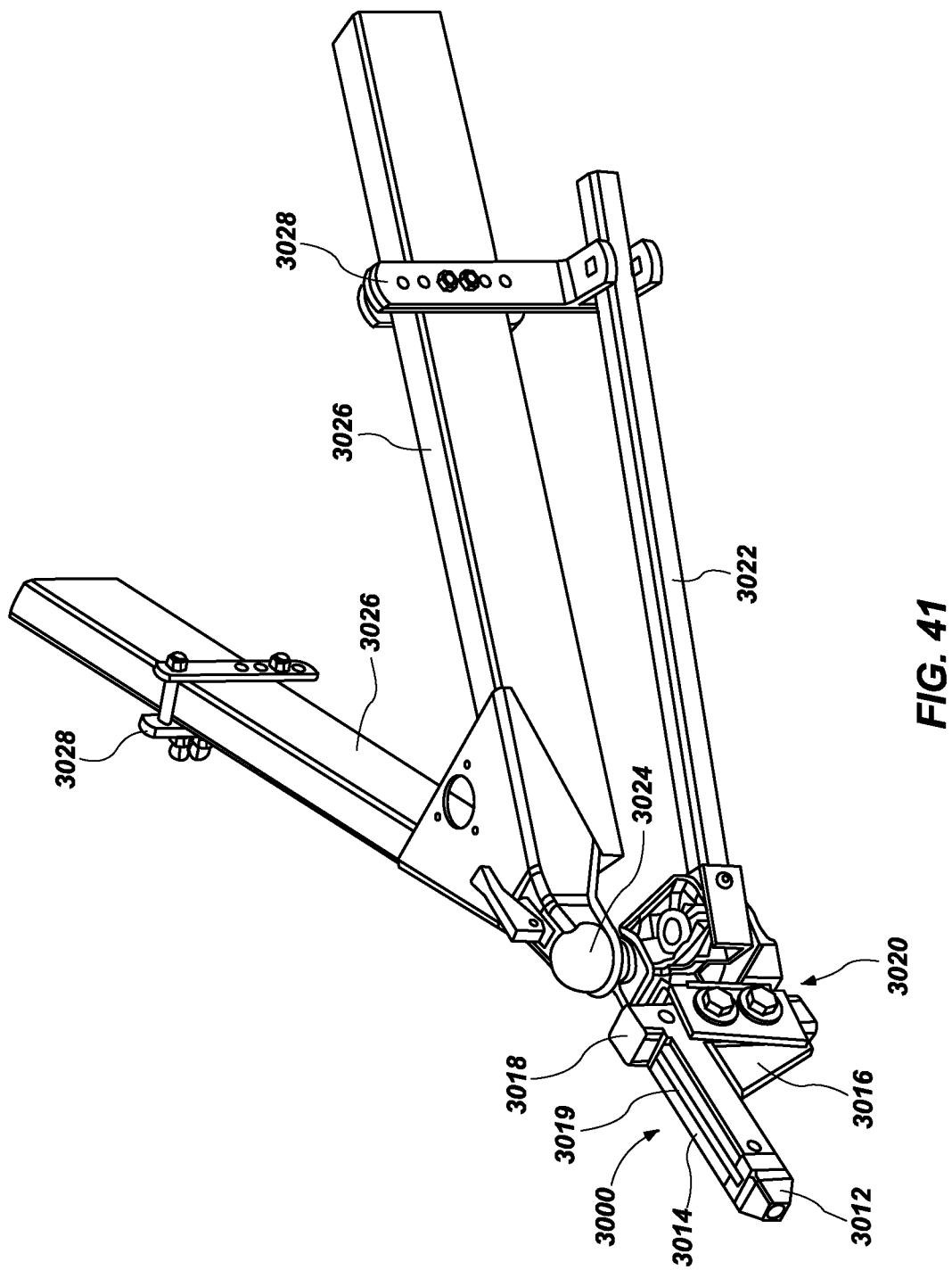
FIG. 41 is a perspective view of another embodiment of the disclosed invention.
Figure 42:
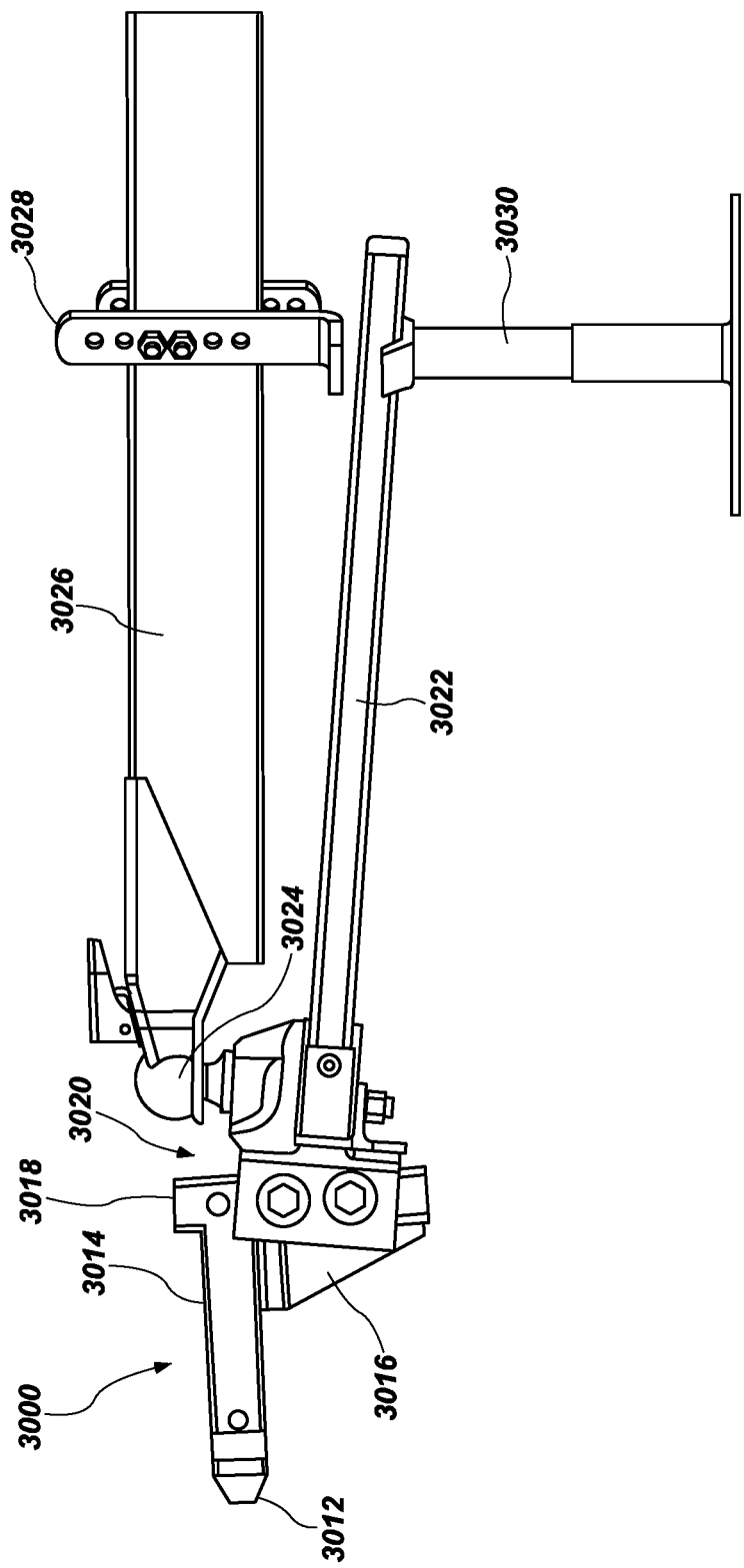
FIG. 42 is a side view of another embodiment of the disclosed invention.

Referring to FIGS. 40 and 41, another shank embodiment includes a shank 2500, having a nose 2512 a mid-shank 2514, a support 2516 and a vertical adjustment 2518, wherein the mid-shank 2514 and vertical adjustment 2518, and nose 2512 may be of the form or shape, or combination of form or shape, of any or the shank embodiments disclosed herein. The shank 2500 also includes an alignment indicator 2519, shown as an indent, carve-out, or recessed feature, centered on the terminal end or surface of the nose 2412, and an additional alignment indicator located on an upper surface of the shank 2500. The alignment indicator 2519 may also be formed as a different color than the rest of the shank 2500, including the nose 2512 and mid-shank 2514, such as red, yellow, or orange, for example, or may be more reflective than the rest of the shank 2500, in a similar or identical manner as discussed in previously discussed embodiments. The alignment indicator 2519 may be integrally formed into the shank nose 2412 and enable a driver to align the receiver with the shank 2400. As shown in FIGS. 41 and 42, the alignment indicator 2519, may be substantially square-shaped, or alternatively, the alignment indicator 2519 may be circular, triangular, star-shaped, or any other desired shape. Thus, the alignment indicator 2519 may aide a user to align the shank 2500, for example, as the shank 2500 is inserted into a receiver (not shown) of a vehicle, as the vehicle is reversed into engagement with the shank 2500.

Therefore, the alignment indicator 2419 can help a driver of the vehicle to more easily see the alignment of the shank 2400, using rear view mirror or a "back-up camera", for example, and thereby, improve the speed and efficiency of inserting the shank 2400 into the receiver.

Referring to FIG. 41, another shank embodiment includes a shank 3000, having a nose 3012, a mid-shank 3014, a support 3016, a vertical adjustment 3018, and an alignment indicator 3019, wherein the mid-shank 3014, vertical adjustment 3018, nose 3012 and alignment indicator 3019, may be of the form or shape, or combination of form or shape, of any or the shank embodiments disclosed herein.

The shank 3000 is attached to a hitch 3020 which is mounted to weight distribution spring bars 3022, to adjust the weight distribution of the trailer with respect to the to hitch 3020 after the shank 3000, including the nose 3012 and mid-shank 3014, is received into the receiver. The hitch 3020 is shown coupled to a coupler 3024 of a trailer (not shown). In use, the shank 3000 needs to be nearly horizontal (slight variances are acceptable) to allow the tow vehicle to back the receiver into engagement with the shank 3000. As shown in FIG. 41, the hitch 3020 is connected to the spring bars 3022 which are secured to a trailer frame 3026, via brackets 3028. The engagement between the spring bars 3022, trailer frame 3026 and the shank 3000, enable the shank 3000 to be held in a substantially horizontal position, even prior to engagement with the receiver, thus aiding in an increased speed and accuracy of engaging the shank 3000 with the receiver.

Referring to FIG. 42, another shank embodiment includes the shank 3000, hitch 3020 and trailer frame 3026 (and corresponding features) of FIG. 41, however, this embodiment includes a spring bar stand 3030 which can be used to support the spring bars 3022 in a desired position. Thus, the engagement between the spring bars 3022, spring bar stand 3030, and the shank 3000, enable the shank 3000 to be held in a substantially horizontal position, even prior to engagement with the receiver, thus aiding in an increased speed and accuracy of engaging the shank 3000 with the receiver.

Figure 43:
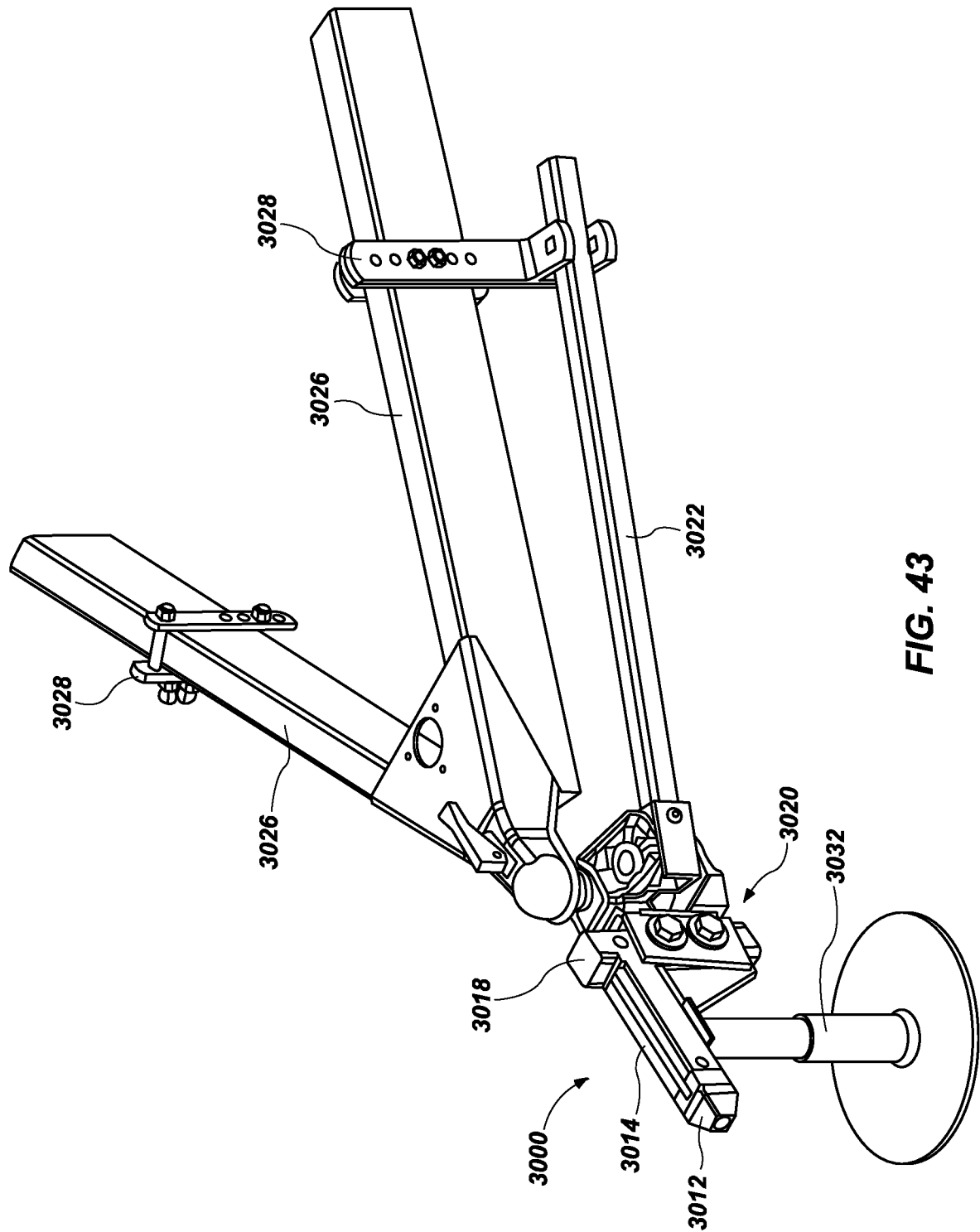
FIG. 43 is a perspective view of the embodiment of FIG. 42.

Referring to FIG. 43, another shank embodiment includes the shank 3000, hitch 3020 and trailer frame 3026 (and corresponding features) of FIG. 41, however, this embodiment includes a shank stand 3032 which can be used to support the shank 3000 in a desired position. Thus, the engagement between the shank 3000 and shank stand 3032, enable the shank 3000 to be held in a substantially horizontal position, even prior to engagement with the receiver, thus aiding in an increased speed and accuracy of engaging the shank 3000 with the receiver.

Figure 44:
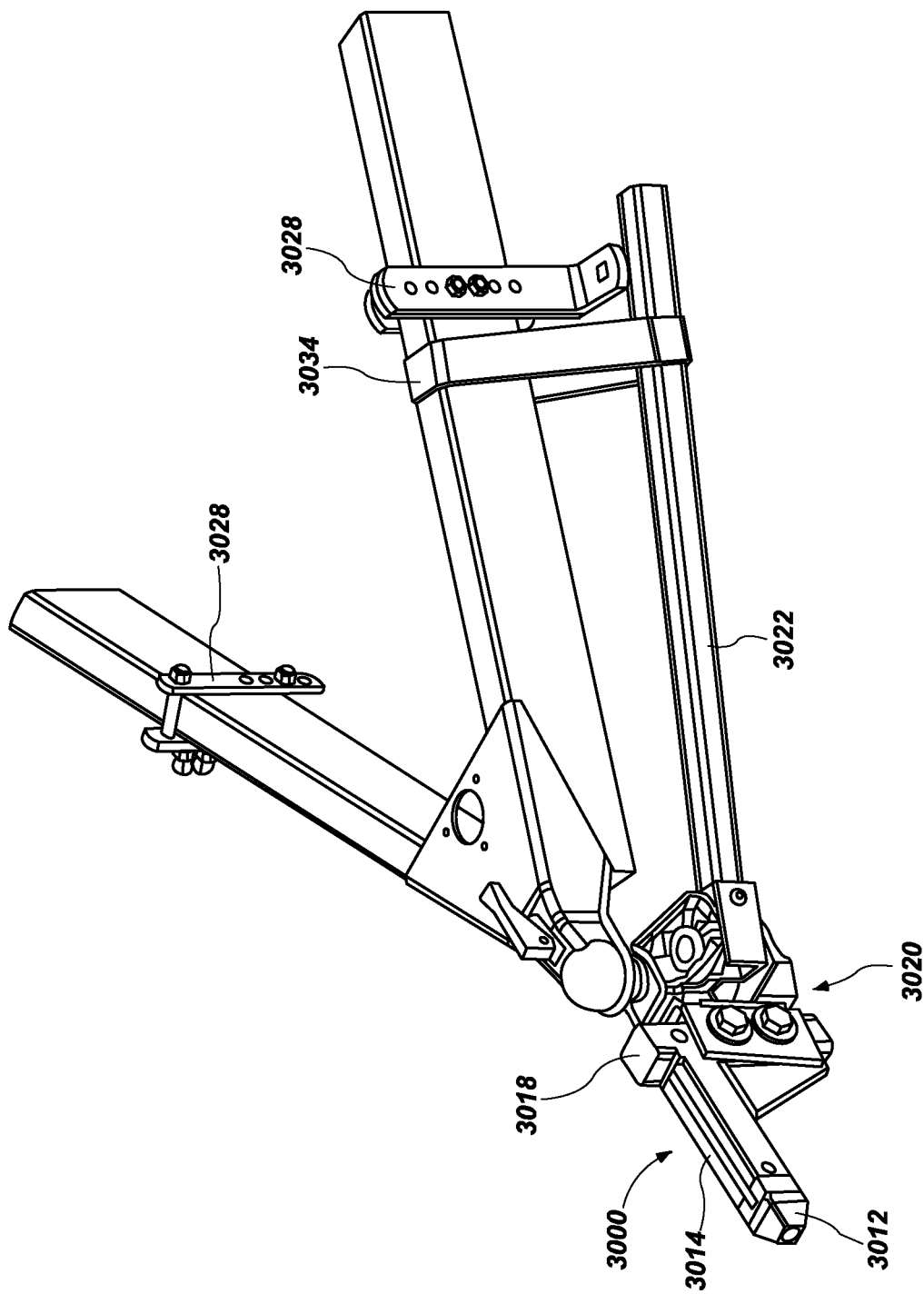
FIG. 44 is a perspective view of another embodiment of the disclosed invention.

Referring to FIG. 44, another shank embodiment includes the shank 3000, hitch 3020 and trailer frame 3026 (and corresponding features) of FIG. 41, however, this embodiment includes a spring bar band 3034 which can be used to support the spring bars 3022 in a desired position. Thus, the engagement between the shank 3000, the hitch 3020, the spring bars 3022 and the spring bar band 3034, enable the shank 3000 to be held in a substantially horizontal position, even prior to engagement with the receiver, thus aiding in an increased speed and accuracy of engaging the shank 3000 with the receiver.

Figure 45:
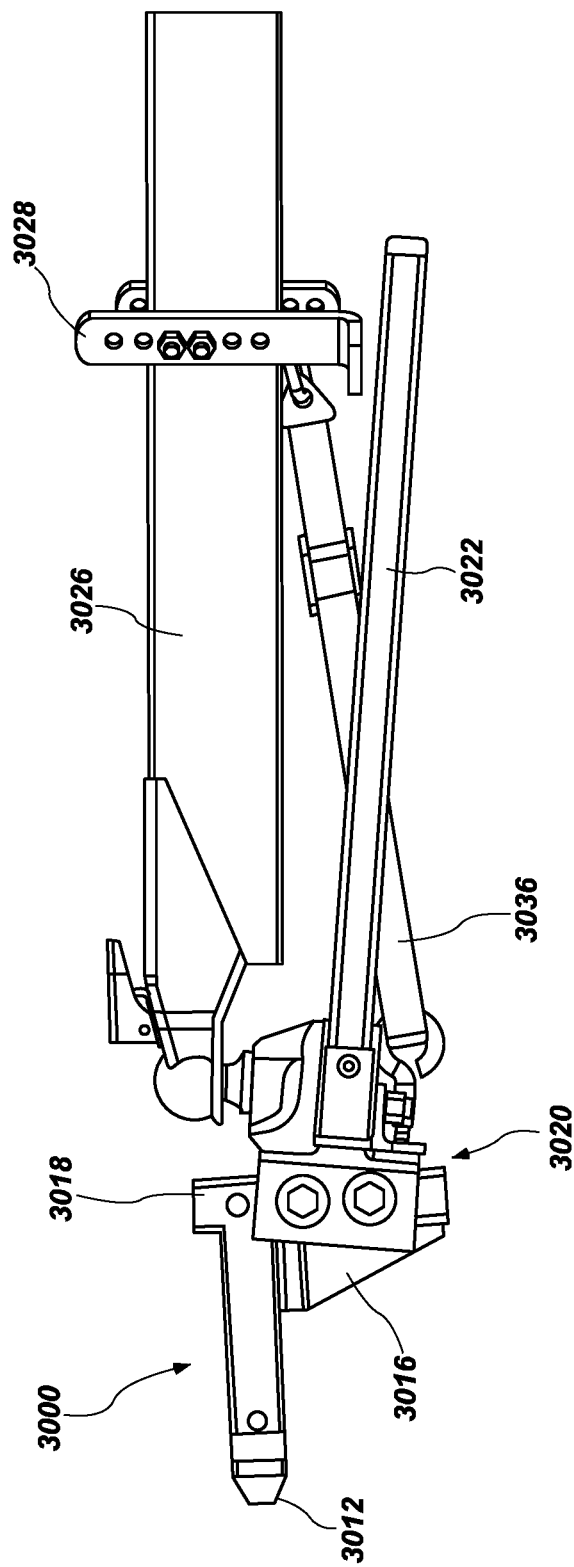
FIG. 45 is a side view of another embodiment of the disclosed invention.

Referring to FIG. 45, another shank embodiment includes the shank 3000, hitch 3020 and trailer frame 3026 (and corresponding features) of FIG. 41, however, this embodiment includes a hitch band 3036 which can be used to support the hitch 3020 in a desired position. Thus, the engagement between the shank 3000, the hitch 3020, the hitch band 3036, enable the shank 3000 to be held in a substantially horizontal position, even prior to engagement with the receiver, thus aiding in an increased speed and accuracy of engaging the shank 3000 with the receiver.

Figure 46:
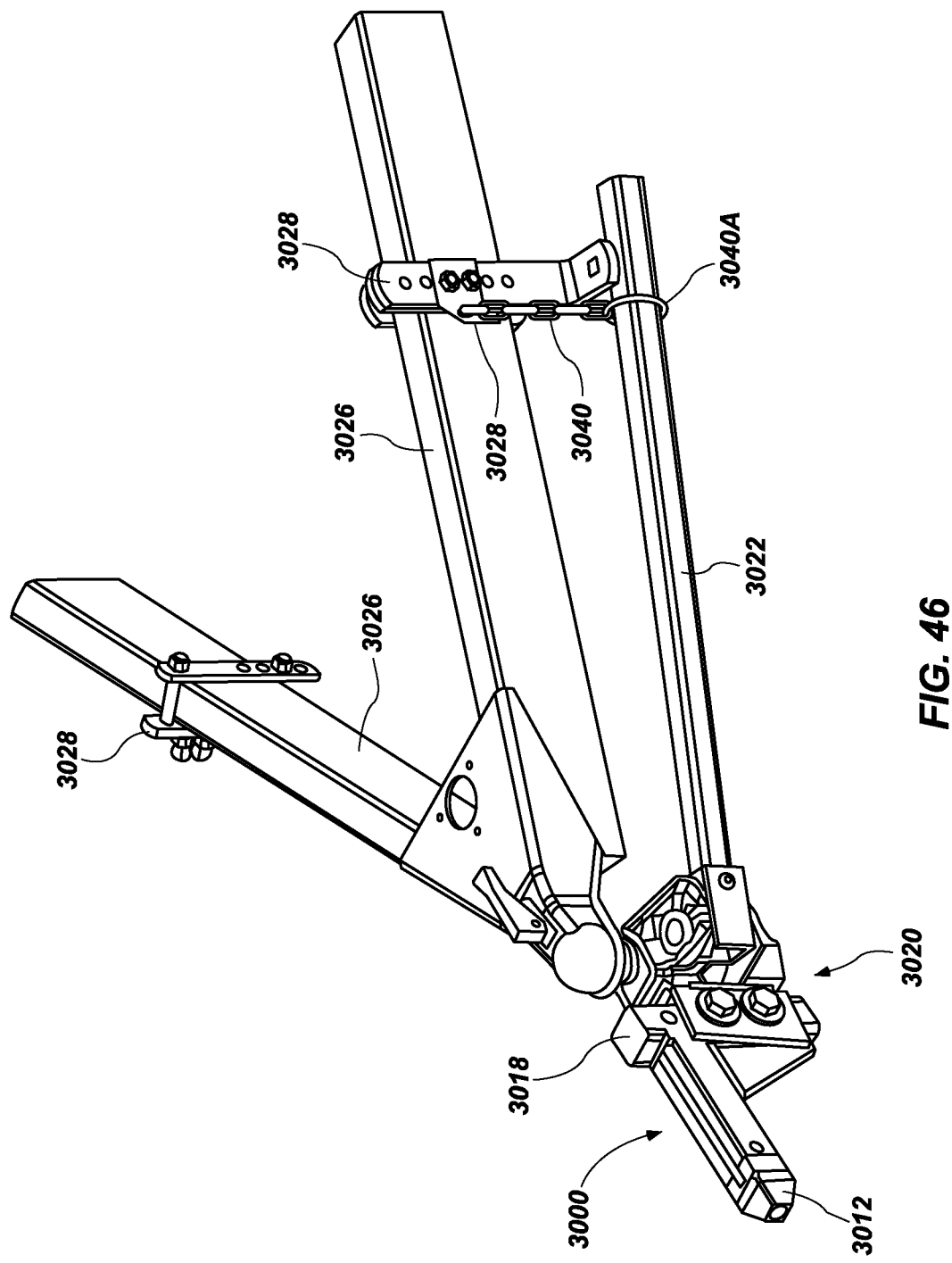
FIG. 46 is a perspective view of another embodiment of the disclosed invention.
Figure 47:
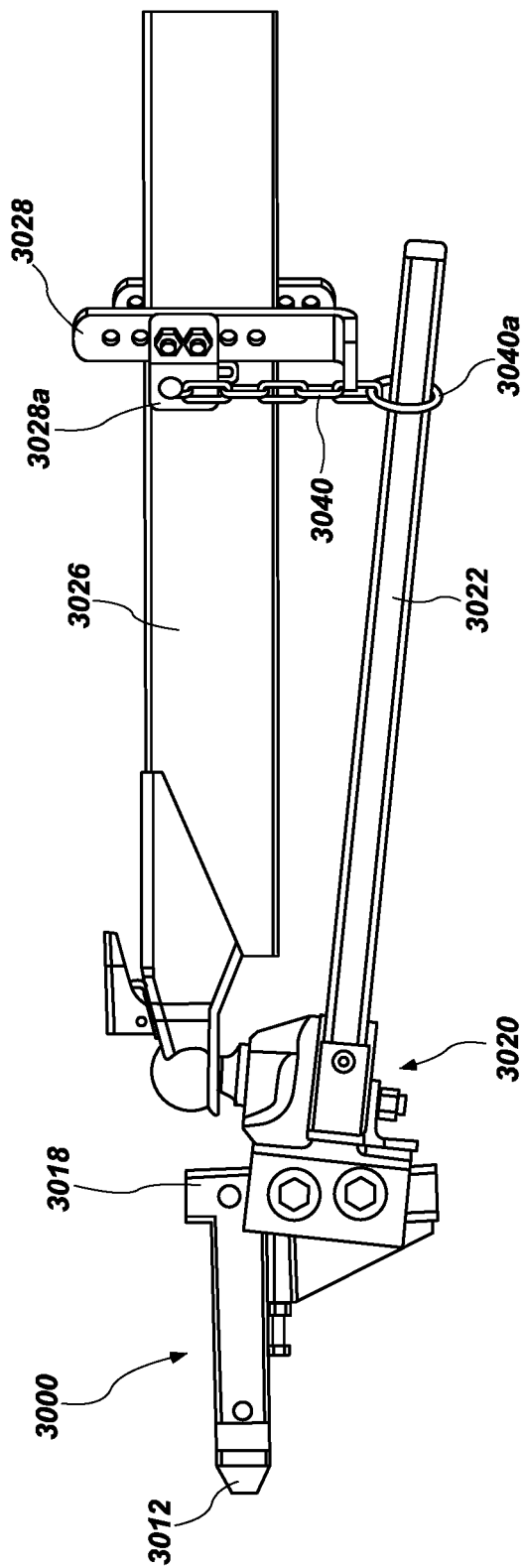
FIG. 47 is a side view of the embodiment of FIG. 46.
Figure 48:
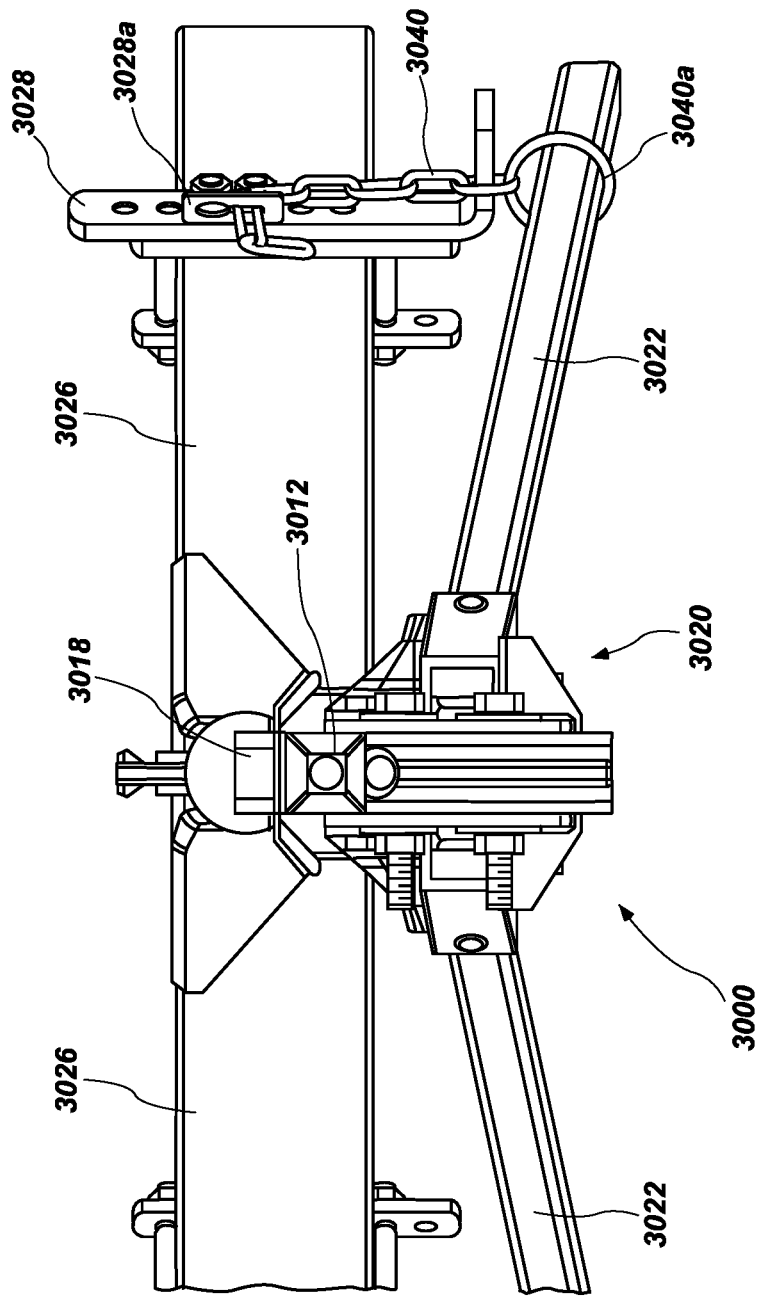
FIG. 48 is a front view of the embodiment of FIG. 46.

Referring to FIG. 46-48, another shank embodiment includes the shank 3000, hitch 3020 and trailer frame 3026 (and corresponding features) of the embodiment of FIG. 41, however, this embodiment includes an adjustment member or spring bar chain 3040 (a pair of adjustment members are used, although only one can be seen in FIGS. 46-48, corresponding to the pair of spring bars 3022), which can be used to support the spring bars 3022 in a desired position. The spring bar chains 3040 are flexible and adjustably coupled to the trailer frame 3026 via the corresponding brackets 3028, the brackets 3028 having an adjustment feature 3028a which can receive and adjust the position and length of the spring bar chains 3040 and removably couple the spring bar chains 3040 to the brackets 3028.

The spring bar chains 3040 may be removably coupled to the spring bars 3022 via a ring 3040a which can receive and support the spring bars 3022, prior to the shank 3000 being received into the receiver. Thus, the engagement between the shank 3000, the hitch 3020, the spring bars 3022, and spring bar chains 3040, enable the shank 3000 to be held in a substantially horizontal position, or easily adjust the horizontal portion (mid-shank) of the shank 3000 to a level position, even prior to engagement with the receiver, thus aiding in an increased speed and accuracy of engaging the shank 3000 with the receiver.

Figure 49:
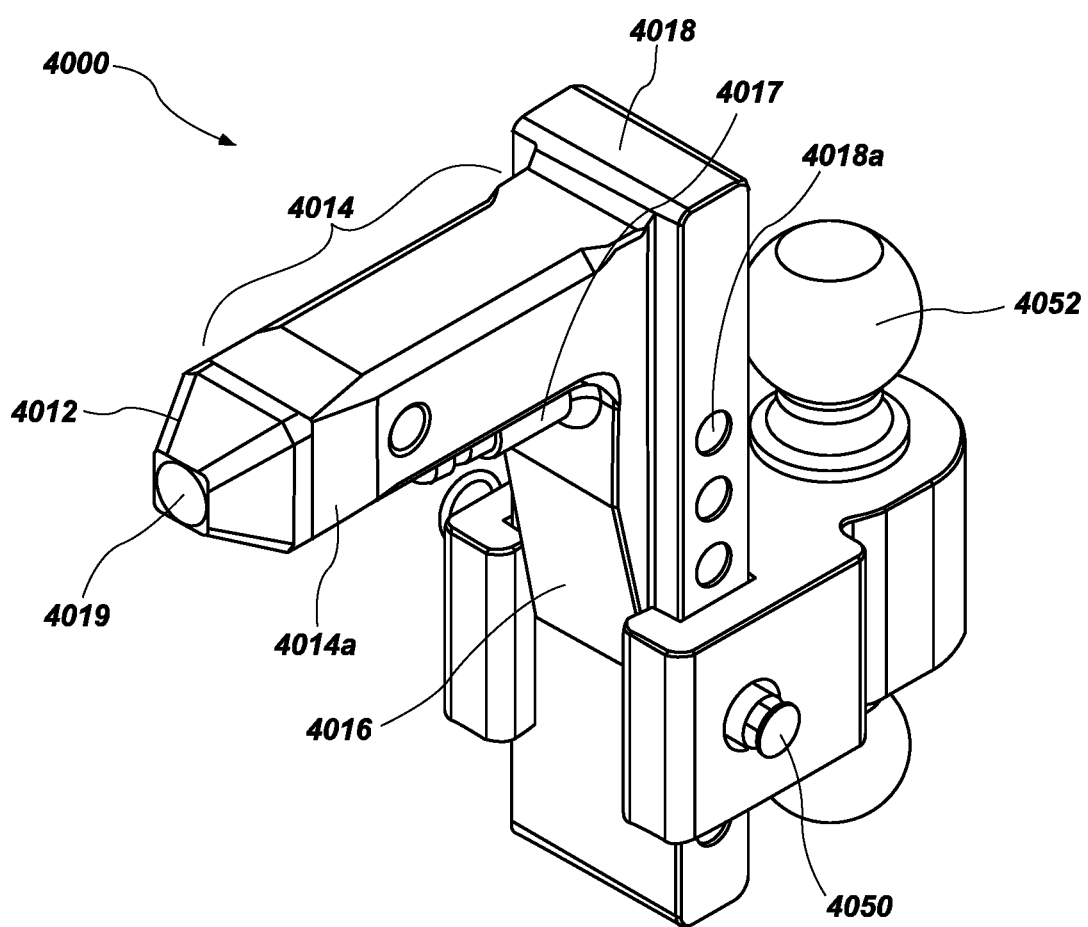
FIG. 49 is a perspective view of another embodiment of the disclosed invention.
Figure 50:
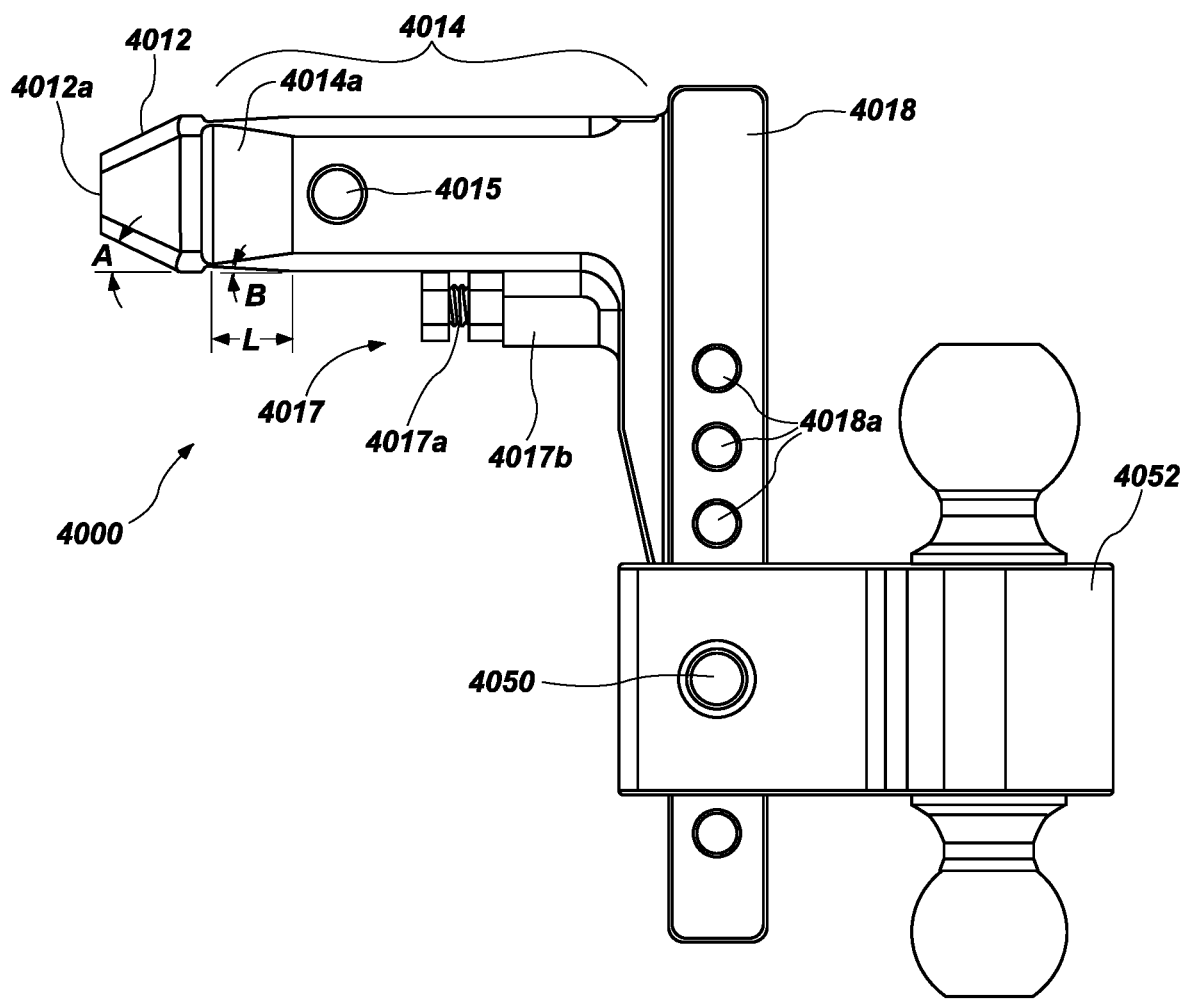
FIG. 50 is a side view of the embodiment of FIG. 49.

Referring to FIGS. 49 and 50, another shank embodiment includes a shank 4000, having a nose 4012 a mid-shank 4014, a support 4016 and a vertical adjustment 4018. The nose 4012 is shown having a tapered angular shape, with chamfer edges, which reduces in cross-sectional area until reaching a terminating free end of the nose 4012. The terminating end of the nose 4012 includes an alignment indicator 4019 which includes an indent, recess, or carve-out, centered on the terminal end surface of the nose 4012. The alignment indicator 4019 may be integrally formed into the shank nose 4012, or in any manner discussed above with respect to other embodiments, and enable a driver to align a receiver with the shank 4000.

The mid-shank 4014 is shown having a decreased perimeter or cross-sectional area, via a step reduction 4014a, immediately adjacent to the nose 4012, which can allow the shank 4000 to continue to more easily and completely enter into the receiver opening after the nose 4012 initially enters into the receiver. Various geometries of the mid-shank 4014 can be used which can allow the shank 4000 to easily and completely enter into a receiver opening. The step reduction 4014a may be have a continuously sloped portion extending until reaching the greatest width of the mid-shank 4014. The continuously sloped portion of the step reduction may be 0.125 inches in length L, or 0.1 to 0.5 inches, for example. The angle B of the sloped portion of the step reduction may be 2 to 10 degrees, or 4 degrees, for example. This continuously sloped portion can provide a shallower angle, while maintaining the same, or better, binding avoidance characteristics, as a circular scallop having max slope of about 15 degrees, for example. This continuously sloped portion of the step reduction 4014a can thus avoid binding within a receiver that is about 10 degrees, or more, out of direct alignment with the shank 4000, than a comparable circular scallop having a 15 degree maximum angle, for example.

A terminal surface of the nose 4012a may have a height or width of 0.5 to 1.5 inches, or 1 inch, for example. The nose 4012 may then extend at an angle A from the terminal surface 4012a. The angle A may be less than 45 degrees, 25 to 40 degrees, or 30 degrees, for example. The angle A may cause binding of the shank 4000 as it is inserted into a receiver if the angle A is too steep, for example if the angle A is 45 degrees or more. The nose 4012 may increase in width from the terminal surface 4012a to a its greatest width, which may be 1.5 to 3 inches, or two inches, for example.

The mid-shank 4014 may also include a pin hole 4015 which may be positioned behind the step reduction 4014a in a portion of the mid-shank having a constant width. The pin hole 4015 may have any desired diameter, for example, 1 inch, and may be configured to receive a retaining pin which can be inserted through the receiver, as a means of retaining the shank 4000 within the receiver. This configuration may provide a stronger pin connection, as the majority of the forces acting on a pin within the pin hole 4015 will be in shear, as opposed to a bending stress.

The vertical adjustment 4018 can provide numerous adjustable positions, using holes 4018a, which can receive a pin 4050 for attachment of a ball hitch 4052 or other hitch attachment, including, but not limited to, standard or non-height adjustable ball mounts.

The shank 4000 also includes a depth stop 4017 which can contact a receiver when the desired shank 4000 depth has been reached. The depth stop 4017 can be adjustable to alter the desired depth of the shank 4000 within the receiver. This adjustability can be facilitated by a threaded member 4017a which can be received and threadedly engaged with a receiving portion 4017b, which can enable the threaded member 4017a to extend in a proximal/distal, or lateral, direction towards or away from the receiver, along the mid-shank 4014.

Figure 51:
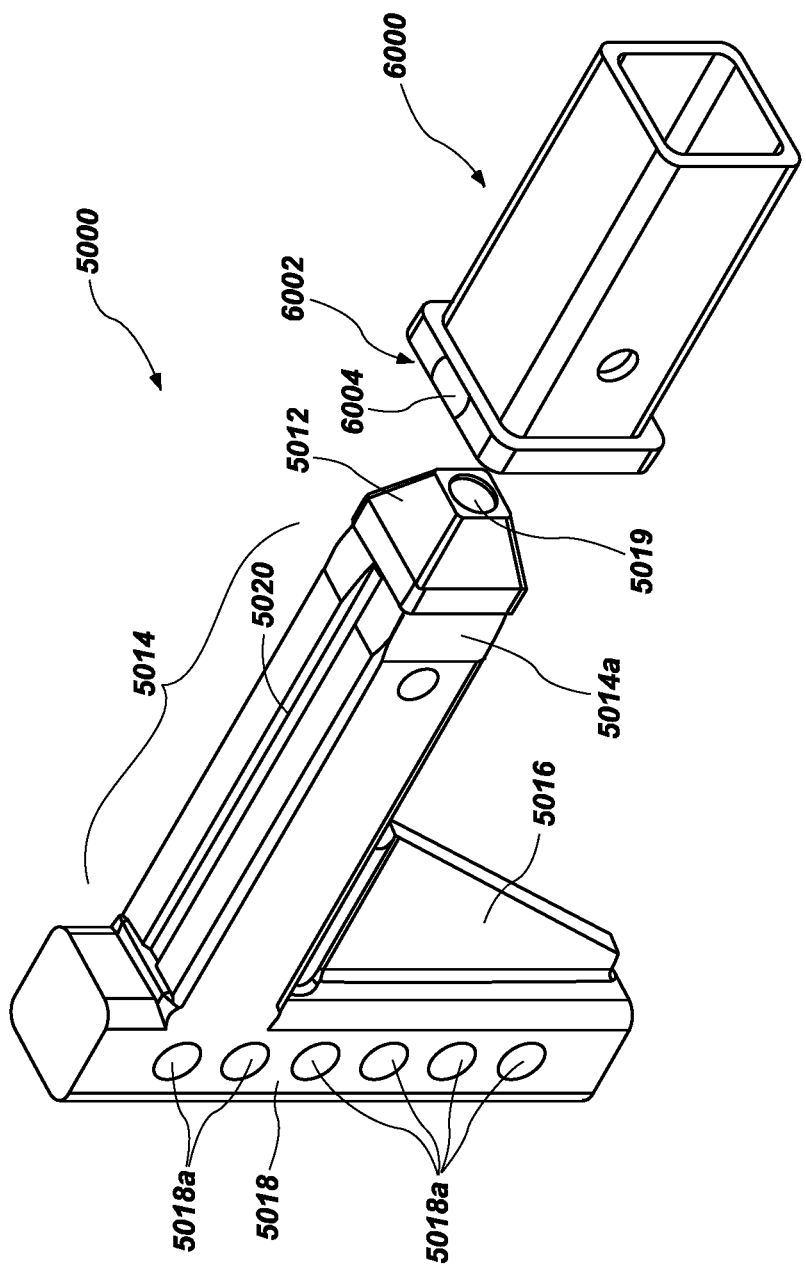
FIG. 51 is a perspective view of another embodiment of the disclosed invention.
Figure 52:
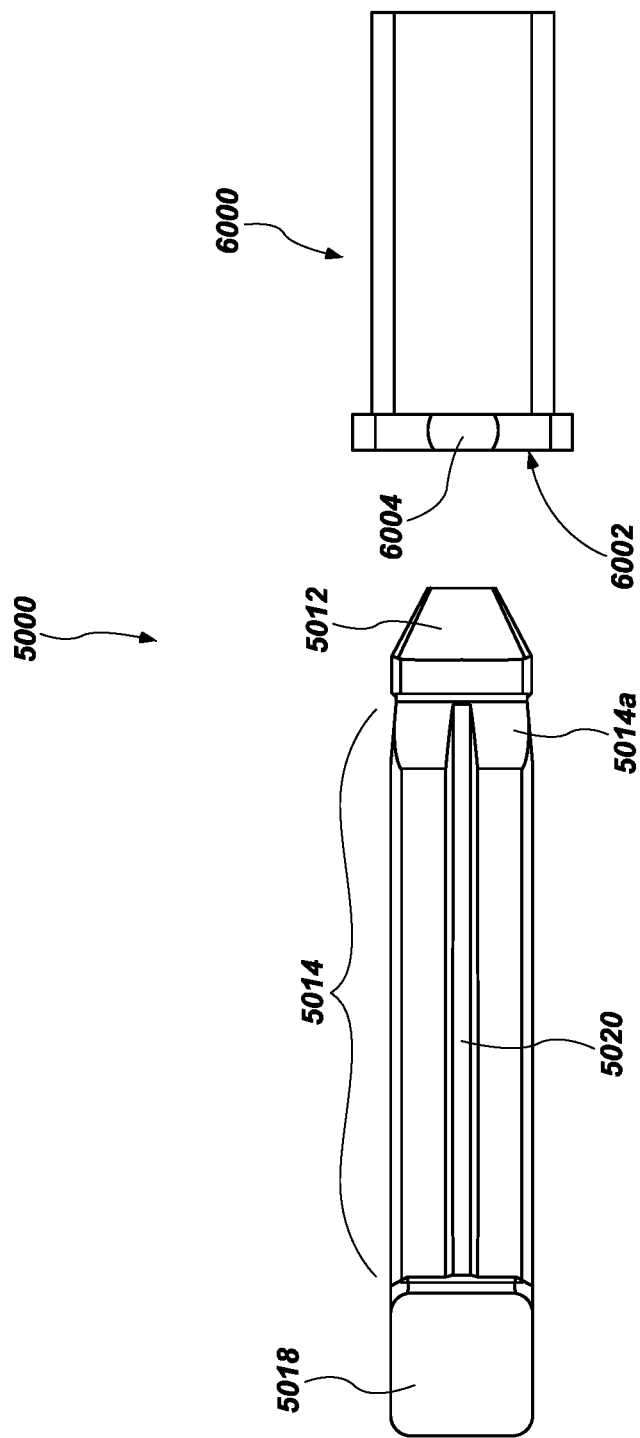
FIG. 52 is a top view of the embodiment of FIG. 51.

Referring to FIGS. 51 and 52, another shank embodiment includes a shank 5000, having a nose 5012 a mid-shank 5014, a support 5016 and a vertical adjustment 5018. The nose 5012 is shown having a tapered angular shape, with chamfer edges, which reduces in cross-sectional area until reaching a terminating free end of the nose 5012. The terminating end of the nose 5012 includes an alignment indicator 5019 which includes an indent, recess, or carve-out, centered on the terminal end surface of the nose 5012. The alignment indicator 5019 may be integrally formed into the shank nose 5012, or in any manner discussed above with respect to other embodiments, and enable a driver to align a receiver 6000 with the shank 5000. A second alignment indicator 5020 may be connected or otherwise incorporated on a top surface of the mid-shank 5014. The second alignment indicator 5020 may be linear or substantially linear, or may be substituted with any other alignment indicated disclosed herein.

The mid-shank 5014 is shown having a decreased perimeter or cross-sectional area, via a step reduction 5014a, immediately adjacent to the nose 5012, which can allow the shank 5000 to continue to more easily and completely enter into the receiver opening 6002 after the nose 5012 initially enters into the receiver 6000. Various geometries of the mid-shank 5014 can be used which can allow the shank 5000 to easily and completely enter into a receiver 6002 opening.

The vertical adjustment 5018 can provide numerous adjustable positions, using holes 5018a, which can receive a pin (not shown) for attachment of a ball hitch, for example, or other hitch attachment, including, but not limited to, standard or non-height adjustable ball mounts.

The receiver 6000 may be attached to a tow vehicle, not shown, but may be visible to a driver of the tow vehicle via a back-up or rear facing camera (not shown), which may conventionally be attached to a rear bumper of the tow vehicle or at another rear-facing location on the tow vehicle. The receiver may include an alignment indicator 6004 on a top surface or portion of the receiver 6000 and positioned centered, or substantially centered, above the receiver opening 6002. The alignment indicator 6004 on the receiver 6000 may be a different color (any desired color) than the rest of the receiver 6000 and may be formed as any desired shape. The alignment indicator 6004 may also be integral with the receiver 6000, affixed thereto, using paint, tape or glue, for example. The receiver alignment indicator 6004 may also be aligned, collinear or substantially collinear, with the shank alignment indicator 5019 on the nose 5012 and the second alignment indicator 5020 on the mid-shank 5014, when the shank 5000 is received within the opening 6002 of the receiver 6000. This configuration and alignment of the alignment indicators 5019, 5019 and 6004 enables the driver of the tow vehicle to more easily navigate and align the receiver opening 6002 into engagement with the shank 5000, while operating the vehicle. Accordingly, the alignment indicator 6004 on the receiver 6004 may be visible to the tow vehicle driver via the back-up camera.

Figure 53:
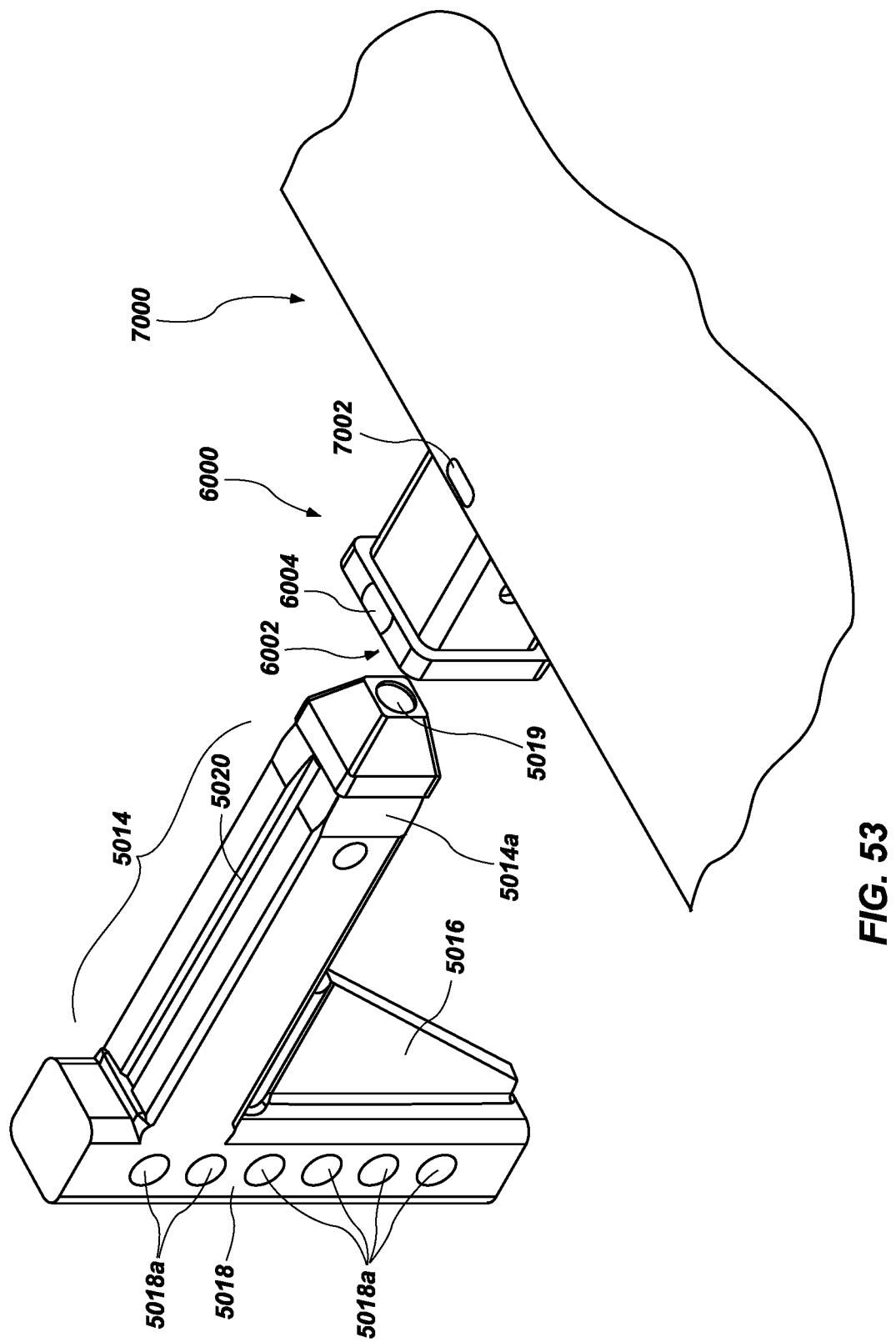
FIG. 53 is a perspective view of another embodiment of the disclosed invention.
Figure 54:
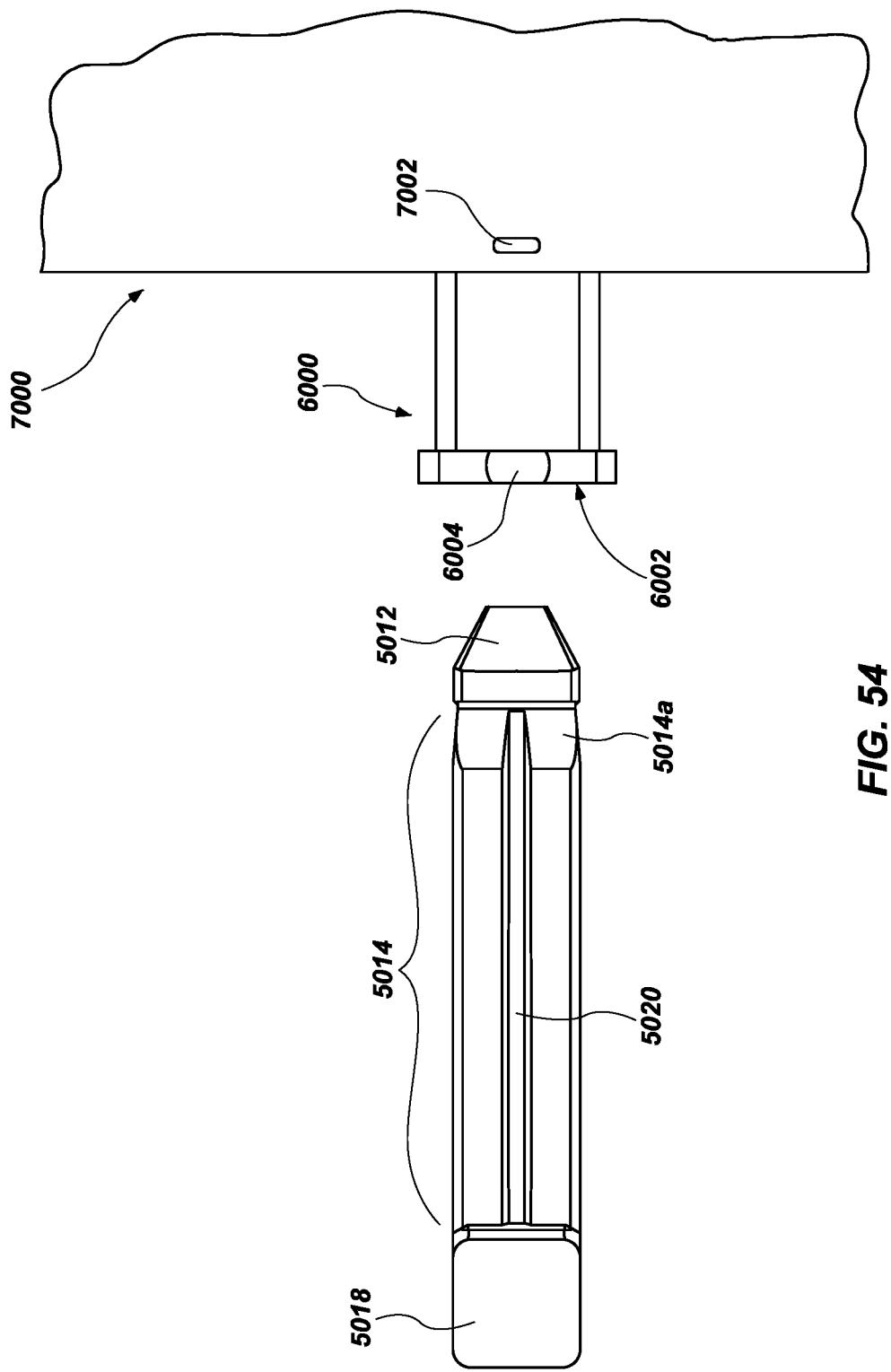
FIG. 54 is a top view of the embodiment of FIG. 51.

In an alternative embodiment as shown in FIGS. 53 and 54, for example, a tow vehicle bumper 7000, may also include an alignment indicator 7002 on a top portion of the bumper 7000 in addition to, or instead of, having the alignment indicator 6004 on the receiver 6000, particularly if the alignment indicator 6004 on the receiver 6002 is not visible to the tow vehicle operator via the back-up camera. The alignment indicator 7002 on the bumper 7000 may be a different color (any desired color) than the rest of the bumper 7000 and may be formed as any desired shape. The alignment indicator 7002 may also be integral with the bumper 7000, affixed thereto, using paint, tape or glue, for example. The alignment indicator 7002 on the bumper 7000 may also be aligned, collinear or substantially collinear, with the shank alignment indicator 5019 on the nose 5012 and the second alignment indicator 5020 on the mid-shank 5014, when the shank 5000 is received within the opening 6002 of the receiver 6000. This configuration and alignment of the alignment indicators 5019, 5019, 6004 and 7002 enables the driver of the tow vehicle to more easily navigate and align the receiver opening 6002 into engagement with the shank 5000, while operating the vehicle. Accordingly, the alignment indicator 7002 on the bumper 7000 may be visible to the tow vehicle driver via the back-up camera.

In alternative embodiments a colored alignment indicator may affixed to a display of the back-up camera within the tow vehicle, thereby providing a reference point indicating when the shank is substantially aligned with the receiver. Additional or alternatively, an alignment indicator may be integrated with the edge of the display or an imbedded electronic marker may be programmed into the back-up camera system, and visible on the display within the vehicle, providing a reference point indicating when the shank is substantially aligned with the receiver.

Figure 55:
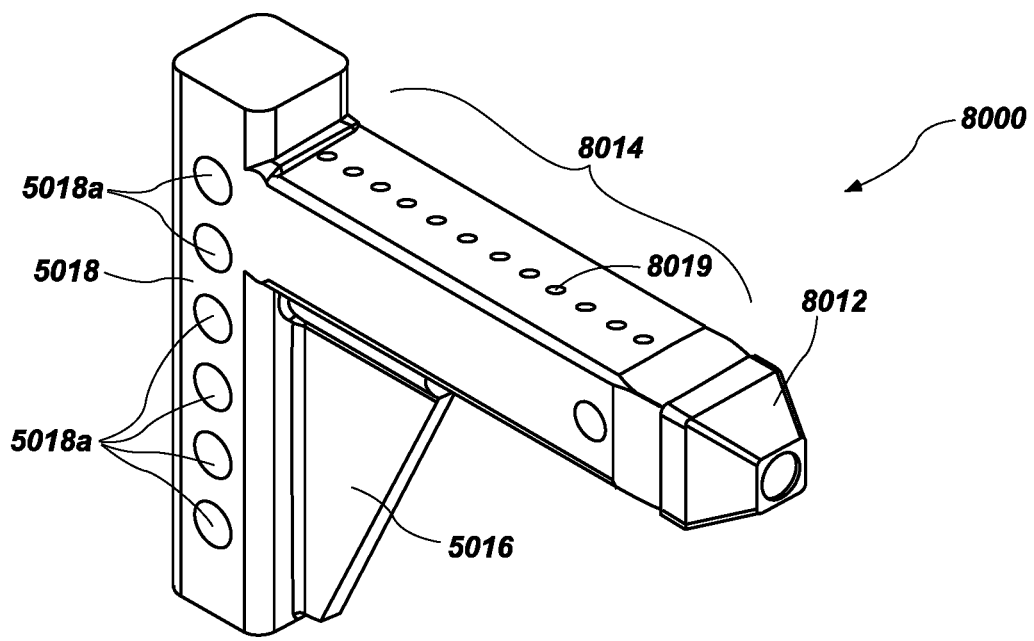
FIG. 55 is a perspective view of another embodiment of the disclosed invention.

Referring to FIG. 55, another shank embodiment includes a shank 8000, having a nose 8012 a mid-shank 8014, a support 8016 and a vertical adjustment 8018, wherein the mid-shank 8014 and vertical adjustment 8018, and nose 8012 may be of the form or shape, or combination of form or shape, of any or the shank embodiments disclosed herein.

The vertical adjustment 8018 can provide numerous adjustable positions, using holes 8018*a*, which can receive a pin (not shown) for attachment of a ball hitch, for example, or other hitch attachment, including, but not limited to, standard or non-height adjustable ball mounts.

The shank 8000 also includes an alignment indicator 8019, shown as a plurality of dots or perforations, extending substantially linearly from the vertical adjustment 8018 to the nose 8012. The alignment indicator 8019 may be a different color or more reflective than the rest of the shank 8000, in a similar or identical manner as discussed in previously discussed embodiments, and may be integrally formed into the shank 8000, to more easily distinguish it from the rest of the shank 8000. The shank 8000, for example, may be inserted into a receiver (not shown) of a vehicle, as the vehicle is reversed into engagement with the shank 8000.

Therefore, the alignment indicator 8019 can help a driver of the vehicle to more easily see the alignment of the shank 8000, using a rear view mirror or a "back-up camera", for example, and thereby, improve the speed and efficiency of inserting the shank 8000 into the receiver.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A trailer hitch system for attaching a trailer to a tow vehicle, said trailer hitch system comprising:
   a shank attachable to said trailer, said shank having a nose at a terminal end of the shank and a mid-shank extending in a substantially horizontal direction immediately adjacent to the nose, said nose and mid-shank being configured to be received in a receiver attachable to said tow vehicle and a vertical adjustment extending in a substantially vertical direction; and
   a depth stop connected to the shank and configured to abut said receiver to limit a depth said shank extends within said receiver;
   wherein said mid-shank includes a step reduction having a corner which decreases a cross-sectional area of the mid-shank immediately adjacent to the nose and an alignment indicator provided on an external surface and extending along the external surface of the mid-shank in a substantially horizontal direction;
   wherein alignment indicator is a color that is different than a color of the mid-shank; and
   wherein the nose is configured to reduce in cross-sectional area toward the terminal end of the shank.

2. The trailer hitch system of claim 1, wherein the alignment indicator is substantially linear.

3. The trailer hitch system of claim 1, wherein the alignment indicator extends along a top surface of the mid-shank.

4. The trailer hitch system of claim 1, wherein the alignment indicator extends along a side surface of the mid-shank.

5. The trailer hitch system of claim 1, wherein the alignment indicator is recessed into the mid-shank.

6. The trailer hitch system of claim 1, wherein the alignment indicator is more reflective than the mid-shank.

7. The trailer hitch system of claim 1, wherein said depth stop is a collar that is adjustably coupled to the mid-shank enabling the depth stop to change position with respect to the mid-shank.

8. The trailer hitch system of claim 1, wherein the corner of the step reduction is a right-angled corner.

9. A trailer hitch system for attaching a trailer to a tow vehicle, said trailer hitch system comprising:
   a shank attachable to said trailer, said shank having a nose at a terminal end of the shank and a mid-shank extending in a substantially horizontal direction immediately adjacent to the nose, said nose and mid-shank being configured to be received in a receiver attachable to said tow vehicle, and a vertical adjustment extending in a substantially vertical direction;

a depth stop adjustably connected to the mid-shank and configured to abut said receiver, to limit a depth said shank extends within said receiver, wherein said depth stop is a collar that is adjustably coupled to the mid-shank enabling the depth stop to change position with respect to the mid-shank; and wherein said mid-shank includes a step reduction having a corner which decreases a cross-sectional area of the mid-shank immediately adjacent to the nose and wherein the mid-shank includes at least two alignment indicators provided on at least two respective external surfaces of the mid-shank, each of the at least two alignment indicators extending along the mid-shank in a substantially horizontal direction, and wherein at least one of the alignment indicators is a color that is different than a color of the mid-shank.

10. The trailer hitch system of claim 9, wherein each of the alignment indicators are substantially linear.

11. The trailer hitch system of claim 9, wherein at least one of the alignment indicators extends along a top external surface of the mid-shank.

12. The trailer hitch system of claim 9, wherein at least one of the alignment indicators extends along a side external surface of the mid-shank.

13. The trailer hitch system of claim 9, wherein at least one of the alignment indicators is recessed into the external surface of the mid-shank.

14. The trailer hitch system of claim 9, wherein at least one of the alignment indicators is more reflective than the mid-shank.

15. The trailer hitch system of claim 9, wherein the corner of the step reduction is a right-angled corner.

16. A trailer hitch system for attaching a trailer to a tow vehicle, said trailer hitch system comprising:

a shank attachable to said trailer, said shank having a nose at a terminal end of the shank and a mid-shank extending in a substantially horizontal direction immediately adjacent to the nose, said nose and mid-shank being configured to be received in a receiver attachable to said tow vehicle;

a depth stop connected to the shank and configured to abut said receiver to limit a depth said shank extends within said receiver;

wherein said mid-shank includes a step reduction having a corner which decreases a cross-sectional area of the mid-shank immediately adjacent to the nose and an alignment indicator on an external surface of the shank configured to provide a visual indicator of the orientation of the shank to a back-up camera of the tow vehicle;

wherein the nose is configured to reduce in cross-sectional area toward the terminal end of the shank, and wherein the alignment indicator is a color that is different than a color of the nose.

17. The trailer hitch system of claim 16, wherein the alignment indicator extends along a side surface of the mid-shank.

18. The trailer hitch system of claim 16, wherein the alignment indicator is more reflective than the nose.

19. The trailer hitch system of claim 16, wherein the alignment indicator is substantially linear.

20. The trailer hitch system of claim 16, wherein the corner of the step reduction is a right-angled corner.

21. A trailer hitch system for attaching a trailer to a tow vehicle, said trailer hitch system comprising:

a shank attachable to said trailer, said shank having a nose at a terminal end of the shank and a mid-shank having a length and extending in a substantially horizontal direction immediately adjacent to the nose, said nose and mid-shank being configured to be received in a receiver attachable to said tow vehicle, wherein the mid-shank includes a top surface, a bottom surface, and side surfaces; and at least two alignment indicators, including a first alignment indicator extending along at least a portion of a top external-facing surface and at least a second alignment indicator extending along at least a portion of a side external surface of the mid-shank, each of the at least two alignment indicators extending in a substantially horizontal direction to provide a visual indicator of the orientation of the shank to a back-up camera of the tow vehicle;

wherein the at least two alignment indicators are a color that is different than a color of the nose.

22. The trailer hitch system of claim 21, wherein the at least two alignment indicators are substantially linear.

23. The trailer hitch system of claim 21, wherein the at least two alignment indicators extends along each side external surface of the mid-shank.

24. The trailer hitch system of claim 21, wherein the at least two alignment indicators are more reflective than the mid-shank.

25. The trailer hitch system of claim 21, wherein said mid-shank includes a step reduction which decreases a cross-sectional area of the mid-shank immediately adjacent to the nose.

26. The trailer hitch system of claim 21, further comprising: a depth stop connected to the shank and configured to abut said receiver to limit a depth said shank extends within said receiver.

* * * * *